United States Patent
Ohhashi

(10) Patent No.: US 7,330,410 B2
(45) Date of Patent: Feb. 12, 2008

(54) INFORMATION RECORDING METHOD AND APPARATUS, INFORMATION PROCESSING APPARATUS, INFORMATION RECORDING SYSTEM AND COMPUTER-READABLE STORAGE MEDIUM USING DUMMY DATA

(75) Inventor: Naoya Ohhashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 581 days.

(21) Appl. No.: 10/422,913

(22) Filed: Apr. 25, 2003

(65) Prior Publication Data

US 2003/0202443 A1 Oct. 30, 2003

(30) Foreign Application Priority Data

| Apr. 30, 2002 | (JP) | 2002-128028 |
| Jun. 25, 2002 | (JP) | 2002-184008 |
| Sep. 20, 2002 | (JP) | 2002-274639 |

(51) Int. Cl.
G11B 7/004 (2006.01)
(52) U.S. Cl. .............. 369/53.18; 369/59.25; 713/340
(58) Field of Classification Search ............. None
See application file for complete search history.

(56) References Cited

U.S. PATENT DOCUMENTS

| 6,172,955 | B1 * | 1/2001 | Hashimoto | 369/53.37 |
| 6,310,842 | B1 * | 10/2001 | Higuchi | 369/47.15 |
| 6,928,567 | B2 * | 8/2005 | Nakai | 713/340 |
| 2002/0159353 | A1 * | 10/2002 | Sasaki | 369/53.15 |

FOREIGN PATENT DOCUMENTS

| EP | 10143976 | 5/1998 |
| EP | 1152411 A2 | 11/2001 |
| JP | 03-109625 | 5/1991 |
| JP | 10143976 A | 5/1998 |
| JP | 10-162399 | 6/1998 |
| JP | 11-134799 | 5/1999 |
| JP | 2000-149447 | 5/2000 |
| JP | 2001-283500 | 10/2001 |
| JP | 2003-283500 | 10/2001 |
| JP | 2001-296040 | 10/2003 |
| JP | 2003-296040 | 10/2003 |

* cited by examiner

*Primary Examiner*—Andrea Wellington
*Assistant Examiner*—Michael V Battaglia
(74) *Attorney, Agent, or Firm*—Dickstein Shapiro LLP

(57) ABSTRACT

An information recording method records information in an information recording medium by acquiring driving power supply information related to a driving power supply of an information recording apparatus which records the information in the information recording medium, in response to a request for a process which accompanies recording of dummy data in the information recording medium, and determining whether to permit or prohibit the process which accompanies recording of the dummy data, based on the driving power supply information.

25 Claims, 29 Drawing Sheets

FIG.3

| BIT BYTE | 7 | 6 | 5 | 4 | 3 | 2 | 1 | 0 |
|---|---|---|---|---|---|---|---|---|
| 0 | PS | RESERVED | PAGE CODE (1Dh) | | | | | |
| 1 | PAGE LENGTH (08h) | | | | | | | |
| 2 | RESERVED | | | | | | | |
| 3 | RESERVED | | | | | | | |
| 4 | FP | | | RESERVED | | TMOE | DISO | SWPP |
| 5 | RESERVED | | | | | | | |
| 6 | GROUP 1 MINIMUM TIME-OUT (sec) | | | | | | | |
| 7 | GROUP 2 MINIMUM TIME-OUT (sec) | | | | | | | |

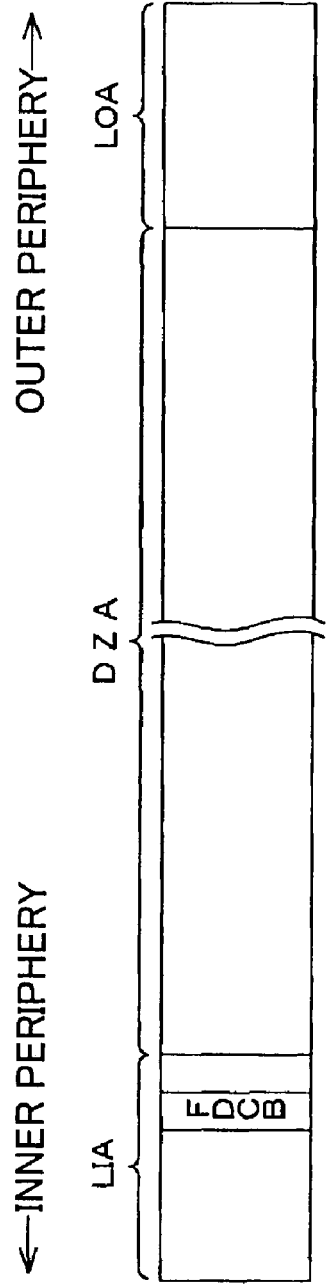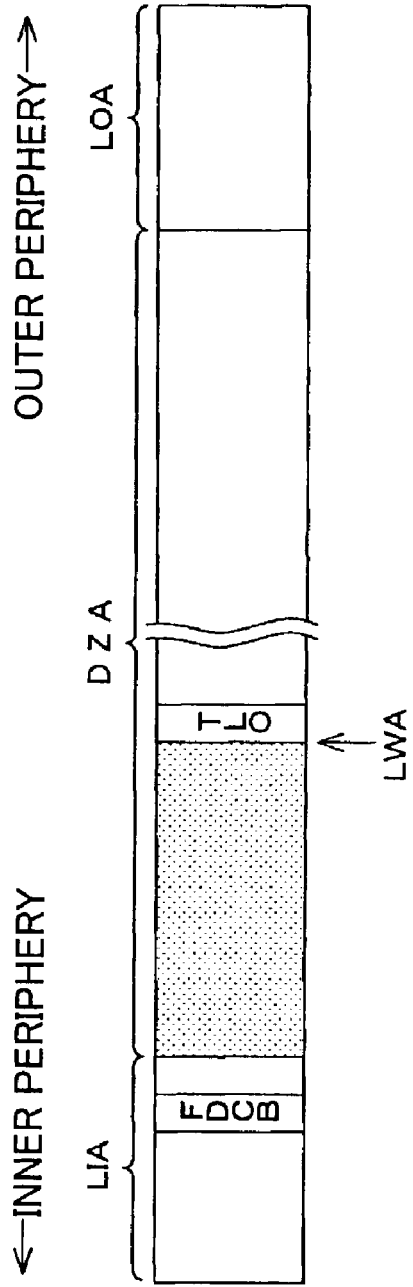

FIG.11

| CODE | EVENT |
| --- | --- |
| 0h | NO CHANGE |
| 1h | DISC EJECT REQUEST |
| 2h | DISC NEWLY LOADED |
| 3h | DISC EJECTED |
| 4h | DISC CHANGED |
| 5h | BACKGROUND FORMATTING COMPLETED |
| 6h | BACKGROUND FORMATTING AUTOMATICALLY RESUMED |
| 7h | DISCONTINUANCE OF BACKGROUND FORMATTING COMPLETED |
| 8h-Fh | UNUSED |

FIG.23

| BIT / BYTE | 7 | 6 | 5 | 4 | 3 | 2 | 1 | 0 |
|---|---|---|---|---|---|---|---|---|
| 0 | PS | RESERVED | | | PAGE CODE (1Dh) | | | |
| 1 | PAGE LENGTH (08h) | | | | | | | |
| 2 | RESERVED | | | | | | | |
| 3 | RESERVED | | | | | | | |
| 4 | INIT5 | INIT4 | INIT3 | INIT2 | INIT1 | TMOE | DISO | SWPP |
| 5 | RESERVED | | | | | | | |
| 6 | GROUP 1 MINIMUM TIME-OUT (sec) | | | | | | | |
| 7 | GROUP 2 MINIMUM TIME-OUT (sec) | | | | | | | |

FIG.28

| BIT<br>BYTE | 7 | 6 | 5 | 4 | 3 | 2 | 1 | 0 |
|---|---|---|---|---|---|---|---|---|
| 0 | | | | RESERVED | | | | |
| 1 | | | | RESERVED | | | | |
| 2 | | | | | | | INIT | RESTART |

INFORMATION RECORDING METHOD AND APPARATUS, INFORMATION PROCESSING APPARATUS, INFORMATION RECORDING SYSTEM AND COMPUTER-READABLE STORAGE MEDIUM USING DUMMY DATA

BACKGROUND OF THE INVENTION

This application claims the benefit of Japanese Patent Applications No. 2002-128028 filed Apr. 30, 2002, No. 2002-184008 filed Jun. 25, 2002 and No. 2002-274639 filed Sep. 20, 2002, in the Japanese Patent Office, the disclosures of which are hereby incorporated by reference.

1. Field of the Invention

The present invention generally relates to information recording methods and apparatuses, information processing apparatuses, information recording systems and computer-readable storage media, and more particularly to an information recording method for recording information on an information recording medium, an information recording apparatus for recording information on an information recording medium using such an information recording method, an information processing apparatus which is capable of making access to such an information recording medium, an information recording system which includes such information processing apparatus and information recording apparatus, and a computer-readable storage medium which stores a program for causing a computer to record information on an information recording medium.

2. Description of the Related Art

Recently, functions of personal computers have improved, thereby making it possible for the personal computers to treat audio-visual information such as music and video. Since the amount of information included in the audio-visual information is extremely large, optical discs, such as Compact Disc-Rewritable (CD-RW) and Digital Versatile Disc-Rewritable (DVD+RW), which have an extremely large storage capacity and have become inexpensive, are now regarded as suitable information recording media for storing the audio-visual information. The DVD can store approximately 7 times the amount of data storable in the CD having the same diameter as the DVD. As a result, it has become popular to use an optical disc drive as an information recording apparatus which records information on the information recording medium and forms a peripheral device of the personal computer.

The CD family optical discs include CD-ROM, CD-Recordable (CD-R) and CD-RW. The DVD family optical discs include DVD-ROM, DVD-RAM, DVD-Recordable (DVD–R), DVD–RW, DVD+Recordable (DVD+R) and DVD+Rewritable (DVD+RW).

In the rewritable optical discs such as the CD-RW, DVD–RW and DVD+RW, it is necessary to make a random access to a spiral or concentric recording region of the optical disc when recording the information on and reproducing the information from the optical disc. The recording on the optical discs such as the CD-RW, DVD-RW and DVD+RW is carried out according to respective standards or the like.

For example, in the case of the CR-RW, the track is divided into units called packets, and the information is recorded in packets. Such a recording system is often referred to as a packet write system. This packet write system can be categorized into two kinds, namely, a fixed-length packet write system according to which the amount of user data included in each packet is constant (for example, 64 kbytes), and a variable-length packet write system according to which the amount of user data included in each packet is variable. A file system for the optical disc, which employs the fixed-length packet write system, is called a Universal Disk Format (UDF).

In the CD-RW which employs the UDF, it is necessary to carry out the formatting before recording data on the CD-RW. The formatting is an initializing process which records the dummy data on an entire recording region or a specified recording region of the CD-RW before recording the user data on the CD-RW.

In the case of the DVD+RW, the user data can be recorded on the DVD+RW without carrying out the initializing process (formatting) with respect to the recording region of the DVD+RW. However, if an unrecorded portion having no data recorded therein exists within the recording region of the DVD+RW, it is impossible to reproduce the recorded data from the DVD+RW on a DVD-ROM drive, for example. In other words, compatibility of the DVD+RW and the DVD-ROM cannot be maintained if the unrecorded portion exists within the recording region of the DVD+RW. In order to maintain the compatibility of the DVD+RW and the DVD-ROM, it is also necessary to carry out the formatting with respect to the DVD+RW so as to record the dummy data on the entire recording region or a specified recording region of the DVD+RW before recording the user data on the DVD+RW.

However, because the storage capacities of the optical discs have increased considerably and the storage capacities of the optical discs are extremely large compared to the storage capacities of flexible discs, for example, it now takes more time to carry out the formatting with respect to the optical disc. Hence, even if the user obtains an optical disc, it is impossible for the user to immediately start recording information on the optical disc, and the user must first carry out the formatting with respect to the optical disc.

For example, when formatting the entire recording region of the CD-RW having a storage capacity of 650 MB, it takes 30 minutes or more to carry out the formatting even in a two-times speed mode. It takes a considerably longer time when formatting the DVD+RW having approximately 7 times the storage capacity of the CD-RW.

Accordingly, an information recording and reproducing apparatus which is capable of immediately carrying out the recording and reproduction even with respect to an unformatted optical disc has been proposed in a Japanese Laid-Open Patent Application No. 11-134799, for example. According to this proposed information recording and reproducing apparatus, predetermined information is recorded in a lead-in region when a formatting request is received from a host unit, and recording and reproduction enable information is thereafter notified to the host unit, so as to start the formatting. If a recording or reproducing request is received from the host unit during the formatting, the formatting is interrupted, and the recording or reproduction is carried out with a priority over the formatting. The formatting is resumed when the recording or reproduction ends.

Such a method of carrying out the formatting by utilizing the time in which no recording or reproducing request is received from the host unit is often referred to as a background formatting. The background formatting is employed in various optical discs such as the DVD+RW and the CD-RW having the Mount Rainier specifications.

The background formatting enables the optical disc to be ejected from the optical disc drive, even during the formatting. When the optical disc is ejected from the optical disc drive during the formatting, the formatting is not yet completed with respect to the optical disc which is ejected. Hence, when ejecting the optical disc such as the DVD+RW in this case, a so-called Temporary Lead-Out (TLO) is recorded at a predetermined position of the optical disc, so that the information can be reproduced from the ejected optical disc on the DVD-ROM drive or the like, that is, so that compatibility may be maintained between the DVD+RW and the DVD-ROM.

For example, when the DVD+RW drive receives a write request to write user data with respect to the DVD+RW which is recorded with the TLO described above, the user data is recorded in the specified recording region. However, if an unrecorded region exists between the TLO and a recording start address, the background formatting is automatically resumed after recording the user data.

Recently, various portable information processing apparatuses have been proposed, including lap-top (notebook type) personal computers and palm-top (sub-notebook type) personal computers, which are compact, light-weight and easy to carry. One of the characterizing features of the portable information processing apparatus is the ability to operate under various operating conditions, and in order to do so, an AC power supply and a battery can be used as a driving power supply of the portable information processing apparatus.

When the portable personal computer having a built-in optical disc drive is driven by the battery, the optical disc drive is also driven by this battery. For this reason, when the background formatting is automatically resumed as described above, the power supply may be shut down during the background formatting due to insufficient amount of power (capacity) remaining in the battery. In addition, the automatically resumed background formatting may consume a considerably larger amount of power of the battery than expected, thereby making it impossible for the user to carry out a desired process using the remaining amount of power of the battery. In a worst case, the file information may not be recorded correctly on the optical disc, and it may become impossible to reproduce the file or additionally write to the file.

SUMMARY OF THE INVENTION

Accordingly, it is a general object of the present invention to provide an information recording method, information recording apparatus, information processing apparatus, information recording system and computer-readable storage medium, in which the problems described above are eliminated.

Another and more specific object of the present invention is to provide an information recording method, an information recording apparatus, an information processing apparatus, an information recording system and a computer-readable storage medium, which can suppress wear of a driving power supply due to a large power consumption, and to promote effective utilization of the driving power supply.

Still another object of the present invention is to provide an information recording method for recording information in an information recording medium, comprising a first step acquiring driving power supply information related to a driving power supply of an information recording apparatus which records information in the information recording medium, in response to a request for a process which accompanies recording of dummy data in the information recording medium; and a second step determining whether to permit or prohibit the process which accompanies recording of the dummy data in the information recording medium, based on the driving power supply information. According to the information recording method of the present invention, it is possible to suppress wear of the driving power supply due to a large power consumption, and to promote effective utilization of the driving power supply.

Normally, the recording process of the information recording apparatus consumes a larger power than the reproducing process. In addition, the process which accompanies recording of the dummy data, in general, requires an extremely long processing time when compared to other processes. In other words, in the process which accompanies recording of the dummy data, the amount of power consumption may become much larger than anticipated. In the present invention, the process which accompanies recording of the dummy data is prohibited when the capacity of the driving power supply of the information recording apparatus is finite or limited, for example, so as to prevent the driving power supply from wearing out suddenly or shutting down unexpectedly.

A further object of the present invention is to provide an information recording apparatus for recording information in an information recording medium, comprising communication control means for controlling a communication between the information recording apparatus and an external apparatus; power supply information acquiring means for acquiring driving power supply information which is related to a driving power supply from the external apparatus, in response to a request for a process which accompanies recording of dummy data in the information recording medium received from the external apparatus via the communication control means; determination means for determining whether to permit or prohibit the process which accompanies recording of the dummy data, based on the driving power supply information which is acquired by the power supply information acquiring means; and recording control means for carrying out the process which accompanies recording of the dummy data, only when the determination means determines to permit the process which accompanies recording of the dummy data. According to the information recording apparatus of the present invention, it is possible to suppress wear of the driving power supply due to a large power consumption, and to promote effective utilization of the driving power supply.

Another object of the present invention is to provide an information processing apparatus accessible to an information recording medium, comprising power supply information acquiring means for acquiring driving power supply information which is related to a driving power supply, in response to a request for a process which accompanies recording of dummy data in the information recording medium; and determination means for determining whether to permit or prohibit the process which accompanies recording of the dummy data, based on the driving power supply information which is acquired by the power supply information acquiring means. According to the information processing apparatus of the present invention, it is possible to suppress wear of the driving power supply due to a large power consumption, and to promote effective utilization of the driving power supply.

Still another object of the present invention is to provide an information recording system for recording information in an information recording medium, comprising an information processing apparatus comprising power supply information acquiring means for acquiring driving power supply information which is related to a driving power supply, in response to a request for a process which accompanies recording of dummy data in the information recording medium, and determination means for determining whether to permit or prohibit the process which accompanies recording of the dummy data, based on the driving power supply information which is acquired by the power supply information acquiring means; and an information recording apparatus recording the information in the information recording medium in response to an instruction from the information processing apparatus. According to the information recording system of the present invention, it is possible to suppress wear of the driving power supply due to a large power consumption, and to promote effective utilization of the driving power supply.

A further object of the present invention is to provide an information recording system for recording information in an information recording medium, comprising an information recording apparatus comprising communication control means for controlling a communication between the information recording apparatus and an external apparatus, power supply information acquiring means for acquiring driving power supply information which is related to a driving power supply from the external apparatus, in response to a request for a process which accompanies recording of dummy data in the information recording medium received from the external apparatus via the communication control means, determination means for determining whether to permit or prohibit the process which accompanies recording of the dummy data, based on the driving power supply information which is acquired by the power supply information acquiring means, and recording control means for carrying out the process which accompanies recording of the dummy data, only when the determination means determines to permit the process which accompanies recording of the dummy data; and an information processing apparatus controlling the information recording apparatus. According to the information recording system of the present invention, it is possible to suppress wear of the driving power supply due to a large power consumption, and to promote effective utilization of the driving power supply.

Another object of the present invention is to provide a computer-readable storage medium storing a program which causes a computer of an information processing apparatus to record information in an information recording medium by forming an information recording system together with an information recording apparatus, the program comprising a first procedure causing the computer to acquire driving power supply information related to a driving power supply of the information recording systems, in response to a request for a process which accompanies recording of dummy data in the information recording medium; and a second procedure causing the computer to determine whether to permit or prohibit the process which accompanies recording of the dummy data in the information recording medium, based on the driving power supply information. According to the computer-readable storage medium of the present invention, it is possible to suppress wear of the driving power supply due to a large power consumption, and to promote effective utilization of the driving power supply.

Still another object of the present invention is to provide a computer-readable storage medium storing a program which causes a computer of an information recording apparatus to record information in an information recording medium by forming an information recording system together with an information processing apparatus, the program comprising a first procedure causing the computer to acquire driving power supply information which is related to a driving power supply of the information recording system from the information processing apparatus, in response to a request for a process which accompanies recording of dummy data in the information recording medium; a second procedure causing the computer to determine whether to permit or prohibit the process which accompanies recording of the dummy data, based on the driving power supply information; and a third procedure causing the computer to carry out the process which accompanies recording of the dummy data only when permitted as a result of the determination made by the second procedure. According to the computer-readable storage medium of the present invention, it is possible to suppress wear of the driving power supply due to a large power consumption, and to promote effective utilization of the driving power supply.

A further object of the present invention is to provide an information recording method for recording information in an information recording medium, comprising a first step acquiring driving power supply information which is related to a driving power supply, when recording of dummy data in the information recording medium is started; and a second step determining whether to continue or discontinue the recording of the dummy data, based on the driving power supply information. According to the information recording method of the present invention, it is possible to suppress wear of the driving power supply due to a large power consumption, and to promote effective utilization of the driving power supply.

Normally, the recording process of the information recording apparatus consumes a larger power than the reproducing process, and the amount of power supplied to the light source increases in the case of the recording process. In addition, the amount of power consumption may become much larger than anticipated when recording the dummy data, because the amount of dummy data is generally large compared to the amount of user data which are recorded. In the present invention, the recording of the dummy data is discontinued when the capacity of the driving power supply of the information recording apparatus is finite or limited, for example, so as to prevent the driving power supply from wearing out suddenly or shutting down unexpectedly.

Another object of the present invention is to provide an information recording apparatus for recording information in an information recording medium, comprising power supply information acquiring means for acquiring driving power supply information which is related to a driving power supply, when recording of dummy data in the information recording medium is started; determination means for determining whether to continue or discontinue the recording of the dummy data, based on the driving power supply information which is acquired by the power supply information acquiring means; and recording control means for recording the dummy data in the information recording medium only when the determination means determines to continue the recording of the dummy data. According to the information recording apparatus of the present invention, it is possible to suppress wear of the driving power supply due to a large power consumption, and to promote effective utilization of the driving power supply.

Still another object of the present invention is to provide an information processing apparatus accessible to an information recording medium via an information recording apparatus, comprising power supply information acquiring means for acquiring driving power supply information which is related to a driving power supply, in response to a start of recording of dummy data in the information recording medium; and determination means for determining whether to continue or discontinue the recording of the dummy data based on the driving power supply information which is acquired by the power supply information acquiring means. According to the information processing apparatus of the present invention, it is possible to suppress wear of the driving power supply due to a large power consumption, and to promote effective utilization of the driving power supply.

Another object of the present invention is to provide an information processing apparatus accessible to an information recording medium via an information recording apparatus, comprising power supply information acquiring means for acquiring driving power supply information which is related to a driving power supply, in response to a request to record dummy data in the information recording medium; determination means for determining whether to permit or prohibit the recording of the dummy data based on the driving power supply information which is acquired by the power supply information acquiring means; and issuing means for issuing a command requesting the recording of the dummy data in the information recording medium only when the recording of the dummy data is permitted as a result of a determination made by the determination means. According to the information processing apparatus of the present invention, it is possible to suppress wear of the driving power supply due to a large power consumption, and to promote effective utilization of the driving power supply.

Still another object of the present invention is to provide an information recording system for recording information in an information recording medium, comprising an information processing apparatus including issuing means for periodically monitoring a remaining amount of power of a battery which forms a driving power supply during recording of the dummy data in the information recording medium, and issuing a command requesting discontinuance of the recording of the dummy data when the remaining amount of power of the battery is less than or equal to a predetermined amount; and an information recording apparatus including discontinuing means for carrying a discontinuing process which discontinues the recording of the dummy data when the command requesting the discontinuance of the recording of the dummy data is received during the recording of the dummy data in the information recording medium. According to the information recording system of the present invention, it is possible to suppress wear of the driving power supply due to a large power consumption, and to promote effective utilization of the driving power supply.

A further object of the present invention is to provide an information recording system for recording information in an information recording medium, comprising an information processing apparatus comprising power supply information acquiring means for acquiring driving power supply information which is related to a driving power supply, in response to a start of recording of dummy data in the information recording medium; and determination means for determining whether to continue or discontinue the recording of the dummy data based on the driving power supply information which is acquired by the power supply information acquiring means; and an information recording apparatus recording the information in the information recording medium in response to an instruction from the information processing apparatus. According to the information recording system of the present invention, it is possible to suppress wear of the driving power supply due to a large power consumption, and to promote effective utilization of the driving power supply.

Another object of the present invention is to provide an information recording system for recording information in an information recording medium, comprising an information recording apparatus comprising power supply information acquiring means for acquiring driving power supply information which is related to a driving power supply, when recording of dummy data in the information recording medium is started; determination means for determining whether to continue or discontinue the recording of the dummy data, based on the driving power supply information which is acquired by the power supply information acquiring means; and recording control means for recording the dummy data in the information recording medium only when the determination means determines to continue the recording of the dummy data; and an information processing apparatus controlling the information recording apparatus. According to the information recording system of the present invention, it is possible to suppress wear of the driving power supply due to a large power consumption, and to promote effective utilization of the driving power supply.

Still another object of the present invention is to provide a computer-readable storage medium storing a program to be executed by a computer of an information processing apparatus which forms an information recording system together with an information recording apparatus, the program comprising a first procedure causing the computer to acquire driving power supply information which is related to a driving power supply in response to a notification from the information recording apparatus indicating a start of a recording of dummy data in an information recording medium; and a second procedure causing the computer to determine whether to continue or discontinue the recording of the dummy data based on the driving power supply information. According to the computer-readable storage medium of the present invention, it is possible to suppress wear of the driving power supply due to a large power consumption, and to promote effective utilization of the driving power supply.

A further object of the present invention is to provide a computer-readable storage medium storing a program to be executed by a computer of an information processing apparatus which forms an information recording system together with an information recording apparatus, the program comprising a first procedure causing the computer to acquire driving power supply information which is related to a driving power supply, in response to a request to record dummy data in an information recording medium; a second procedure causing the computer to determine whether to permit or prohibit the recording of the dummy data based on the driving power supply information; and a third procedure causing the computer to issue a command requesting the recording of the dummy data in the information recording medium only when the recording of the dummy data is permitted as a result of a determination made by the second procedure. According to the computer-readable storage medium of the present invention, it is possible to suppress wear of the driving power supply due to a large power consumption, and to promote effective utilization of the driving power supply.

Another object of the present invention is to provide a computer-readable storage medium storing a program to be executed by a computer of an information recording apparatus which forms an information recording system together with an information processing apparatus, the program comprising a first procedure causing the computer to acquire driving power supply information which is related to a driving power supply during recording of dummy data in an information recording medium; a second procedure causing the computer to determine whether to continue or discontinue the recording of the dummy data based on the driving power supply information; and a third procedure causing the computer to record the dummy data only when continuance of the recording of the dummy data is determined as a result of a determination made by the second procedure. According to the computer-readable storage medium of the present invention, it is possible to suppress wear of the driving power supply due to a large power consumption, and to promote effective utilization of the driving power supply.

Still another object of the present invention is to provide an information recording method for recording information in an information recording medium, comprising a first step selecting a mode from a plurality of modes at least including a mode which permits recording of dummy data in the information recording medium and a mode which prohibits recording of the dummy data in the information recording medium; and a second step carrying out a process based on the selected mode, in response to a request for a process which accompanies recording of the dummy data in the information recording medium. According to the information recording method of the present invention, it is possible to suppress wear of the driving power supply due to a large power consumption, and to promote effective utilization of the driving power supply.

Normally, the recording process of the information recording apparatus consumes a larger power than the reproducing process, and the amount of power supplied to the light source increases in the case of the recording process. In addition, the amount of power consumption may become much larger than anticipated when recording the dummy data, because the amount of dummy data is generally large compared to the amount of user data which are recorded. In the present invention, a mode is provided to prohibit the recording of the dummy data when the capacity of the driving power supply of the information recording apparatus is finite or limited, for example, so as to prevent the driving power supply from wearing out suddenly or shutting down unexpectedly.

A further object of the present invention is to provide an information recording apparatus for recording information in an information recording medium, comprising mode selecting means for selecting a mode from a plurality of modes at least including a mode which permits recording of dummy data in the information recording medium and a mode which prohibits recording of the dummy data in the information recording medium; and processing means for carrying out a process based on the selected mode, in response to a request for a process which accompanies recording of the dummy data in the information recording medium. According to the information recording apparatus of the present invention, it is possible to suppress wear of the driving power supply due to a large power consumption, and to promote effective utilization of the driving power supply.

Another object of the present invention is to provide an information recording system for recording information in an information recording medium, comprising an information recording apparatus comprising mode selecting means for selecting a mode from a plurality of modes at least including a mode which permits recording of dummy data in the information recording medium and a mode which prohibits recording of the dummy data in the information recording medium; and processing means for carrying out a process based on the selected mode, in response to a request for a process which accompanies recording of the dummy data in the information recording medium; and an information processing apparatus controlling the information recording apparatus. According to the information recording system of the present invention, it is possible to suppress wear of the driving power supply due to a large power consumption, and to promote effective utilization of the driving power supply.

Still another object of the present invention is to provide a computer-readable storage medium storing a program for causing a computer of an information recording apparatus to record information in an information recording medium, the program comprising a first procedure causing the computer to select a mode from a plurality of modes at least including a mode which permits recording of dummy data in the information recording medium and a mode which prohibits recording of the dummy data in the information recording medium; and a second procedure causing the computer to carry out a process based on the selected mode, in response to a request for a process which accompanies recording of the dummy data in the information recording medium. According to the computer-readable storage medium of the present invention, it is possible to suppress wear of the driving power supply due to a large power consumption, and to promote effective utilization of the driving power supply.

A further object of the present invention is to provide a computer-readable storage medium storing a program for causing an information processing apparatus which forms an information recording system together with an information recording apparatus which records information in an information recording medium, the program comprising a first procedure causing the computer to display information related to a plurality of modes at least including a mode which permits recording of dummy data in the information recording medium and a mode which prohibits recording of the dummy data in the information recording medium; and a second procedure causing the computer to notify a mode selected from the plurality of modes to the information recording apparatus. According to the computer-readable storage medium of the present invention, it is possible to suppress wear of the driving power supply due to a large power consumption, and to promote effective utilization of the driving power supply.

Other objects and further features of the present invention will be apparent from the following detailed description when read in conjunction with the accompanying drawings.

BRIEF DESCRIPTION OF THE DRAWINGS

FIG. 3 is a diagram for explaining a format of a Time-Out and Protect Page in the first embodiment of the information recording system;

FIGS. 10A and 10B are diagrams for explaining the structure of the recording region of the optical disc in conformance with the DVD+RW standards;

FIG. 11 is a diagram for explaining a Media Event Code;

FIG. 23 is a diagram for explaining a format of a Time-Out and Protect Page in the fifth embodiment of the information recording system;

FIG. 28 is a diagram for explaining a Type Dependent Parameter added to the formatting request command.

DESCRIPTION OF THE PREFERRED EMBODIMENTS

First, a description will be given of a first embodiment of an information recording system according to the present invention, by referring to FIGS. 1 through 8. This first embodiment of the information recording system employs a first embodiment of an information recording method according to the present invention, a first embodiment of an information recording apparatus according to the present invention, a first embodiment of an information processing apparatus according to the present invention, and a first embodiment of a computer-readable storage medium according to the present invention.

Figure 1:
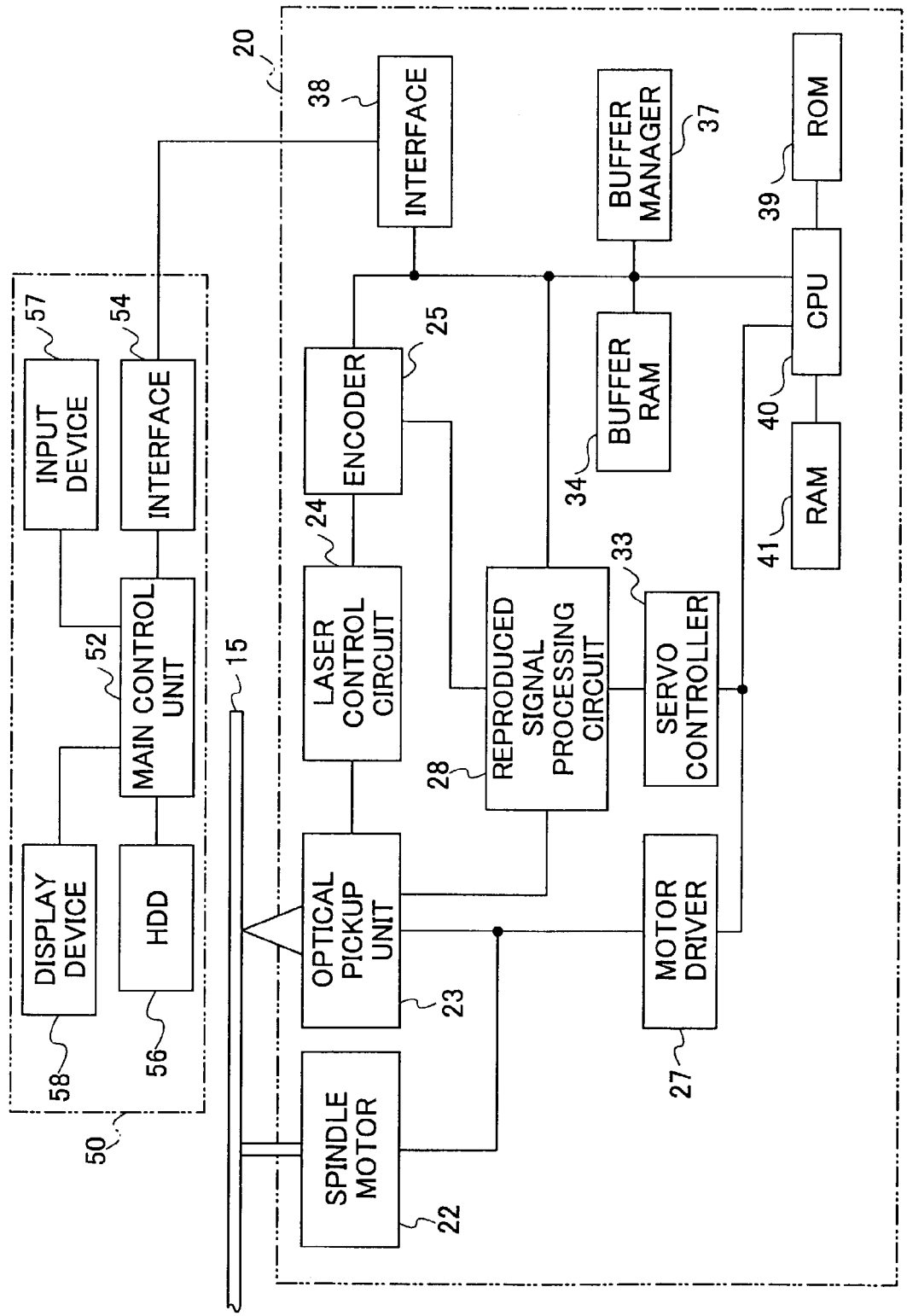
FIG. 1 is a system block diagram showing a first embodiment of an information recording system according to the present invention.

FIG. 1 is a system block diagram showing a general structure of the first embodiment of the information recording system according to the present invention. The information recording system shown in FIG. 1 generally includes an optical disc drive 20 and a host unit 50. The optical disc drive 20 forms the first embodiment of the information recording apparatus. The host unit 50 forms the first embodiment of the information processing apparatus which controls the optical disc drive 20.

The optical disc drive 20 includes a spindle motor 22, an optical pickup unit 23, a laser control circuit 24, an encoder 25, a motor driver 27, a reproduced signal processing circuit 28, a servo controller 33, a buffer RAM 34, a buffer manager 37, an interface 38, a ROM 39, a CPU 40 and a RAM 41. An optical disc 15 is used as an information recording medium, and the spindle motor 22 rotates the optical disc 15.

In FIG. 1, only typical connecting lines are shown to indicate the flow of typical signals and information. In other words, not all of the connecting lines are shown in FIG. 1 so as to simplify the drawing. Moreover, it is assumed for the sake of convenience that the optical disc 15, which is used as the information recording medium, is in conformance with the DVD+RW standards. Furthermore, it is assumed for the sake of convenience that a driving power for the optical disc drive 20 is supplied from the host unit 50. In other words, the optical disc drive 20 and the host unit 50 are driven by the same driving power supply.

The optical pickup unit 23 has a known structure including a semiconductor laser (not shown) which functions as a light source, an optical system (not shown) which guides a light beam emitted from the semiconductor laser on a recording surface of the optical disc 15 and guides a reflected light beam from the recording surface to a predetermined light receiving position, a light receiving unit (not shown) which receives the reflected light beam, and a driving system (not shown) which includes a focusing actuator, a tracking actuator and a seek motor. A current (current signal) depending on an amount of light received by the light receiving unit is supplied to the reproduced signal processing circuit 28 from the light receiving unit.

The reproduced signal processing circuit 28 converts the current signal output from the optical pickup unit 23 into a voltage signal, and detects a wobble signal, an RF signal and servo signals based on the voltage signal. The servo signals include a focus error signal and a tracking error signal. The reproduced signal processing circuit 28 extracts Address In Pre-groove (ADIP) information and a synchronizing signal from the wobble signal. The extracted ADIP information is supplied to the CPU 40, and the extracted synchronizing signal is supplied to the encoder 25. Furthermore, the reproduced signal processing circuit 28 carries out an error correction process with respect to the RF signal, before storing the RF signal in the buffer RAM via the buffer manager 37. The reproduced signal processing circuit 27 also supplies the focus error signal and the tracking error signal to the servo controller 33.

The servo controller 33 generates a control signal for controlling the focusing actuator of the optical pickup unit 23, based on the focus error signal. In addition, the servo controller 33 generates a control signal for controlling the tracking actuator of the optical pickup unit 23, based on the tracking error signal. The control signals generated from the servo controller 33 are supplied to the motor driver 27.

The buffer manager 37 manages input and output of data to and from the buffer RAM 34. The buffer manager 37 notifies the CPU 40 when an amount of data stored in the buffer RAM 34 reaches a predetermined amount.

The motor driver 27 drives the focusing actuator and the tracking actuator of the optical pickup unit 23, based on the control signals supplied from the servo controller 33. The motor driver 27 also controls the spindle motor 22 so that the linear velocity of the optical disc 15 becomes constant, based on an instruction from the CPU 40. Further, the motor driver 27 drives the seek motor of the optical pickup unit 23 based on an instruction from the CPU 40, and controls a position of the optical pickup unit 23 in a sledge direction, that is, a radial direction of the optical disc 15.

The encoder 25 adds an error correction code to the data read from the buffer RAM 34 via the buffer manager 37, based on an instruction from the CPU 40, so as to create write data to the written on the optical disc 15. Moreover, the encoder 25 supplies the write data to the laser control circuit 24 in synchronism with the synchronizing signal from the reproduced signal processing circuit 28.

The laser control circuit 24 controls an output of the semiconductor laser of the optical pickup unit 23, based on the write data from the encoder 25 and an instruction from the CPU 40. In addition, while the semiconductor laser emits light, the laser control circuit 24 carries out a feedback control with respect to the output of the semiconductor laser, based on an output signal of a monitor (or light receiving unit, not shown) provided within the optical pickup unit 23 indicating an amount of light emitted from the semiconductor laser.

The interface 38 provides a bidirectional communication interface between the host unit 50 and the optical disc drive 20. The interface 38 is in conformance with a standard interface such as the AT Attachment Packet Interface (ATAPI) and the Small Computer System Interface (SCSI).

The ROM 39 stores programs written in codes decodable by the CPU 40, including a recording control program which is used depending on a request for a process accompanying recording of dummy data which will be described later. When the driving power supply of the optical disc drive 20 is turned ON, the programs including the recording control program are read from the ROM 39 and loaded into a main memory (not shown). The CPU 40 controls operations of various parts within the optical disc drive 20 and temporarily stores in the RAM 41 data and the like which are necessary for this control, according to the recording control program.

The host unit 50 includes a main control unit 52, an interface 54, a Hard Disc Drive (HDD) 56, an input device 57, and a display device 58. An AC power supply (not shown) and a battery (not shown) may be used as the driving power supply of the host unit 50. The user can thus select the AC power supply or the battery as the driving power supply of the host unit 50.

The main control unit 52 includes a microcomputer (not shown) and a main memory (not shown), and controls the general operation of the host unit 50.

The interface 54 provides a bidirectional communication interface between the optical disc drive 20 and the host unit 50. The interface 54 is in conformance with a standard interface such as the ATAPI and the SCSI. The interface 54 is connected to the interface 38 of the optical disc drive 20. The interfaces 54 and 38 may be connected by a cable connection using a communication line such as a communication cable (for example, a SCSI cable) or, by a wireless connection using an infrared ray.

One or a plurality of hard discs of the HDD 56 store programs written in codes decodable by the microcomputer of the main control unit 52, including a recording determination program which is used depending on the request for the process accompanying the recording of the dummy data which will be described later. When the driving power supply of the host unit 50 is turned ON, the programs including the recording determination program are read from the hard disc of the HDD 56 and loaded into the main memory of the main control unit 52.

For example, the display device 58 includes a display section (not shown) such as a CRT, a Liquid Crystal Display (LCD) and a Plasma Display Panel (PDP) for displaying various information received from the main control unit 52.

The input device 57 includes at least one input medium (not shown) which is selected from a keyboard, a mouse and a pointing device, and is used by the user to input various information to the main control unit 52. The information from the input medium may be input by a wireless system. In addition, the display device 58 and the input device 57 may be integrally provided, as in the case of a CRT having a touch panel, for example.

The host unit 50 is operated by an Operating System (OS), and all of the devices forming the host unit 50 are managed by the OS. Hence, information related to the driving power supply of the host unit 50, including information related to the kind of power supply and the remaining amount of power (capacity) of the battery, is centrally managed by the OS.

In the information recording system having the structure described above, when the optical disc 15 is loaded into a predetermined position within the optical disc drive 20, the optical disc drive 20 sets, in a Media Event Code, load information which indicates that a new recording medium is loaded, and sends to the host unit 50 a Get Event Status Notification Command which notifies the event status.

Figure 2:
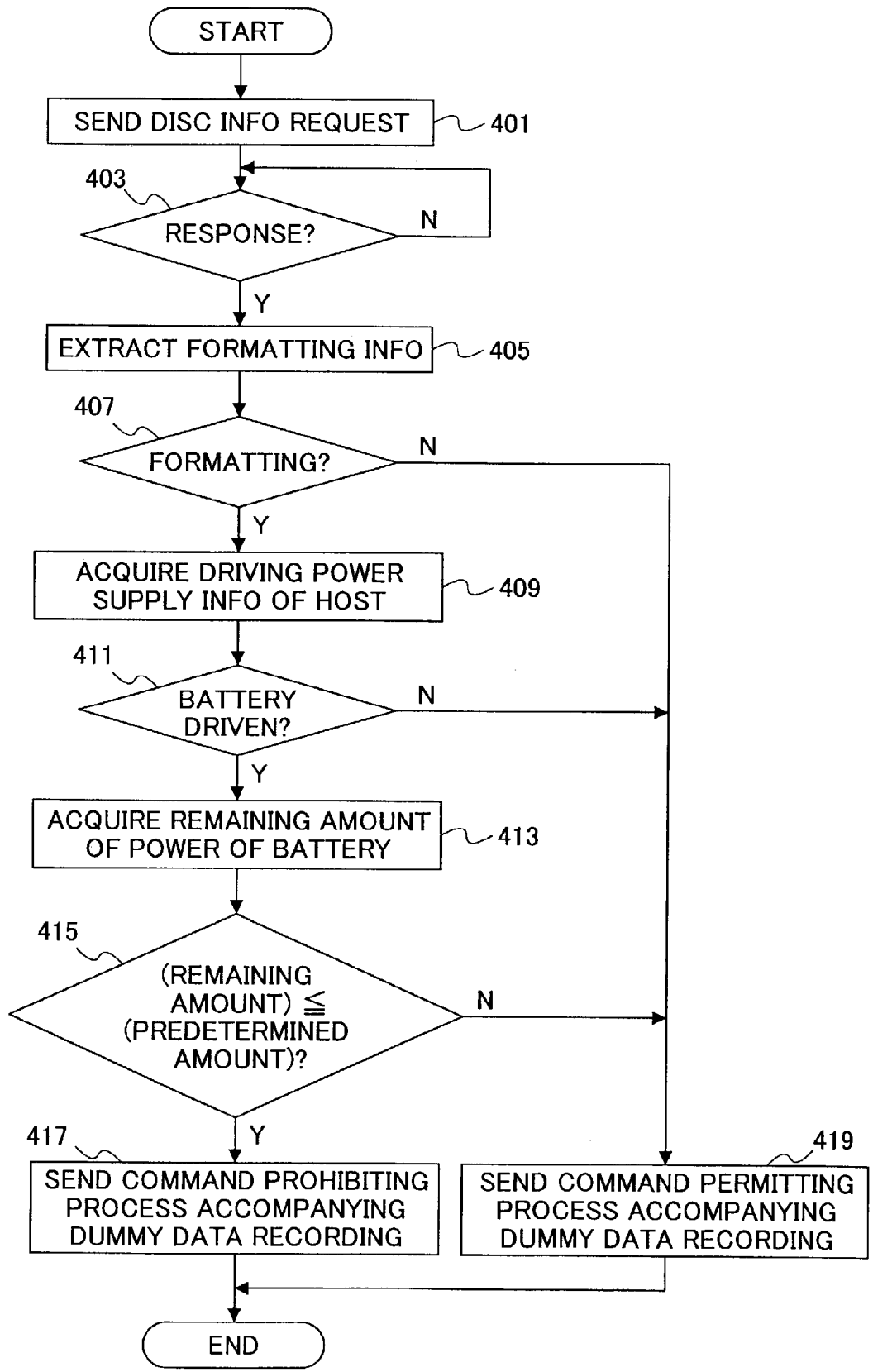
FIG. 2 is a flow chart for explaining a process of permitting or prohibiting a process accompanying recording of dummy data in the first embodiment of the information recording system.

A description will be given of a process of the host unit 50 which receives the load information from the optical disc drive 20, by referring to FIG. 2. FIG. 2 is a flow chart for explaining the process of permitting or prohibiting a process accompanying recording of dummy data in the first embodiment of the information recording system. When the host unit 50 receives the load information, a start address of a program corresponding to the flow chart shown in FIG. 2 is set in a program counter of the microcomputer of the main control unit 52, and algorithms corresponding to the flow chart shown in FIG. 2 are started. The flow chart shown in FIG. 2 corresponds to a series of processing algorithms executed by the microcomputer of the main control unit 52.

First, a step 401 shown in FIG. 2 sends to the optical disc drive 20 a Read Disc Information Command which requests disc information, in order to find out a formatting status of the optical disc 15. When the optical disc drive 20 receives the Read Disc Information Command from the host unit 50, the optical disc drive 20 sets predetermined disc information in a Disc Information block, and makes a response to the host unit 50.

A step 403 waits for a response from the optical disc drive 20. More particularly, the step 403 decides whether or not a response is received from the optical disc drive 20 in response to the Read Disc Information Command, and the process advances to a step 405 if the decision result in the step 403 is YES.

The step 405 extracts format information, that is, Background Format Status, from the received Disk Information Block. A step 407 decides whether or not the formatting of the optical disc 15 is still in progress (that is, not yet completed). If the formatting of the optical disc 15 is still in progress and the decision result in the step 407 is YES, the process advances to a step 409.

The step 409 makes an inquiry to the OS to acquire driving power supply information of the host unit 50, and obtains the kind of driving power supply based on the driving power supply information. A step 411 decides whether or not the driving power supply is a battery. The process advances to a step 413 if the decision result in the step 411 is YES.

The step 413 acquires a remaining amount of power (remaining capacity) of the battery, based on the driving power supply information. A step 415 decides whether or not the remaining amount of power of the battery is less than or equal to a predetermined amount. The predetermined amount may be set and changed arbitrarily by the user. The process advances to a step 417 if the decision result in the step 415 is YES.

The step 417 sends to the optical disc drive 20 a command prohibiting the process accompanying the recording of the dummy data. More particularly, the step 417 sets "1" to a fourth bit (bit 3) of a fifth byte (byte 4) of a Time-Out and Protect Page which is one of Mode Pages added to a Mode Select Command shown in FIG. 3, and sends the Mode Select Command to the optical disc drive 20. FIG. 3 is a diagram for explaining a format of the Time-Out and Protect Page in the first embodiment of the information recording system. The process shown in FIG. 2 ends after the step 417.

The bit position corresponding to the fourth bit (bit 3) of the fifth byte (byte 4) of the Time-Out and Protect Page is conventionally a reserved region. Hence, in this first embodiment, this bit position is newly defined as a Format Protect (FP) bit. The process accompanying the recording of the dummy data is prohibited when this FP bit is "1", and the process accompanying the recording of the dummy data is permitted when this FP bit is "0". When the optical disc drive 20 receives the Mode Select Command from the host unit 50, the optical disc drive 20 extracts the FP bit and stores the FP bit in the RAM 41 as dummy recording prohibit/permit information DF.

If the decision result in the step 407 is NO, the process advances to a step 419.

The step 419 sends to the optical disc drive 20 a command permitting the process accompanying the recording of the dummy data. More particularly, the step 419 sets the FP bit to "0", and sends the Mode Select Command. The process shown in FIG. 2 ends after the step 419. When the optical disc drive 20 receives the Mode Select Command from the host unit 50, the optical disc drive 20 extracts the FP bit and stores the FP bit in the RAM 41 as the dummy recording prohibit/permit information DF.

On the other hand, if the decision result in the step 411 is NO, the process also advances to the step 419, and the process accompanying the recording of the dummy data is permitted. Furthermore, the process also advances to the step 419 if the decision result in the step 415 is NO, and the process accompanying the recording of the dummy data is permitted.

Figure 4:
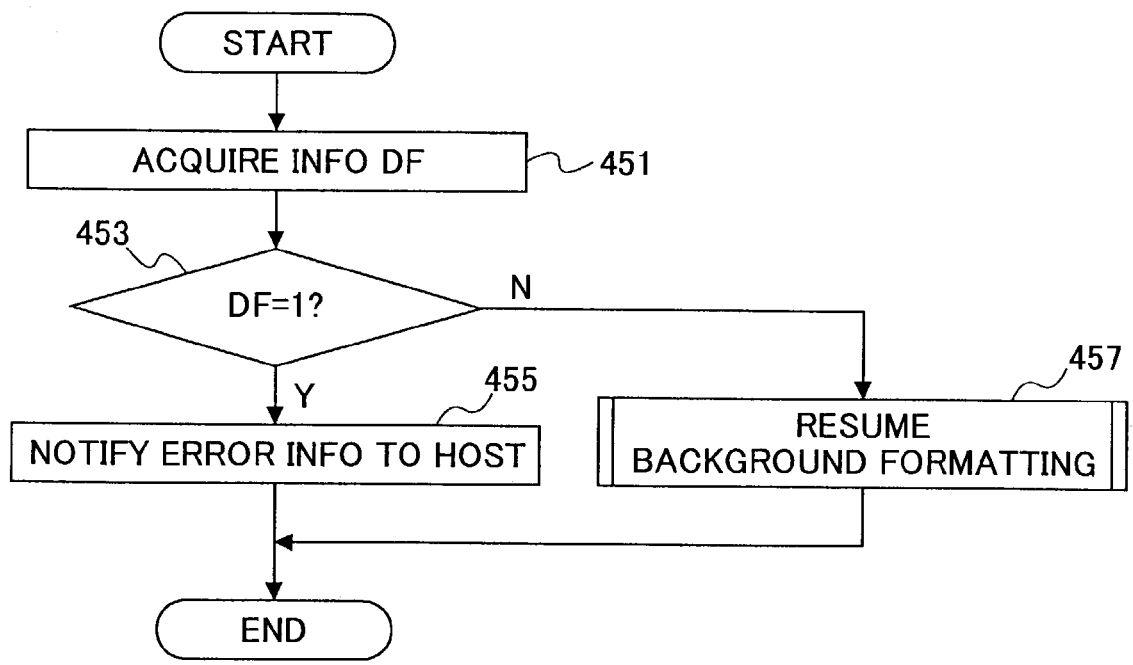
FIG. 4 is a flow chart for explaining a process of an optical disc drive when a command requesting resuming of a background formatting is received.
Figure 5:
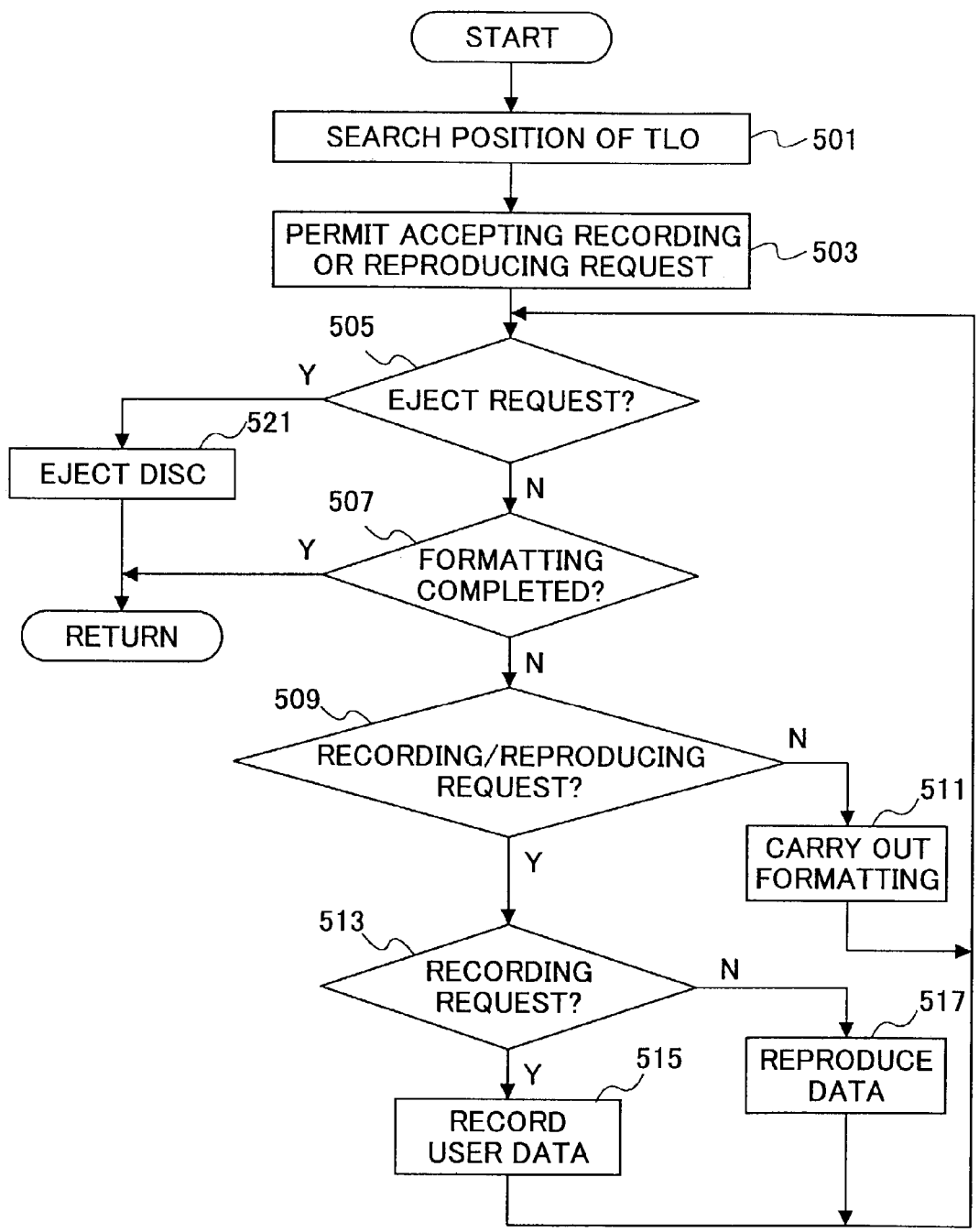
FIG. 5 is a flow chart for explaining details of the background formatting.

Next, a description will be given of a process of the optical disc drive 20 when a Format Unit Command requesting resuming of the background formatting is received, by referring to FIGS. 4 and 5. FIG. 4 is a flow chart for explaining the process of the optical disc drive 20 when the Format Unit Command requesting the resuming of the background formatting is received, and FIG. 5 is a flow chart for explaining details of the background formatting. When the optical disc drive 20 receives the Format Unit Command, a start address of a program corresponding to the flow chart shown in FIG. 4 is set in a program counter of the CPU 40, and algorithms corresponding to the flow chart shown in FIG. 4 are started. The flow charts shown in FIGS. 4 and 5 correspond to a series of processing algorithms executed by the microcomputer of the CPU 40.

A step 451 shown in FIG. 4 reads the dummy recording prohibit/permit information DF stored in the RAM 41. A step 453 decides whether or not the process accompanying the recording of the dummy data is prohibited, based on the dummy recording prohibit/permit information DF. If the dummy recording prohibit/permit information DF is "1", the process accompanying the recording of the dummy data is prohibited, and the decision result in the step 453 is YES. The process advances to a step 455 if the decision result in the step 453 is YES.

The step 455 sends to the host unit 50 error information which is set with an error code indicating that the background formatting cannot be resumed. The process shown in FIG. 4 ends after the step 455.

On the other hand, if the dummy recording prohibit/permit information DF is "0" and the process accompanying the recording of the dummy data is permitted, the decision result in the step 453 is NO, and the process advances to a step 457.

The step 457 carries out a subroutine for resuming the background formatting. In other words, a start address of a program corresponding to the flow chart shown in FIG. 5 is set in the program counter of the CPU 40, and algorithms corresponding to the flow chart shown in FIG. 5 are started.

First, a step 501 shown in FIG. 5 refers to a Formatting Disc Control Block (FDCB) recorded in a lead-in region of the optical disc 15 and searches for the position of the TLO. The address where the TLO is recorded is regarded as a start address of the formatting. Then, a step 503 notifies the host unit 50 that the optical disc drive 20 can accept a recording or reproducing request.

A step 505 decides whether or not an optical disc eject request requesting ejection of the optical disc 15 is received. When a disc eject button (not shown) provided on the optical disc drive 20 is pushed, the eject request is notified to the CPU 40 by an interrupt process. The eject request may also be received from the host unit 50, and in this case, the eject request is also notified to the CPU 40 by an interrupt process. If no eject request is received, the decision result in the step 505 is NO, and the process advances to a step 507.

The step 507 decides whether or not the formatting is completed. If the decision result in the step 507 is NO, a step 509 decides whether or not a recording/reproducing (recording or reproducing) request is received from the host unit 50. If a Write Command requesting the recording or a Read Command requesting the reproduction is received from the host unit 50, the recording/reproducing request is notified to the CPU 40 by an interrupt process. If no recording/reproducing request is received and the decision result in the step 509 is NO, the process advances to a step 511.

The step 511 carries out the formatting of the optical disc 15. In other words, the step 511 records dummy data amounting to 16 sectors, for example, in an unrecorded portion of the user data region. The process returns to the step 505 after the step 511, that is, after the recording of the dummy data ends.

Hence, the steps 505, 507, 509 and 511 are repeated until the decision result becomes YES in one of the steps 505, 507 and 509, and the formatting of the optical disc 15 progresses in this manner.

On the other hand, if the decision result in the step 509 is YES, the process advances to a step 513. The step 513 decides whether or the request from the host unit 50 is the recording request. If the decision result in the step 513 is YES, a step 515 records the user data received from the host unit 50 in a specified region. The details of the recording process of the optical disc drive 20 will be described later in the specification The process returns to the step 505 after the step 515, that is, after the recording of the user data ends.

On the other hand, if the reproducing request is received from the host unit 50 and the decision result in the step 513 is NO, a step 517 reproduces the user data recorded in a region specified from the host unit 50, and transfers the reproduced user data to the host unit 50. The details of the reproducing process of the optical disc drive 20 will be described later in the specification. The process returns to the step 505 after the step 517 ends, that is, after the reproduction of the user data specified from the host unit 50 ends.

The formatting of the optical disc 15 is continued until the decision result becomes YES in one of the steps 505, 507 and 509.

If the eject request is received and the decision result in the step 505 is YES, the process advances to a step 521. The step 521 instructs a disc load/eject system (not shown) to eject the optical disc 15, and the subroutine for resuming the background formatting ends, thereby returning the process to the step 457 shown in FIG. 4. The Lead-Out or the TLO may be recorded at a predetermined position of the optical disc 15 before instructing the disc load/eject system to eject the optical disc 15.

When the formatting of the optical disc 15 is completed before receiving the eject request, information indicating that the formatting is completed is recorded at a predetermined position of the recording region of the optical disc 15, and the background formatting ends. In this case, the subroutine for resuming the background formatting ends, thereby similarly returning the process to the step 457 shown in FIG. 4.

After the process returns to the step 457 shown in FIG. 4 from the subroutine shown in FIG. 5, the process shown in FIG. 4 ends.

Next, a description will be given of the process of the optical disc drive 20 when the recording request (Write Command) is received from the host unit 50.

When the Write Command is received from the host unit 50, the CPU 40 supplies to the motor driver 27 a control signal for controlling the rotation of the spindle motor 22 based on a specified recording speed. In addition, the CPU 40 notifies the reproduced signal processing circuit 28 that the Write Command was received from the host unit 50. The CPU 40 also stores the user data received from the host unit 50 into the buffer RAM 34 via the buffer manager 37.

When the rotation of the optical disc 15 reaches a predetermined linear velocity, the reproduced signal processing circuit 28 detects the focus error signal and the tracking error signal based on the output signal of the optical pickup unit 23, and supplies the focus error signal and the tracking error signal to the servo controller 33. Based on the focus error signal and the tracking error signal from the reproduced signal processing circuit 28, the servo controller 33 drives the focusing actuator and the tracking actuator of the optical pickup unit 23 via the motor driver 27, and corrects the focus error and the tracking error.

The reproduced signal processing circuit 28 acquires the ADIP information based on the output signal of the optical pickup unit 23, and notifies the ADIP information to the CPU 40. Based on the ADIP information, the CPU 40 supplies to the motor driver 27 a signal which instructs a seek operation to the optical pickup unit 23 so that the optical pickup unit 23 is positioned to a specified write start position.

When the CPU 40 is notified from the buffer manager 37 that the amount of data stored in the buffer RAM 34 exceeded a predetermined amount, the CPU 40 instructs the encoder 25 to create write data. In addition, when the CPU 40 judges based on the ADIP information that the optical pickup unit 23 is located at the write start position, the CPU 40 notifies the encoder 25 that the optical pickup unit 23 is at the write start position. The encoder 25 records the write data on the optical disc 15 via the laser control circuit 24 and the optical pickup unit 23.

Next, a description will be given of the process of the optical disc drive 20 when the reproducing request (Read Command) is received from the host unit 50.

When the Read Command is received from the host unit 50, the CPU 40 supplies to the motor driver 27 a control signal for controlling the rotation of the spindle motor 22 based on a reproducing speed. In addition, the CPU 40 notifies the reproduced signal processing circuit 28 that the Read Command was received from the host unit 50.

Similarly as in the case of the process during the recording described above, the reproduced signal processing circuit 28 notifies the ADIP information to the CPU 40, and corrects the focus error and the tracking error.

Based on the ADIP information, the CPU 40 supplies to the motor driver 27 a signal which instructs a seek operation to the optical pickup unit 23 so that the optical pickup unit 23 is positioned to a specified read start position. In addition, when the CPU 40 judges based on the ADIP information that the optical pickup unit 23 is located at the read start position, the CPU 40 notifies the reproduced signal processing circuit 28 that the optical pickup unit 23 is at the read start position.

The reproduced signal processing circuit 28 detects an RF signal based on the output signal of the optical pickup unit 23, and after carrying out the error correction process and the like with respect to the RF signal, stores the processed RF signal in the buffer RAM 34 as reproduced data.

The buffer manager 37 transfers the reproduced data to the host unit 50 via the interface 38 when the reproduced data stored in the buffer RAM 34 amount to sector data.

The reproduced signal processing circuit 28 detects the focus error signal and the tracking error signal based on the output of the optical pickup unit 23 as described above until the recording process or the reproducing process ends. Hence, the reproduced signal processing circuit 28 constantly corrects the focus error and the tracking error via the servo controller 33 and the motor driver 27.

Figure 6:
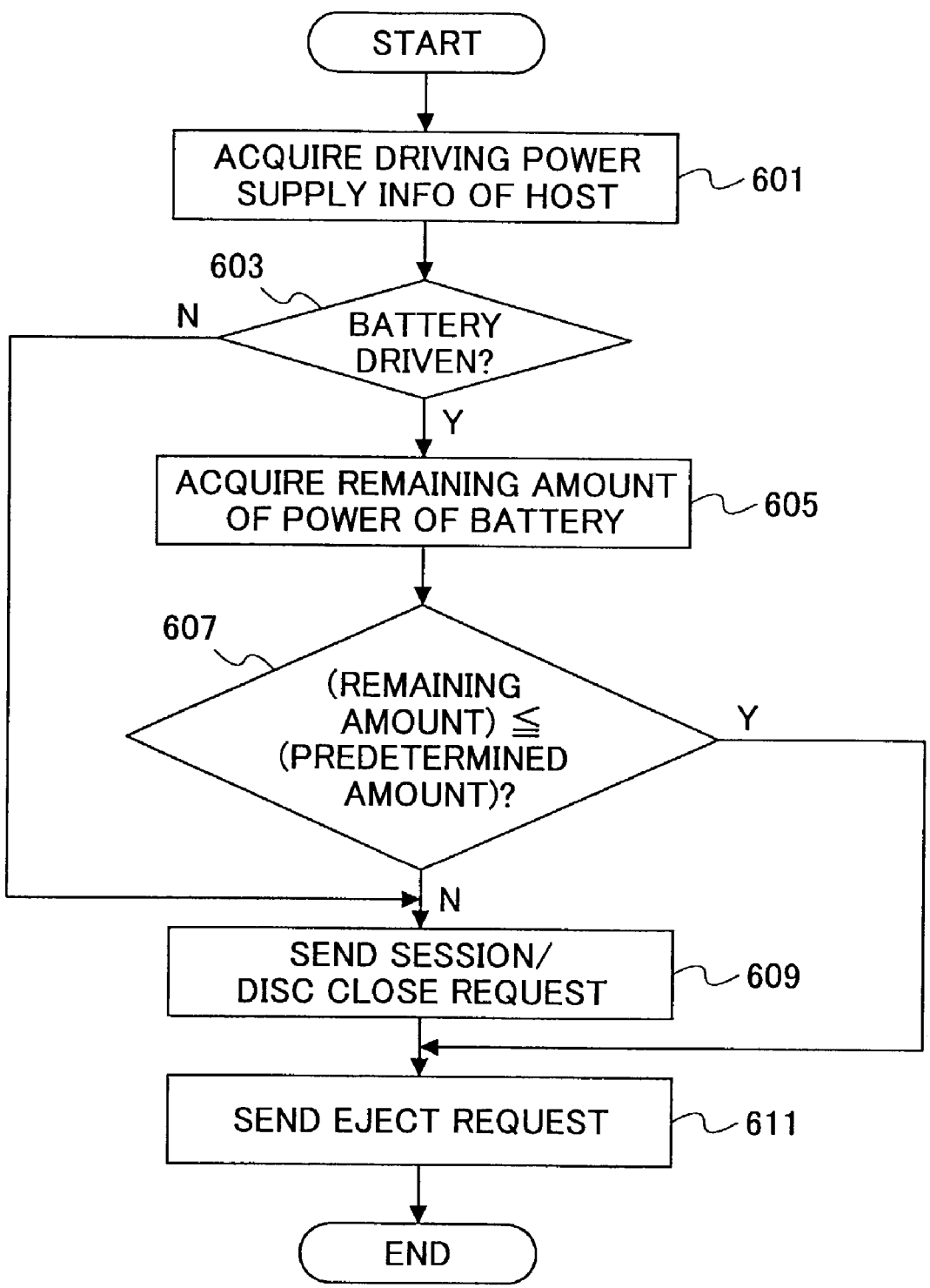
FIG. 6 is a flow chart for explaining a process of a host unit when an optical disc eject request is input.

Next, a description will be given of the process of the host unit 50 when the optical disc eject request to eject the optical disc 15 is input via the input device 57 in the information recording system, by referring to FIG. 6. FIG. 6 is a flow chart for explaining the process of the host unit 50 when the eject request is input. When the eject request is input via the input device 57, a start address of a program corresponding to the flow chart shown in FIG. 6 is set in the program counter of the microcomputer of the main control unit 52, and algorithms corresponding to the flow chart shown in FIG. 6 are started. The flow chart shown in FIG. 6 corresponds to a series of algorithms executed by the microcomputer of the main control unit 52.

A step 601 shown in FIG. 6 makes an inquiry to the OS, and acquires the driving power supply information of the host unit 50. This driving power supply information is used to obtain the kind of driving power supply.

A step 603 decides whether or not the driving power supply is a battery. The process advances to a step 605 if the decision result in the step 603 is YES. The step 605 acquires a remaining amount of power (capacity) of the battery, based on the driving power supply information.

A step 607 decides whether or not the remaining amount of power (capacity) of the battery is less than or equal to a predetermined amount which is set in advance. The process advances to a step 609 if the decision result in the step 607 is NO. The step 609 sends a Close Session/Track Command which requests closure of the session or disc to the optical disc drive 20. Further, a step 611 sends a Start/Stop Unit Command which requests ejection of the optical disc 15, that is, a command making the optical disc ejection request, to the optical disc drive 20, and the process shown in FIG. 6 ends.

If the decision result in the step 607 is YES, the process advances to the step 611. Hence, the Close Session/Track Command which requests closure of the session or disc is not sent in this case.

Moreover, if the decision result in the step 603 is NO, the process advances to the step 609. Hence, the Close Session/Track Command which requests closure of the session or disc is sent prior to sending the Start/Stop Unit Command which requests ejection of the optical disc 15.

Figure 7:
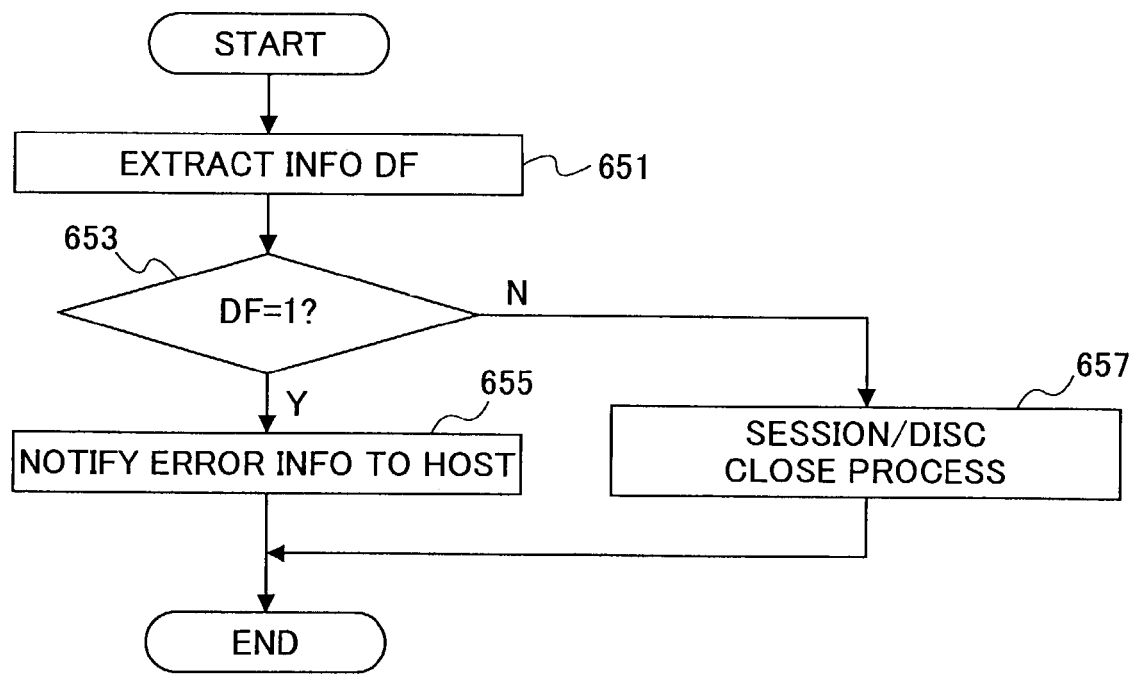
FIG. 7 is a flow chart for explaining a process of the optical disc drive when a command requesting a closure of a session or disc is received.

Next, a description will be given of the process of the optical disc drive 20 which receives from the host unit 50 the Close Session/Track Command which requests closure of the session or disc, by referring to FIG. 7. FIG. 7 is a flow chart for explaining the process of the optical disc drive 20 when the Close Session/Track Command is received. When the optical disc drive 20 receives the Close Session/Track Command from the host unit 50, a start address of a program corresponding to the flow chart shown in FIG. 7 is set in the program counter of the CPU 40, and algorithms corresponding to the flow chart shown in FIG. 7 are started. The flow chart shown in FIG. 7 corresponds to the series of algorithms executed by the CPU 40.

A step 651 shown in FIG. 7 reads the dummy recording prohibit/permit information DF stored in the RAM 41. A step 653 decides whether or not the dummy recording prohibit/permit information DF is "1", that is, whether or not the process accompanying the recording of the dummy data is prohibited.

If the decision result in the step 653 is YES, a step 655 sends to the host unit 50 error information set with an error code which indicates that the session or disc cannot be closed, and the process shown in FIG. 7 ends. When the host unit 50 receives the error information, the host unit 50 may display an error message on the display device 58.

On the other hand, if the decision result in the step 653 is NO, a step 657 carries out a process to close the session or disc, and the process shown in FIG. 7 ends.

Figure 8:
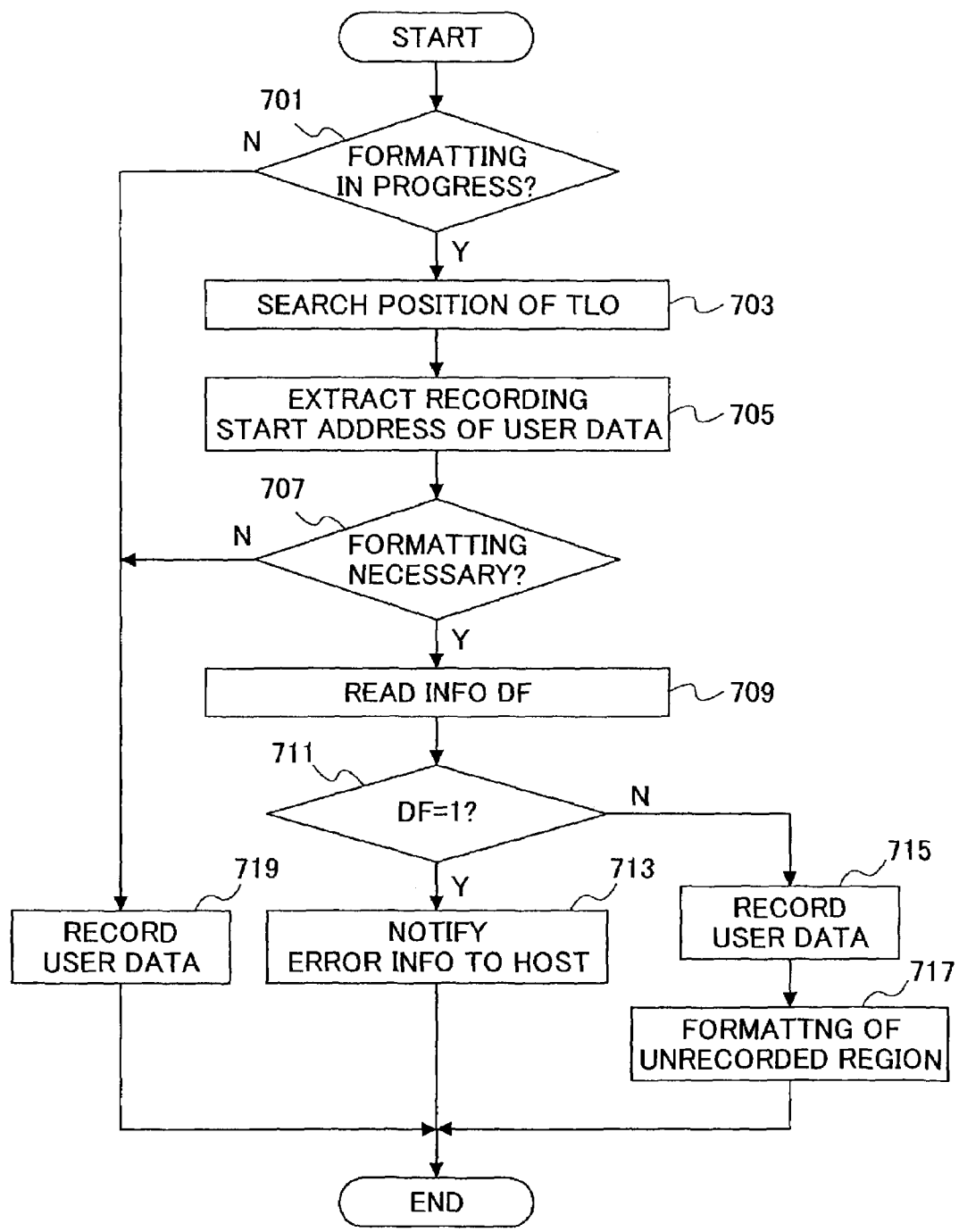
FIG. 8 is a flow chart for explaining a process of the optical disc drive when a command requesting recording of user data is received.

Next, a description will be given of a process of the optical disc drive 20 when the Write Command requesting the recording of the user data is received from the host unit 50, by referring to FIG. 8. FIG. 8 is a flow chart for explaining the process of the optical disc drive 20 when a command requesting the recording of the user data, that is, the Write Command, is received. When the optical disc drive 20 receives the Write Command, a start address of a program corresponding to the flow chart shown in FIG. 8 is set in the program counter of the CPU 40, and algorithms corresponding to the flow chart shown in FIG. 8 is started. The flow chart shown in FIG. 8 corresponds to a series of algorithms executed by the CPU 40.

A step 701 shown in FIG. 8 decides whether or not the formatting of the optical disc 15 is still in progress (that is, not yet completed). If the decision result in the step 701 is YES, a step 703 refers to the FDCB recorded in the lead-in region of the optical disc 15, so as to search for the position of the TLO. A step 705 extracts the recording start address of the user data, from the command requesting the recording, that is, from the Write Command.

A step 707 decides whether or not the formatting of the optical disc 15 is necessary. For example, the address at the position where the TLO is recorded and the recording start address of the user data are compared, and it is judged that the formatting is necessary if an unrecorded region exists between the TLO and the user data. If the decision result in the step 707 is YES, a step 709 reads the dummy recording prohibit/permit information DF which is stored in the RAM 41.

A step 711 decides whether or not the dummy recording prohibit/permit information DF is "1", that is, whether or not the process accompanying the recording of the dummy data is prohibited. If the decision result in the step 711 is YES, a step 713 notifies the host unit 50 of error information set with an error code which indicates that the user data cannot be recorded, and the process shown in FIG. 8 ends. When the host unit 50 receives the error information, the host unit 50 may display an error message on the display device 58.

On the other hand, if the decision result in the step 711 is NO, a step 715 records the user data in the specified region in the manner described above. In addition, a step 717 records the dummy data in the unrecorded region between the recording regions of the TLO and the user data, and the process shown in FIG. 8 ends. In this case, the background formatting is automatically resumed.

If the decision result in the step 701 is NO, a step 719 records the user data in the specified region in the manner described above, and the process shown in FIG. 8 ends. In this case, the background formatting is not automatically resumed.

Further, if the decision result in the step 707 is NO, the step 719 records the user data in the specified region in the manner described above, and the process shown in FIG. 8 ends. In this case, the background formatting is also not automatically resumed.

Therefore, according to this first embodiment of the information recording system, a power supply information acquiring means (or section), a determination means (or section) and an output means (or section) of the information processing apparatus are realized by the microcomputer of the main control unit 52 and the program executed by the microcomputer. In addition, a communication control means (or section), a recording control means (or section) and an error notifying means (or section) of the information recording apparatus are realized by the CPU 40 and the program executed by the CPU 40.

Of course, a part of or all of the processes carried out by the microcomputer of the main control unit 52 according to the program may be realized by hardware. Moreover, a part of or all of the processes carried out by the CPU 40 according to the program may be realized by hardware.

In this first embodiment, of the programs installed in one or more hard discs of the HDD 56, the programs corresponding to the flow charts shown in FIGS. 2 and 6 form the recording determination program described above. Furthermore, of the programs installed in the ROM 39, the programs corresponding to the flow charts shown in FIGS. 4, 5, 7 and 8 form the recording control program described above.

The steps 409 and 413 shown in FIG. 2 form a first step of the recording method according to the present invention, and the steps 411 and 415 through 419 shown in FIG. 2 form a second step of the recording method according to the present invention.

In the first embodiment of the information recording system, when the optical disc 15 is loaded into the optical disc drive 20, the driving power supply of the host unit 50 is a battery and the remaining amount of power (capacity) of the battery is less than or equal to a predetermined amount, the host unit 50 notifies the optical disc drive 20 of a prohibit command which prohibits a process accompanying the recording of the dummy data. In addition, the optical disc drive 20 prohibits the process accompanying the recording of the dummy data when the prohibit command is received from the host unit 50. In other words, when the driving power supply is the battery and the remaining amount of power (capacity) of the battery is less than or equal to the predetermined amount, it is possible to prevent excessive wear of the battery because the process accompanying the recording of the dummy data is prohibited. Hence, it is possible to avoid a power shut down which cannot be anticipated, and to prevent the reproduction of the data from becoming incomplete or the additional writing of the data from becoming impossible. That is, it is possible to suppress wear of the driving power supply, and to promote effective utilization of the driving power supply.

In this first embodiment, even when the optical disc drive 20 receives from the host unit 50 a command requesting to resume the background formatting, the optical disc drive 20 does not resume the background formatting if the process accompanying the recording of the dummy data is prohibited and instead notifies the error information to the host unit 50. Accordingly, even in a case where a plurality of application software are executed in the host unit 50 by a multi-task operation and a certain application software which is unaware that the process accompanying the recording of the dummy data is prohibited sends the command requesting to resume the background formatting, this certain application software can recognize that the process accompanying the recording of the dummy data is prohibited based on the error information (error code) received from the optical disc drive 20.

Furthermore, if the host unit 50 receives the eject request with respect to the optical disc 15 in a state where the driving power supply of the host unit 50 is a battery and the remaining amount of power (capacity) of the battery is less than or equal to a predetermined amount, the host unit 50 sends to the optical disc drive 20 the eject request without sending a request to close the session or disc. For this reason, the optical disc drive 20 does not carry out a formatting with respect to the unrecorded portion of the optical disc 15, thereby making it possible to extend the serviceable life of the battery and to avoid the power supply from being shut down unexpectedly.

In a case where the process accompanying the recording of the dummy data is prohibited in this first embodiment, even if the optical disc drive 20 receives a request to close the session or disc, the optical disc drive 20 notifies the error information to the host unit 50 without carrying out a process to close the session or disc. Thus, the process to close the session or disc, which requires an extremely long processing time, is not carried out, thereby preventing excessive wear of the battery. Accordingly, it is possible to suppress wear of the driving power supply, and to promote effective utilization of the driving power supply.

When the driving power supply of the host unit 50 is a battery and the remaining amount of power (capacity) of the battery is less than or equal to a predetermined amount, this first embodiment prohibits the process accompanying the recording of the dummy data. However, in a case where the full capacity of the battery is small, for example, it is also possible to immediately prohibit the process accompanying the recording of the dummy data, regardless of the remaining amount of power (capacity) of the battery, if the driving power supply of the host unit 50 is the battery.

When the host unit 50 receives the eject request with respect to the optical disc 15 in a state where the driving power supply of the host unit 50 is a battery and the remaining amount of power (capacity) of the battery is less than or equal to a predetermined amount, this first embodiment sends a command requesting the ejection of the optical disc 15 to the optical disc drive 20 without requesting closure of the session or disc. But in a case where the full capacity of the battery is small, for example, it is also possible to send the eject request without sending the request to close the session or disc, regardless of the remaining amount of power (capacity) of the battery, if the driving power supply of the host unit 50 is the battery.

When the host unit 50 receives the eject request with respect to the optical disc 15 via the input device 57, this first embodiment acquires the driving power supply information and carries out a process to determine whether or not to send to the optical disc drive 20 a command requesting closure of the session or disc. However, in a case where the process to determine whether to permit or prohibit the process accompanying the recording of the dummy data is being carried out when the optical disc 15 is loaded into the optical disc drive 20, it is also possible to determine whether or not to send the command requesting closure of the session or disc to the optical disc drive 20 based on a result of the process which determines whether to permit or prohibit the process accompanying the recording of the dummy data.

In this first embodiment, the judgement to determine whether or not to resume the background formatting is carried out in the optical disc drive 20. However, this judgement may be made in the host unit 50. For example, when a request from the user to resume the background formatting is received, the host unit 50 judges whether or not the process accompanying the recording of the dummy data is possible based on the driving power supply information, and the sending of the command requesting resuming of the background formatting to the optical disc drive 20 is discontinued if it is judged that the process accompanying the recording of the dummy data is not possible. In addition, the host unit 50 may similarly judge whether or not other processes accompanying the recording of the dummy data are possible, and discontinue sending of the commands requesting these other processes accompanying the recording of the dummy data to the optical disc drive 20 if it is judged that these processes are not possible.

Furthermore, this first embodiment sets a command permitting or prohibiting the process accompanying the recording of the dummy data in the bit 3 of the byte 4 of the Time-Out and Protect Page, but the command may be set using other Reserved bits. Moreover, the command may be set using mode pages other than the Time-Out and Protect Page. It is also possible to use a command other than the Mode Select Command or, a newly defined command.

In this first embodiment, the recording prohibit/permit determination program is recorded in one or more hard discs of the HDD 56, however, the recording prohibit/permit determination program may be recorded in other recording media such as CD-ROMs, magneto-optical discs, flash memories and flexible discs. In this case, a medium drive corresponding to the information recording medium used is provided, and the recording prohibit/permit determination program is installed into the host unit 50 from this medium drive. Of course, the recording prohibit/permit determination program may be transferred to the one or more hard discs of the HDD 56 from other recording media. The recording prohibit/permit determination program may also be transferred to the one or more hard discs of the HDD 56 or to the main memory, via one or more networks. All that is required is for the recording prohibit/permit determination program to be loaded into the main memory of the microcomputer of the host unit 50, so that the host unit 50 can carry out the processes described above by executing the recording prohibit/permit determination program.

In this first embodiment, the recording control program is recorded in the ROM 39, however, the recording control program may be recorded in other recording media such as CD-ROMs, magneto-optical discs, flash memories and flexible discs. In this case, a medium drive corresponding to the information recording medium used is provided, and the recording control program is installed into the optical disc drive 20 from this medium drive. All that is required is for the recording control program to be loaded into the main memory of the CPU 40 of the optical disc drive 20, so that the optical disc drive 20 can carry out the processes described above by executing the recording control program.

Next, a description will be given of a second embodiment of the information recording system according to the present invention, by referring to FIG. 9. This second embodiment of the information recording system employs a second embodiment of the information recording method according to the present invention, a second embodiment of the information recording apparatus according to the present invention, a second embodiment of the information processing apparatus according to the present invention, and a second embodiment of the computer-readable storage medium according to the present invention.

This second embodiment is characterized in that, unlike the first embodiment described above, the process which determines whether the process accompanying the recording of the dummy data is to be permitted or prohibited is carried out in the optical disc drive 20. In other words, only a portion of the programs stored in the one or more hard discs of the HDD 56 and the ROM 39 differ from that of the first embodiment, and other structures of this second embodiment are the same as those corresponding structures of the first embodiment. Hence, only the features of this second embodiment which are different from those of the first embodiment will be described in this specification. In the following description, those parts which are the same as those corresponding parts of the first embodiment will be designated by the same reference numerals, and a description thereof will be simplified or omitted.

In this second embodiment, the ROM 39 stores programs written in codes decodable by the CPU 40, including a prohibit/permit information determination program which will be described later and determines whether to permit or prohibit a process accompanying the recording of the dummy data. When the power supply of the optical disc drive 20 is turned ON, the programs including this prohibit/permit information determination program are loaded into the main memory of the CPU 40.

A description will be given of the process of the optical disc drive 20 when the optical disc 15 is loaded into the optical disc drive 20, by referring to FIG. 9. FIG. 9 is a flow chart for explaining the process of permitting or prohibiting the process accompanying recording of the dummy data in this second embodiment of the information recording system according to the present invention. When the optical disc 15 is loaded into the optical disc drive 20, a start address of a program corresponding to the flow chart shown in FIG. 9 is set in the program counter of the CPU 40, and algorithms corresponding to the flow chart shown in FIG. 9 are started. The flow chart shown in FIG. 9 corresponds to a series of algorithms executed by the CPU 40. It is assumed for the sake of convenience that the preconditions with respect to the optical disc 15 are the same as those for the first embodiment described above.

Figure 9:
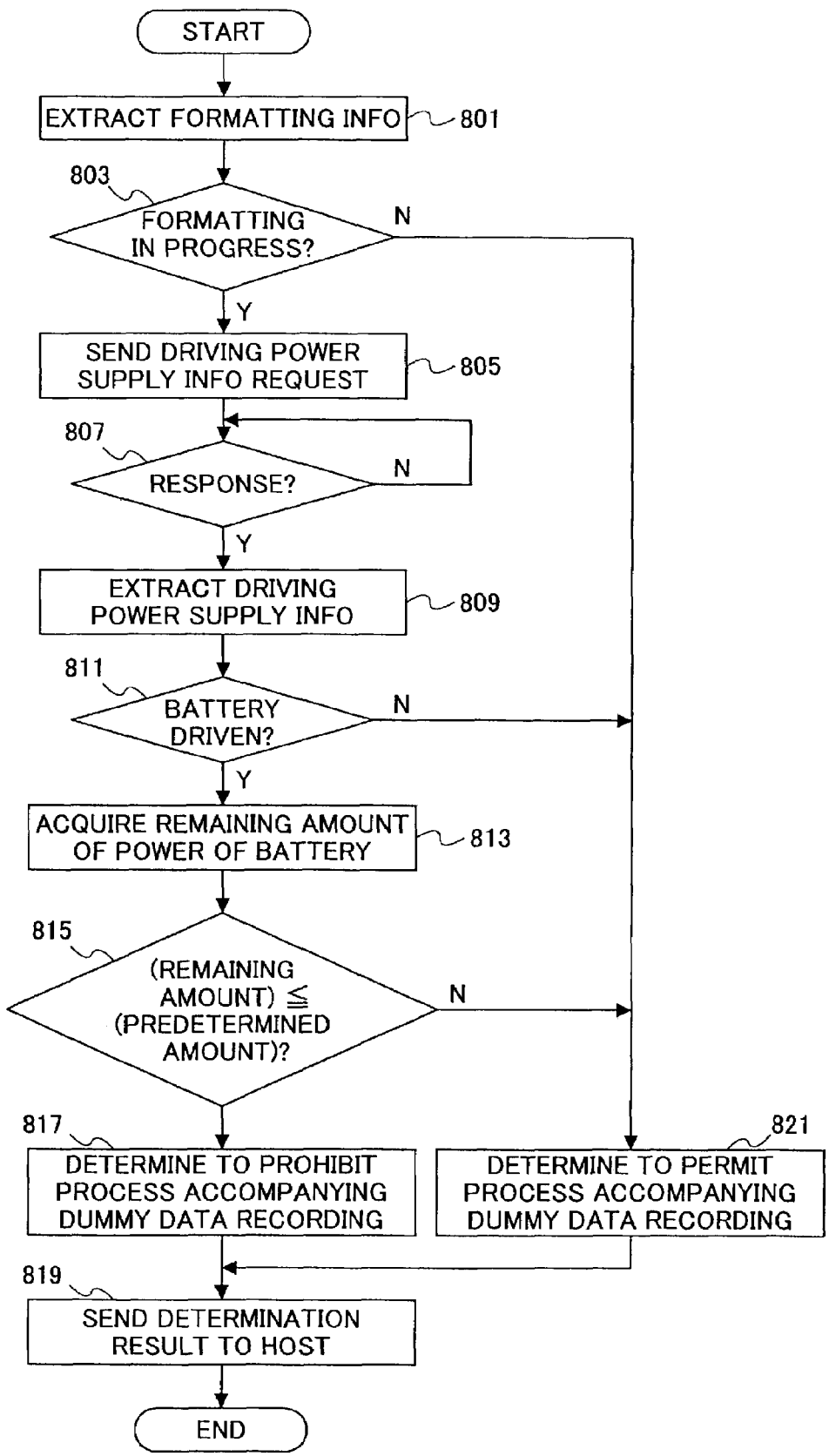
FIG. 9 is a flow chart for explaining a process of permitting or prohibiting a process accompanying the recording of the dummy data in a second embodiment of the information recording system according to the present invention.

First, a step 801 shown in FIG. 9 acquires the format information, that is, the Background Format Status, of the optical disc 15. This format information (Background Format Status) is recorded at a predetermined position in the recording region of the optical disc 15. A step 803 decides whether or not the formatting of the optical disc 15 is still in progress (that is, not yet completed). If the formatting of the optical disc 15 is still in progress and the decision result in the step 803 is YES, the process advances to a step 805.

The step 805 sends a command requesting the driving power supply information of the host unit 50, so as to acquire driving power supply information of the host unit 50. The host unit 50 acquires the driving power supply information from the OS when the command requesting the driving power supply information is received from the optical disc drive 20, and responds to the optical disc drive 20 by sending the driving power supply information. A step 807 waits for the response from the host unit 50 in response to the command requesting the driving power supply information. The process advances to a step 809 if the decision result in the step 807 is YES.

The step 809 extracts the kind of driving power supply of the host unit 50, based on the driving power supply information received from the host unit 50. A step 811 decides whether or not the driving power supply is a battery. The process advances to a step 813 if the decision result in the step 811 is YES.

The step 813 acquires a remaining amount of power (remaining capacity) of the battery, based on the driving power supply information. A step 815 decides whether or not the remaining amount of power of the battery is less than or equal to a predetermined amount. The process advances to a step 817 if the decision result in the step 815 is YES.

The step 817 determines that the process accompanying the recording of the dummy data is to be prohibited, and stores corresponding dummy recording prohibit/permit information DF in the RAM 41. Then, a step 819 sends the dummy recording prohibit/permit information DF to the host unit 50 to notify the host unit 50 that the process accompanying the recording of the dummy data is prohibited, and the process shown in FIG. 9 ends.

On the other hand, if the decision result in the step 803 is NO, the process advances to a step 821. The step 821 determines that the process accompanying the recording of the dummy data is to be permitted, and stores corresponding dummy recording prohibit/permit information DF in the RAM 41. Then, the step 819 sends the dummy recording prohibit/permit information DF to the host unit 50 to notify the host unit 50 that the process accompanying the recording of the dummy data is permitted, and the process shown in FIG. 9 ends.

On the other hand, if the decision result in the step 811 is NO, the process also advances to the step 821, and the process accompanying the recording of the dummy data is permitted. Furthermore, the process also advances to the step 821 if the decision result in the step 815 is NO, and the process accompanying the recording of the dummy data is permitted.

When the optical disc drive 20 receives a command requesting resuming of the background formatting, a command requesting closure of the session or disc or, a command requesting recording of the user data, the optical disc drive 20 judges whether the command is to be executed based on the dummy recording prohibit/permit information DF, similarly as in the case of the first embodiment described above.

Therefore, according to this second embodiment of the information recording system, a communication control means (or section), a power supply information acquiring means (or section), a determination means (or section) and a recording control means (or section) of the information recording apparatus are realized by the CPU 40 and the program executed by the CPU 40.

Of course, a part of or all of the processes carried out by the CPU 40 according to the program may be realized by hardware.

In this second embodiment, of the programs installed in the ROM 39, the program corresponding to the flow chart shown in FIG. 9 forms the prohibit/permit information determination program described above.

The steps 805 through 809 and 813 shown in FIG. 9 form a first step of the recording method according to the present invention, and the steps 815, 817 and 821 shown in FIG. 9 form a second step of the recording method according to the present invention.

In the second embodiment of the information recording system, when the optical disc 15 is loaded into the optical disc drive 20, and it is detected that the driving power supply of the host unit 50 is a battery and the remaining amount of power (capacity) of the battery is less than or equal to a predetermined amount based on the driving power supply information received from the host unit 50, the optical disc drive 20 determines that a process accompanying the recording of the dummy data is to be prohibited. Hence, when the driving power supply of the host unit 50 and the optical disc drive 20 is the battery and the remaining amount of power (capacity) of the battery is less than or equal to the predetermined amount, it is possible to prevent excessive wear of the battery because the process accompanying the recording of the dummy data is prohibited. Consequently, it is possible to avoid a power shut down which cannot be anticipated, and to prevent the reproduction of the data from becoming incomplete or the additional writing of the data from becoming impossible. That is, it is possible to suppress wear of the driving power supply, and to promote effective utilization of the driving power supply.

When the driving power supply of the host unit 50 is a battery and the remaining amount of power (capacity) of the battery is less than or equal to a predetermined amount, this second embodiment prohibits the process accompanying the recording of the dummy data. However, in a case where the full capacity of the battery is small, for example, it is also possible to immediately prohibit the process accompanying the recording of the dummy data, regardless of the remaining amount of power (capacity) of the battery, if the driving power supply of the host unit 50 is the battery.

When the host unit 50 receives the eject request with respect to the optical disc 15 via the input device 57, this second embodiment may acquire the driving power supply information and carry out a process to determine whether or not to send to the optical disc drive 20 a command requesting closure of the session or disc. Alternatively, this second embodiment may determine whether or not to send the command requesting closure of the session or disc to the optical disc drive 20 based on the dummy recording prohibit/permit information DF from the optical disc drive 20.

In this second embodiment, the judgement to determine whether or not to resume the background formatting is carried out in the optical disc drive 20. However, this judgement may be made in the host unit 50. For example, when a request from the user to resume the background formatting is received, the host unit 50 judges whether or not the process accompanying the recording of the dummy data is possible based on the driving power supply information, and the sending of the command requesting resuming of the background formatting to the optical disc drive 20 is discontinued if it is judged that the process accompanying the recording of the dummy data is not possible. In addition, the host unit 50 may similarly judge whether or not other processes accompanying the recording of the dummy data are possible, and discontinue sending of the commands requesting these other processes accompanying the recording of the dummy data to the optical disc drive 20 if it is judged that these processes are not possible.

In this second embodiment, the prohibit/permit information determination program is recorded in the ROM 39, however, the prohibit/permit information determination program may be recorded in other recording media such as CD-ROMs, magneto-optical discs, flash memories and flexible discs. In this case, a medium drive corresponding to the information recording medium used is provided, and the prohibit/permit information determination program is installed into the optical disc drive 20 from this medium drive. All that is required is for the prohibit/permit information determination program to be loaded into the main memory of the CPU 40, so that the optical disc drive 20 can carry out the processes described above by executing the prohibit/permit information determination program.

In each of the embodiments described above, the process which closes the session or disc is not carried out when the process accompanying the recording of the dummy data is prohibited, even when the optical disc drive 20 receives the command requesting closure of the session or disc. However, it is of course possible to carry out the process which closes the session or disc when the amount of data of the dummy data to be recorded is less than or equal to a predetermined amount, even if the process accompanying the recording of the dummy data is prohibited.

In addition, in each of the embodiments described above, the process which determines whether to permit or prohibit the process accompanying the recording of the dummy data is carried when the optical disc 15 is loaded into the optical disc drive 20, but this process may of course be carried out in response to a request from the user.

In each of the embodiments described above, it is judged whether or not the process accompanying the recording of the dummy data is prohibited, when the optical disc drive 20 receives a command requesting closure of the session or disc. However, in a case where the command requesting closure of the session or disc is positively sent only when the process accompanying the recording of the dummy data is permitted, the judgement to determine whether or not the process accompanying the recording of the dummy data may be omitted when the command requesting closure of the session or disc is received.

The judgement to determine whether the process accompanying the recording of the dummy data is to be permitted or prohibited is carried out in each of the embodiments described above when the optical disc drive 20 receives a command requesting resuming of the background formatting, a command requesting closure of the session or disc or, a command requesting recording of the user data. However, the judgement to determine whether the process accompanying the recording of the dummy data is to be permitted or prohibited may be carried out when the optical disc drive 20 receives a command requesting erasure of data (erase process). In other words, judgement to determine whether the process accompanying the recording of the dummy data is to be permitted or prohibited may be carried out based on the dummy recording prohibit/permit information DF, as long as there is a command requesting a process accompanying the recording of the dummy data.

In each of the embodiments described above, the process of resuming the background formatting, the process of closing the session or disc, and the process of recording the user data are prohibited when the driving power supply is a battery and the remaining amount of power (capacity) of the battery is less than or equal to a predetermined amount. However, conditions for prohibiting the process may be different depending on each process or the amount of data of the dummy data to be recorded. For example, in a case where the amount of data of the dummy data to be recorded exceeds a predetermined threshold value, the determination to permit or prohibit the process may be made solely based on the kind of driving power supply, and in a case where the amount of data of the dummy data to be recorded is less than or equal to the predetermined threshold value, the determination to permit or prohibit the process may be made based on the kind of driving power supply and the remaining amount of power (capacity) of the battery.

In each of the embodiments described above, the determination to permit or prohibit the process accompanying the recording of the dummy data is made based on the kind of driving power supply and the remaining amount of power (capacity) of the battery. However, the conditions for determining whether to permit or prohibit the process accompanying the recording of the dummy data are not limited to the above, and for example, the conditions may include the kind of battery and a manufacturer of the battery, because the characteristics of the battery differ depending on the kind and/or manufacturer of the battery.

Further, in each of the embodiments described above, the determination to permit or prohibit the process accompanying the recording of the dummy data is made only when the background formatting of the optical disc 15 is in progress (not yet completed). But of course, the determination to permit or prohibit the process accompanying the recording of the dummy data may be made when no background formatting has been made with respect to the optical disc 15, that is, the optical disc 15 is non-formatted.

Each of the embodiments described above is described for a case where the optical disc 15 is the DVD+RW, but the information recording medium is not limited to the DVD+RW, and any suitable information recording medium may be used as long as the process accompanying the recording of the dummy data is carried out with respect to the information recording medium. In such a case, a medium drive adapted to the information recording medium must of course be used in place of the optical disc drive 20.

The host unit 50 and the optical disc drive 20 may be provided within a single housing or, provided within separate housings, in each of the embodiments described above.

In each of the embodiments described above, it is assumed for the sake of convenience that the medium drive (optical disc drive) capable of recording and reproducing user data is used with respect to the information recording medium which is in conformance with the DVD+RW standards. However, the medium drive may be capable of only recording the user data with respect to the information recording medium.

Next, a description will be given of a third embodiment of the information recording system according to the present invention, by referring to FIGS. 10A, 10B and 11 through 18. This third embodiment of the information recording system employs a third embodiment of the information recording method according to the present invention, a third embodiment of the information recording apparatus according to the present invention, a third embodiment of the information processing apparatus according to the present invention, and a third embodiment of the computer-readable storage medium according to the present invention.

The basic structure of this third embodiment of the information recording system is the same as that of the first embodiment of the information recording system shown in FIG. 1, and a description thereof will be omitted. But in this third embodiment, one or more hard discs of the HDD 56 store programs written in codes decodable by the microcomputer of the main control unit 52 of the host unit 50, including a first determination program which determines whether to continue or discontinue recording of the dummy data, as will be described later. When the driving power supply of the host unit 50 is turned ON, the programs including the first determination program are loaded into the main memory of the main control unit 52.

FIGS. 10A and 10B are diagrams for explaining the structure of the recording region of the optical disc 15 in conformance with the DVD+RW standards.

In the following description, a direction towards a center of rotation of the optical disc will be referred to as an inner peripheral direction, and a direction away from the center of rotation of the optical disc will be referred to as an outer peripheral direction.

As shown in FIG. 10A, the recording region of the optical disc 15 in conformance with the DVD+RW standards is divided into three regions (or areas) in the outer peripheral direction from the inner periphery to the outer periphery, namely, a Lead-In region (area) LIA, a data region (area) DZA and a Lead-Out region (area) LOA. The user data are recorded within the data region DZA. The actual optical disc 15 has a spiral track, but in FIGS. 10A and 10B, the track is illustrated as being linear, with the left side corresponding to the inner periphery and the right side corresponding to the outer periphery of the optical disc 15.

When a communication state of the host unit 50 in the information recording system is in a standby mode, the host unit 50 sends to the optical disc drive 20 a Get Event Status Notification Command, which is an event status request command requesting the event status, with an approximately constant period.

When the Get Event Status Notification Command is received, the optical disc drive 20 sets a code corresponding to the event status in a Media Event Code of the Media Event Descriptor as shown in FIG. 11, and sends the Media Event Descriptor to the host unit 50. FIG. 11 is a diagram for explaining the Media Event Code. In the Media Event Code shown in FIG. 11, "0h" is set when there is no change in the event, "1h" is set when an optical disc (medium) eject request is received, "2h" is set when an optical disc 15 is newly loaded into the optical disc drive 20, "3h" is set when the optical disc 15 is ejected from the optical disc drive 20, "4h" is set when the optical disc 15 is changed, "5h" is set when the background formatting is completed, "6h" is set when the background formatting is automatically resumed, and "7h" is set when the discontinuance of the background formatting is completed. The code "7h" is conventionally an unused code, but in this embodiment, this code "7h" is defined as a code corresponding to an event status indicating the completion of the discontinuance of the background formatting.

When the optical disc 15 is loaded into the predetermined position of the optical disc drive 20, the optical disc drive 20 sends to the host unit 50, a Media Event Descriptor having the code "2h" which indicates that the optical disc 15 is newly loaded and is set in the Media Event Code, as a response with respect to the Get Event Status Notification Command.

Figure 12:
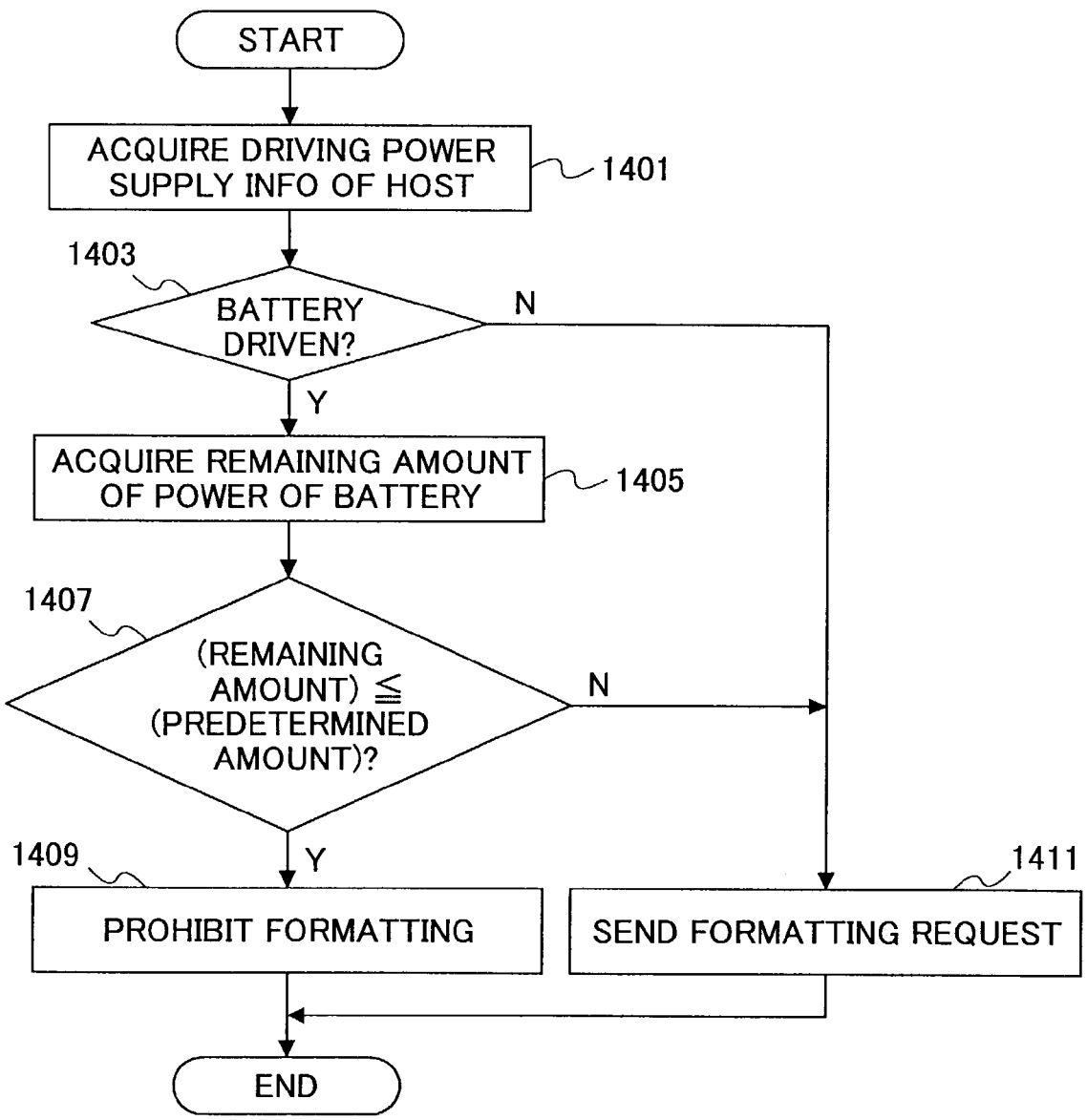
FIG. 12 is a flow chart for explaining a process of a host unit which determines whether to permit or prohibit formatting when a blank optical disc is loaded into an optical disc drive in a third embodiment of the information recording system according to the present invention.

Next, a description will be given of the process carried out by the host unit 50 when the user inputs via the input device 57 a formatting request requesting the formatting of the optical disc 15, by referring to FIG. 12. FIG. 12 is a flow chart for explaining the process of the host unit 50 which determines whether to permit or prohibit the formatting when a blank optical disc 15 is loaded into the optical disc drive 20 in this third embodiment of the information recording system according to the present invention. When the formatting request is input, a start address of a program corresponding to the flow chart shown in FIG. 12 is set in the program counter of the microcomputer of the main control unit 52, and algorithms corresponding to the flow chart shown in FIG. 12 are started. The flow chart shown in FIG. 12 corresponds to a series of processing algorithms executed by the microcomputer of the main control unit 52. It is assumed that the blank optical disc 15 is loaded into the optical disc drive 20.

A step 1401 shown in FIG. 12 makes an inquiry to the OS and acquires the driving power supply information of the host unit 50. This driving power supply information is used to obtain the kind of driving power supply.

A step 1403 decides whether or not the driving power supply is a battery. The process advances to a step 1405 if the decision result in the step 1403 is YES. The step 1405 acquires a remaining amount of power (capacity) of the battery, based on the driving power supply information.

A step 1407 decides whether or not the remaining amount of power (capacity) of the battery is less than or equal to a predetermined amount which is set in advance. If the decision result in the step 1407 is YES, a step 1409 prohibits the formatting, and the process shown in FIG. 12 ends. The predetermined amount may be set and changed arbitrarily by the user. After the step 1409 prohibits the formatting, the formatting request with respect to the optical disc 15 received thereafter is invalidated, and even when the formatting request is received from the user, a Format Unit Command, which is a formatting request command requesting the formatting, will not be sent to the optical disc drive 20.

On the other hand, if the decision result in the step 1403 is NO, the process advances to a step 1411. The process advances to the step 1411 also if the decision result in the step 1407 is NO. The step 1411 permits the formatting, and the Format Unit Command, that is, the formatting request command, is sent to the optical disc drive 20. The process shown in FIG. 12 ends after the step 1411.

Figure 13:
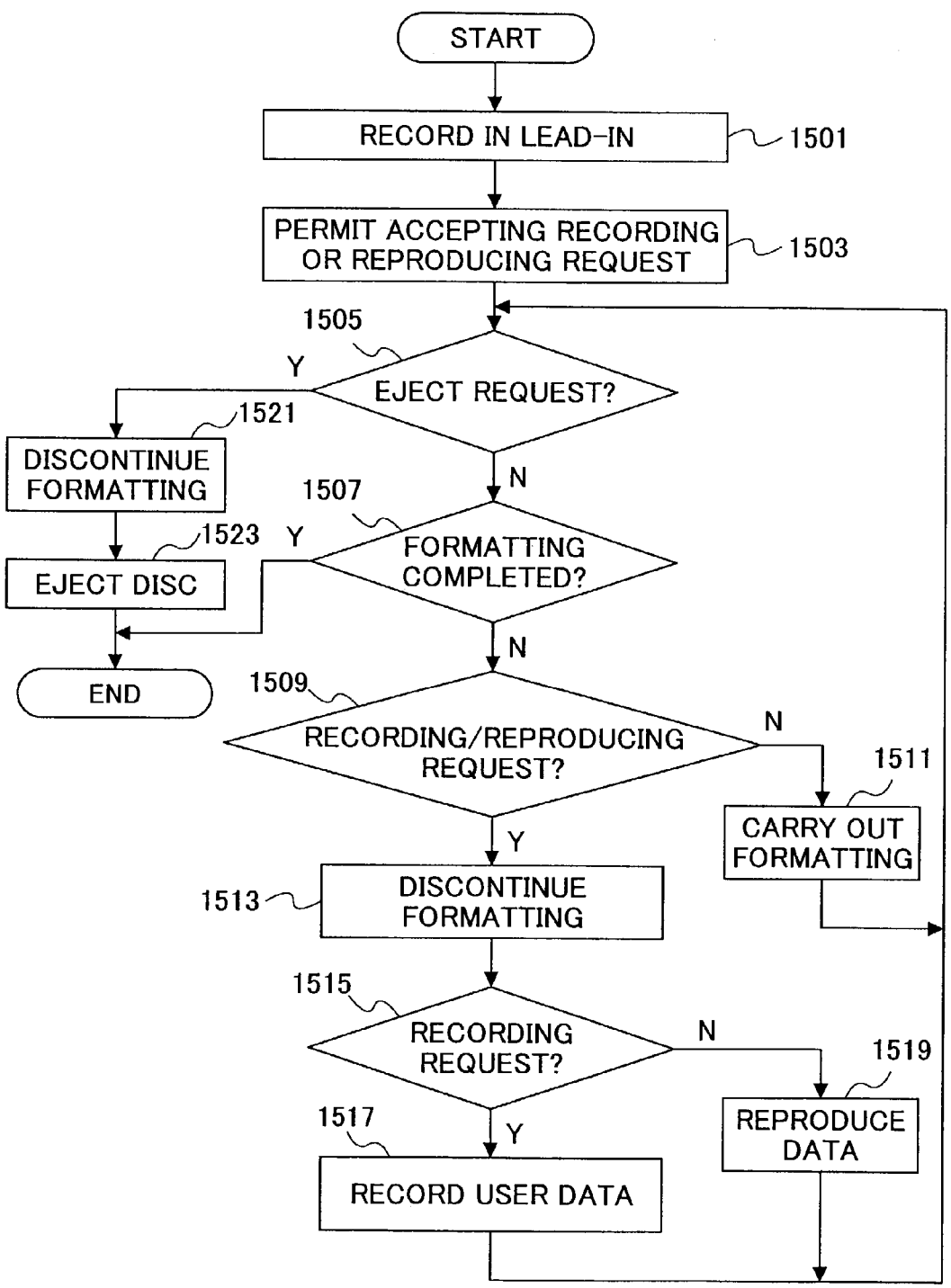
FIG. 13 is a flow chart for explaining a process of the optical disc drive which carries out a background formatting with respect to the blank optical disc.

Next, a description will be given of a process carried out by the optical disc drive 20 when the Format Unit Command, that is, the format request command, is received from the host unit 50, by referring to FIG. 13. FIG. 13 is a flow chart for explaining the process of the optical disc drive 20 which carries out the background formatting with respect to the blank optical disc 15. When the Format Unit Command is input to the optical disc drive 20, a start address of a program corresponding to the flow chart shown in FIG. 13 is set in the program counter of the CPU 40, and algorithms corresponding to the flow chart shown in FIG. 13 are started. The flow chart shown in FIG. 13 corresponds to a series of processing algorithms executed by the CPU 40.

First, a step 1501 shown in FIG. 13 carries out an initializing process by setting "0" to an eject request flag which is set with the existence of the eject request and to a reception flag which is set with the existence of the recording or reproducing request, and records predetermined information in a portion of the Lead-In region LIA of the optical disc 15 shown in FIG. 10A. The Formatting Disc Control Block (FDCB) is recorded in this portion of the Lead-In region LIA, as shown in FIG. 10A. The formatting status, the data recording status and the like are recorded in the FDCB in a bit-map format. Then, a step 1503 notifies the host unit 50 that the optical disc drive 20 can accept a recording or reproducing request.

A step 1505 decides whether or not an optical disc eject request requesting ejection of the optical disc 15 is received. When the eject request is received from the host unit 50, "1" is set in the eject request flag by an interrupt process. If no eject request is received, the decision result in the step 1505 is NO, and the process advances to a step 1507.

The step 1507 decides whether or not the formatting is completed. Whether or not the formatting is completed may be judged based on the existence of an unrecorded region within the data region DZA shown in FIG. 10A, and it is judged that the formatting is incomplete if the unrecorded region exists. In this case, the blank optical disc 15 is loaded into the optical disc drive 20, and the decision result in the step 1507 is NO. Hence, a step 1509 decides whether or not a recording/reproducing (recording or reproducing) request is received from the host unit 50. If a Write Command (recording request command) requesting the recording or a Read Command (reproducing request command) requesting the reproduction is received from the host unit 50, "1" is set in the reception flag by an interrupt process. If no recording/reproducing request is received and the reception flag is not set to "1", the decision result in the step 1509 is NO, and the process advances to a step 1511.

The step 1511 carries out the formatting of the optical disc 15. In other words, the step 1511 records dummy data amounting to 16 sectors, for example, in the unrecorded portion of the data region DZA. The process returns to the step 1505 after the step 1511, that is, after the recording of the dummy data ends.

Hence, the steps 1505, 1507, 1509 and 1511 are repeated until the decision result becomes YES in one of the steps 1505, 1507 and 1509, and the formatting of the optical disc 15 progresses in this manner.

On the other hand, if the reception flag is set to "1" and the decision result in the step 1509 is YES, the process advances to a step 1513. The step 1513 resets the reception flag to "0", and discontinues the formatting. The step 1515 analyzes the received command, and decides whether or the command from the host unit 50 is the recording request command. If the decision result in the step 1515 is YES, a step 1517 records the user data received from the host unit 50 in a specified region of the data region DZA. The details of the recording process of the optical disc drive 20 will be described later in the specification. The process returns to the step 1505 after the step 1517, that is, after the recording of the user data ends.

On the other hand, if the reproducing request is received from the host unit 50 and the decision result in the step 1515 is NO, a step 1519 reproduces the user data recorded in a region specified from the host unit 50, and transfers the reproduced user data to the host unit 50. The details of the reproducing process of the optical disc drive 20 will be described later in the specification. The process returns to the step 1505 after the step 1519 ends, that is, after the reproduction of the user data specified from the host unit 50 ends.

If the eject request is received, that is, the eject request flag is set to "1", the decision result in the step 1505 is YES, and the process advances to a step 1521. The step 1521 resets the eject request flag to "0", and discontinues the formatting. In addition, if an unrecorded region exists between a Last Written Address LWA of the data in the outermost periphery and a start address of the data region DZA, of the dummy data and the user data recorded within the data region DZA, the dummy data are recorded in this unrecorded region. Furthermore, the FDCB within the lead-in region LWA is updated, and the TLO is recorded following the LWA as shown in FIG. 10B, for example. Hence, it is possible to maintain compatibility with the DVD-ROM.

Then, a step 1523 instructs a disc load/eject system (not shown) to eject the optical disc 15, and the process shown in FIG. 13 ends.

If the decision result in the step 1507 is YES, the FDCB within the Lead-in Region LIA is updated, and the process shown in FIG. 13 ends.

Next, a description will be given of the recording process of the optical disc drive 20.

When the recording request command is received from the host unit 50, the CPU 40 supplies to the motor driver 27 a control signal for controlling the rotation of the spindle motor 22 based on a specified recording speed. In addition, the CPU 40 notifies the reproduced signal processing circuit 28 that the recording request command was received from the host unit 50. The CPU 40 also stores the user data received from the host unit 50 into the buffer RAM 34 via the buffer manager 37.

When the rotation of the optical disc 15 reaches a predetermined linear velocity, the reproduced signal processing circuit 28 detects the focus error signal and the tracking error signal based on the output signal of the optical pickup unit 23, and supplies the focus error signal and the tracking error signal to the servo controller 33. Based on the focus error signal and the tracking error signal from the reproduced signal processing circuit 28, the servo controller 33 drives the focusing actuator and the tracking actuator of the optical pickup unit 23 via the motor driver 27, and corrects the focus error and the tracking error.

The reproduced signal processing circuit 28 acquires the ADIP information based on the output signal of the optical pickup unit 23, and notifies the ADIP information to the CPU 40. Based on the ADIP information, the CPU 40 supplies to the motor driver 27 a signal which instructs a seek operation to the optical pickup unit 23 so that the optical pickup unit 23 is positioned to a specified write start position.

When the CPU 40 is notified from the buffer manager 37 that the amount of data stored in the buffer RAM 34 exceeded a predetermined amount, the CPU 40 instructs the encoder 25 to create write data. In addition, when the CPU 40 judges based on the ADIP information that the optical pickup unit 23 is located at the write start position, the CPU 40 notifies the encoder 25 that the optical pickup unit 23 is at the write start position. The encoder 25 records the write data on the optical disc 15 via the laser control circuit 24 and the optical pickup unit 23.

Next, a description will be given of the reproducing process of the optical disc drive 20.

When the reproducing request command is received from the host unit 50, the CPU 40 supplies to the motor driver 27 a control signal for controlling the rotation of the spindle motor 22 based on a reproducing speed. In addition, the CPU 40 notifies the reproduced signal processing circuit 28 that the reproducing request command was received from the host unit 50.

Similarly as in the case of the process during the recording described above, the reproduced signal processing circuit 28 notifies the ADIP information to the CPU 40, and corrects the focus error and the tracking error.

Based on the ADIP information, the CPU 40 supplies to the motor driver 27 a signal which instructs a seek operation to the optical pickup unit 23 so that the optical pickup unit 23 is positioned to a specified read start position. In addition, when the CPU 40 judges based on the ADIP information that the optical pickup unit 23 is located at the read start position, the CPU 40 notifies the reproduced signal processing circuit 28 that the optical pickup unit 23 is at the read start position.

The reproduced signal processing circuit 28 detects an RF signal based on the output signal of the optical pickup unit 23, and after carrying out the error correction process and the like with respect to the RF signal, stores the processed-RF signal in the buffer RAM 34 as reproduced data.

The buffer manager 37 transfers the reproduced data to the host unit 50 via the interface 38 when the reproduced data stored in the buffer RAM 34 amount to sector data.

The reproduced signal processing circuit 28 detects the focus error signal and the tracking error signal based on the output of the optical pickup unit 23 as described above until the recording process or the reproducing process ends. Hence, the reproduced signal processing circuit 28 constantly corrects the focus error and the tracking error via the servo controller 33 and the motor driver 27.

Figure 14:
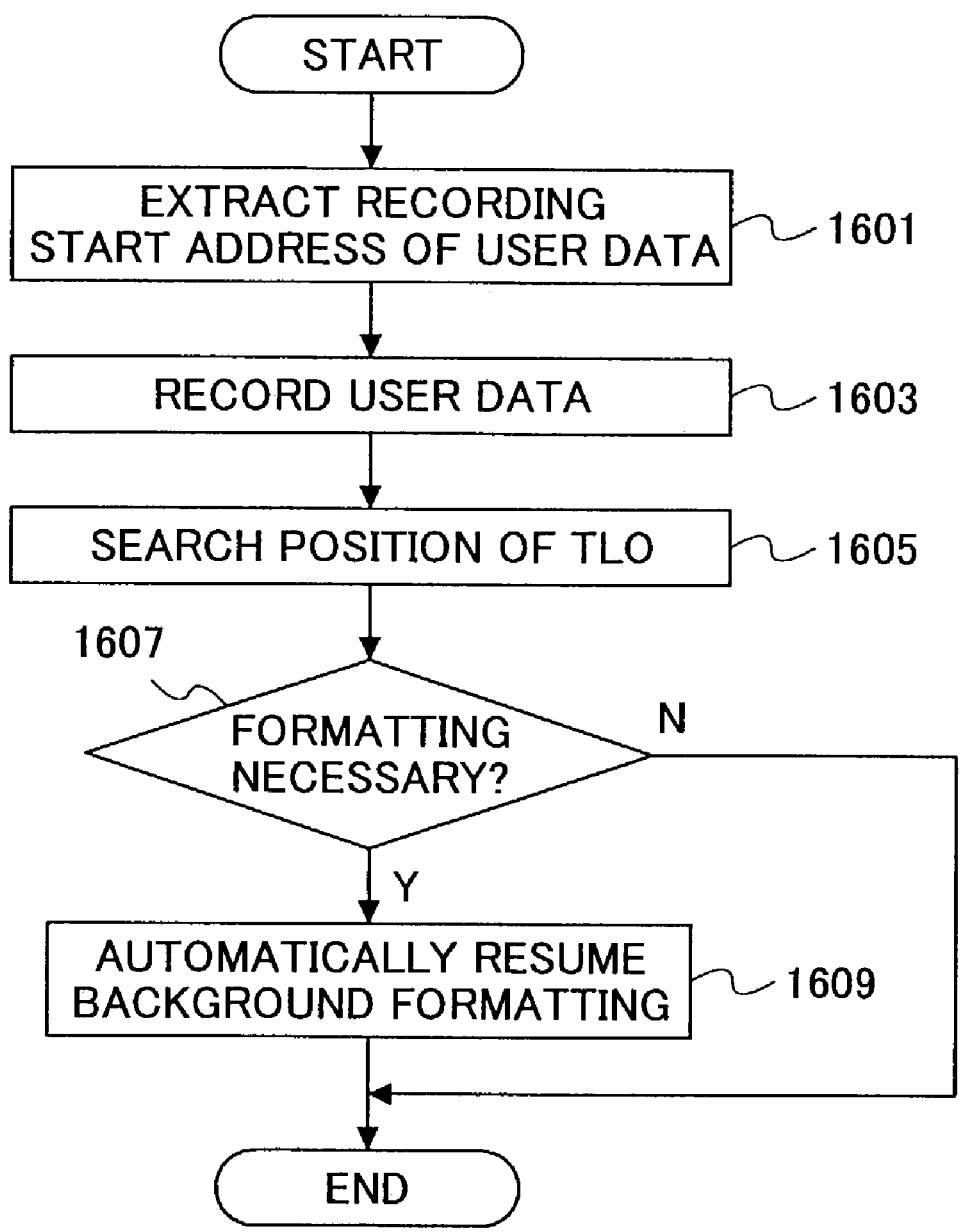
FIG. 14 is a flow chart for explaining a process of the optical disc drive which records user data on an optical disc the formatting of which has been discontinued during progress.

Next, a description will be given of a process of the optical disc drive 20 when the optical disc 15 which was ejected during the formatting is loaded again into the optical disc drive 20 and the recording request command is received from the host unit 50, by referring to FIG. 14. FIG. 14 is a flow chart for explaining the process of the optical disc drive 20 which records user data on the optical disc 15 the formatting of which has been discontinued during progress. When the recording request command is received from the host unit 50 in a state other than during the formatting, a start address of a program corresponding to the flow chart shown in FIG. 14 is set in the program counter of the CPU 40, and algorithms corresponding to the flow chart shown in FIG. 14 are started. The flow chart shown in FIG. 14 corresponds to a series of processing algorithms executed by the CPU 40.

First, a step 1601 shown in FIG. 14 extracts a recording start address of the user data from the recording request command A step 1603 records the user data from the host unit 50 at the specified position within the data region DZA as described above. The process advances to a step 160-5 when the recording of the user data is completed. The step 1605 refers to the FDCB recorded within the Lead-In region LIA of the optical disc 15, so as to search for the position of the TLO.

A step 607 decides whether or not the formatting is necessary. For example, the address at the position where the TLO is recorded and the recording start address of the user data are compared, and it is judged that the formatting is necessary if an unrecorded region exists between the TLO and the user data.

If the decision result in the step 1607 is YES, a step 1609 automatically resumes the background formatting. The details of the background formatting will be given later in the specification. In addition, the code "6h" which indicates that the background formatting is automatically resumed is set in the Media Event Code, and the Media Event Descriptor is sent to the host unit 50 as a response with respect to the Get Event Status Notification Command (event status request command). The process shown in FIG. 14 ends when the background formatting ends.

On the other hand, if the decision result in the step 1607 is NO, the process shown in FIG. 14 ends. In this case, the background formatting will not be resumed automatically.

Figure 15:
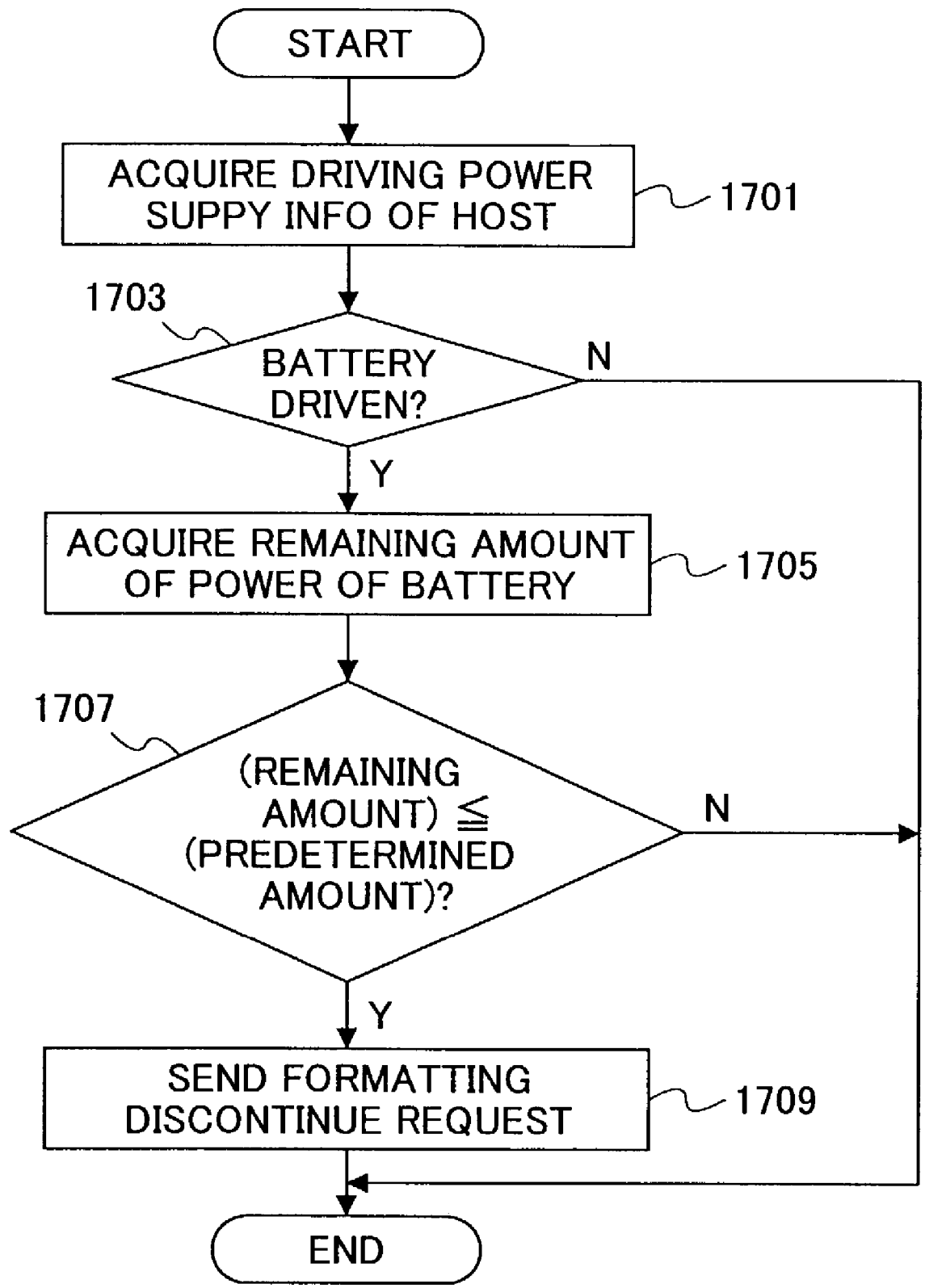
FIG. 15 is a flow chart for explaining a process of the host unit which determines whether to continue or discontinue the background formatting when the background formatting is automatically resumed.

Next, a description will be given of a process of the host unit 50 when the Media Event Code "6h" is received as a response with respect to the Get Event Status Notification Command, by referring to FIG. 15. FIG. 15 is a flow chart for explaining the process of the host unit 50 which determines whether to continue or discontinue the background formatting when the background formatting is automatically resumed. When the host unit 50 receives the Media Event Code "6h", a start address of a program corresponding to the flow chart shown in FIG. 15 is set in the program counter of the microcomputer of the main control unit 52, and algorithms corresponding to the flow chart shown in FIG. 15 are started. The flow chart shown in FIG. 15 corresponds to a series of algorithms executed by the microcomputer of the main control unit 52.

First, a step 1701 shown in FIG. 15 acquires the driving power supply information of the host unit 50 by making an inquiry to the OS. The kind of driving power supply is obtained based on the driving power supply information A step 1703 decides whether or not the kind of driving power supply is a battery. The process advances to a step 1705 if the decision result in the step 1703 is YES.

The step 1705 obtains a remaining amount of power of the battery based on the driving power supply information acquired by the step 1701. Then, a step 1707 decides whether or not the remaining amount of power of the battery is less than or equal to a predetermined amount. For example, the predetermined amount is 30% of the full capacity of the battery. The predetermined amount may be set and changed arbitrarily by the user.

If the decision result in the step 1707 is YES, a step 1709 sends to the optical disc drive 20 a formatting discontinue request command which requests the discontinuance of the formatting. In this embodiment, a Start Stop Unit Command or a Close Session/Track Command is used as the formatting discontinue request command. A bit 0 (start bit) and a bit 1 (LoEj bit) of a byte 4 of the Descriptor Block in the Start Stop Unit Command are set to "0" when sending the Start Stop Unit Command as the formatting discontinue request command. Alternatively, a bit 0 (track bit) and a bit 1 (session bit) of a byte 2 of the Descriptor Block in the Close Session/Track Command are set to "0" when sending the Close Session/Track Command as the formatting discontinue request command. The process shown in FIG. 15 ends after the step 1709 issues the formatting discontinue request command.

Conventionally, when forcibly stopping the spindle motor from the host unit when ending the access to save power or when stopping the music reproduction in the case of the audio CD, the bits 0 and 1 of the byte 4 of the Descriptor Block in the Start Stop Unit Command were set to "0". In addition, when discontinuing the background formatting without recording the TLO, the bits 0 and 1 of the byte 2 of the Descriptor Block in the Close Session/Track Command were set to "0".

The process shown in FIG. 15 ends if the decision result in the step 1703 is NO. Furthermore, the process shown in FIG. 15 ends if the decision result in the step 1707 is NO. In other words, the continuance of the background formatting is determined.

Figure 16:
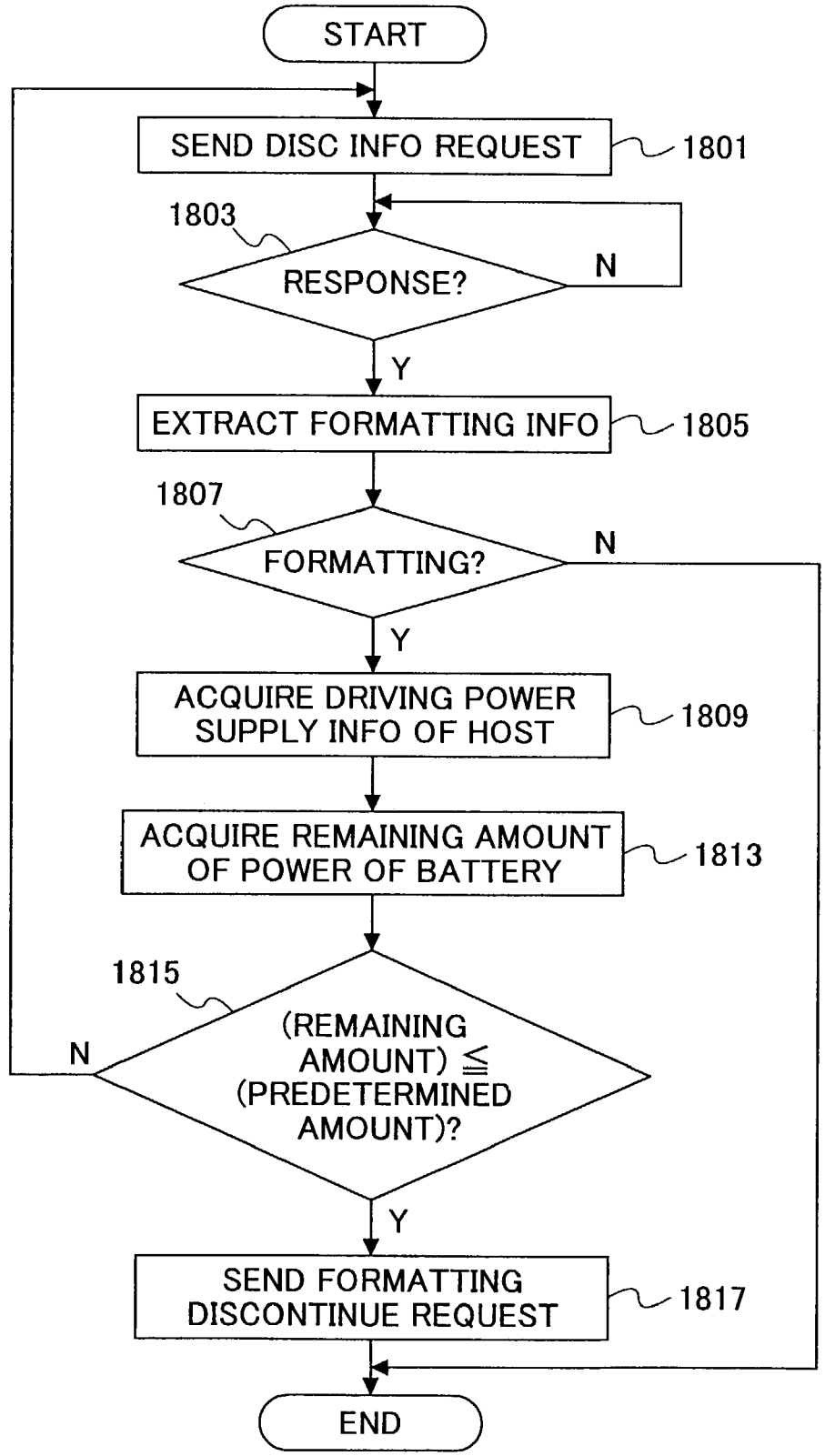
FIG. 16 is a flow chart for explaining a process of the host unit which determines whether to continue or discontinue the background formatting during the background formatting based on a remaining amount of power of a battery.

Next, a description will be given of a process of the host unit 50 when the background formatting is carried out in the optical disc drive 20, in a case where the kind of driving power supply of the host unit 50 is a battery, the Media Event Code "6h" is received, and the resuming of the background formatting is permitted, by referring to FIG. 16. FIG. 16 is a flow chart for explaining the process of the host unit 50 which determines whether to continue or discontinue the background formatting during the background formatting based on the remaining amount of power of the battery. When the background formatting is started in the optical disc drive 20, a start address of a program corresponding to the flow chart shown in FIG. 16 is set in the program counter of the microcomputer of the main control unit 52, and algorithms corresponding to the flow chart shown in FIG. 16 are started. The flow chart shown in FIG. 16 corresponds to a series of algorithms executed by the microcomputer of the main control unit 52.

First, a step 1801 shown in FIG. 16 sends to the optical disc drive 20 a Read Disc Information Command, which is a disc information request command requesting disc information, in order to know the formatting status of the optical disc 15. When the optical disc drive 20 receives the Read Disc information Command from the host unit 50, the optical disc drive 20 sets predetermined disc information in a Disc Information Block and responds to the host unit 50. A step 1803 decides whether or not the response is received from the optical disc drive 20. If the decision result in the step 1803 is YES, a step 1805 extracts a Background Format Status, that is, formatting information, from the received Disc Information Block.

A step 1807 decides whether or not the formatting is in progress, based on the Background Format Status. If the decision result in the step 1807 is YES, a step 1809 acquires the driving power supply information of the host unit 50 by making an inquiry to the OS. A step 1813 obtains a remaining amount of power of the battery, based on the driving power supply information.

A step 1815 decides whether or not the remaining amount of power of the battery is less than or equal to a predetermined amount. For example, the predetermined amount is 30% of the full capacity of the battery. The predetermined amount may be set and changed arbitrarily by the user.

If the decision result in the step 1815 is YES, a step 1817 sends to the optical disc drive 20 a formatting discontinue request command which requests the discontinuance of the formatting. As described above, the Start Stop Unit Command or the Close Session/Track Command may used as the formatting discontinue request command. The bit 0 (start bit) and the bit 1 (LoEj bit) of the byte 4 of the Descriptor Block in the Start Stop Unit Command are set to "0" when sending the Start Stop Unit Command as the formatting discontinue request command. Alternatively, the bit 0 (track bit) and the bit 1 (session bit) of the byte 2 of the Descriptor Block in the Close Session/Track Command are set to "0" when sending the Close Session/Track Command as the formatting discontinue request command. The process shown in FIG. 16 ends after the step 1817 issues the formatting discontinue request command.

The process shown in FIG. 16 ends if the decision result in the step 1807 is NO. In this case, the continuance of the background formatting is determined.

The process returns to the step 1801 if the decision result in the step 1815 is NO.

Figure 17:
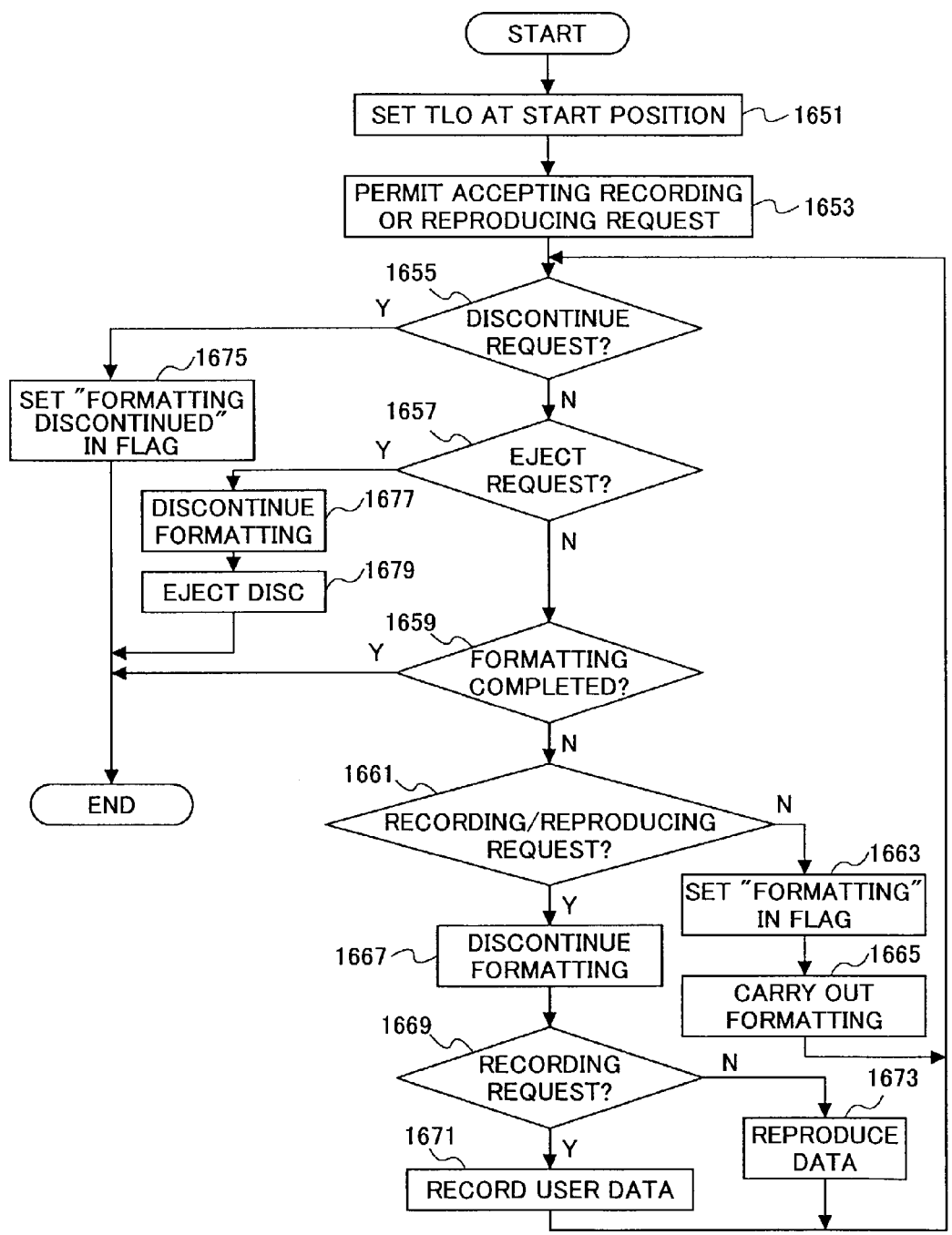
FIG. 17 is a flow chart for explaining the background formatting which is automatically resumed.

Next, a description will be given of a process of the optical disc drive 20, which automatically resumes the background formatting and corresponds to the step 1609 shown in FIG. 14, by referring to FIG. 17. FIG. 17 is a flow chart for explaining the background formatting which is automatically resumed. A start address of a program corresponding to the flow chart shown in FIG. 17 is set in the program counter of the CPU 40 in response to a request to automatically resume the background formatting, and algorithms corresponding to the flow chart shown in FIG. 17 are started. The flow chart shown in FIG. 17 corresponds to a series of algorithms executed by the CPU 40.

First, a step 1651 shown in FIG. 17 carries out an initializing process by setting "0" to various flags including an eject request flag which is set with the existence of the eject request, a reception flag which is set with the existence of the recording or reproducing request, a formatting discontinue request flag which is set with the existence of the formatting discontinue request and the formatting flag which indicates the formatting status, and refers to the FDCB recorded within the Lead-In region LIA, so as to search for the position of the TLO. Then, a step 1653 notifies the host unit 50 that the optical disc drive 20 can accept a recording or reproducing request.

A step 1655 decides whether or not the formatting discontinue request command is received from the host unit 50. When the formatting discontinue request command is received from the host unit 50, "1" is set in the formatting discontinue request flag by an interrupt process. Hence if the formatting discontinue request flag is "1", the decision result in the step 1655 is NO, and the process advances to a step 1657.

The step 1657 decides whether or not an optical disc eject request requesting ejection of the optical disc 15 is received. When the eject request is received from the host unit 50, "1" is set in the eject request flag by an interrupt process. If no eject request is received, the decision result in the step 1657 is NO, and the process advances to a step 1659.

The step 1659 decides whether or not the formatting is completed, similarly to the step 1507 described above in conjunction with FIG. 13. If the decision result in the step 1659 is NO, a step 1661 decides whether or not a recording/reproducing (recording or reproducing) request is received from the host unit 50, based on the reception flag. If no recording/reproducing request is received and the reception flag is not set to "1", the decision result in the step 1661 is NO, and the process advances to a step 1663.

The step 1663 sets "1" in the formatting flag to indicate that the formatting is in progress. Then, a step 1665 carries out the formatting of the optical disc 15. When the Get Event Status Notification Command (event status request command) is received from the host unit 50 during the formatting, a reference is made to the formatting flag and the Media Event Code "0h" shown in FIG. 11 is set to indicate that there is no change in the event (that is, the formatting is in progress), and the Media Event Descriptor is sent to the host unit 50 by an interrupt process as a response with respect to the Get Event Status Notification Command. Hence, even after the formatting discontinue request command is sent, for example, the host unit 50 can recognize that the discontinuance of the background formatting is not completed. After the recording of the dummy data amounting to 16 sectors (1 ECC block) is completed, for example, the process returns to the step 1655.

Thereafter, the steps 1655 through 1665 are repeated until the decision result becomes YES in one of the steps 1655, 1657, 1659 and 1661, and the formatting of the optical disc 15 progresses in this manner.

On the other hand, if the reception flag is set to "1" and the decision result in the step 1661 is YES, the process advances to a step 1667. The step 1667 resets the reception flag to "0", and discontinues the formatting. A step 1669 analyzes the received command, and decides whether or the command from the host unit 50 is the recording request command. If the decision result in the step 1669 is YES, a step 1671 records the user data received from the host unit 50 in a specified region of the data region DZA, and the process returns to the step 1655.

On the other hand, if the reproducing request is received from the host unit 50 and the decision result in the step 1669 is NO, a step 1673 reproduces the user data recorded in a region specified from the host unit 50, and transfers the reproduced user data to the host unit 50. The process returns to the step 1655 after the step 1673 ends.

If the formatting discontinue request flag is set to "1" and the decision result in the step 1655 is YES, the formatting discontinue request flag is reset to "0", and the process advances to a step 1675. The step 1675 sets "2" in the formatting flag to indicate that the discontinuance of the formatting is completed. When the Get Event Status Notification Command is received from the host unit 50, a reference is made to the formatting flag, and the code "7h" shown in FIG. 11 which indicates that the discontinuance of the background formatting is completed is set in the Media Event Code. Moreover, the Media Event Descriptor is sent to the host unit 50 by an interrupt process, as a response with respect to the Get Event Status Notification Command. Hence, the host unit 50 can recognize that the discontinuance of the background formatting is completed.

If the eject request is received, that is, the eject request flag is set to "1", the decision result in the step 1657 is YES, and the process advances to a step 1677. The step 1677 resets the eject request flag to "0", and discontinues the formatting, similarly to the step 1521 shown in FIG. 13 described above. A step 1679 instructs the disc load/eject system (not shown) to eject the optical disc 15, similarly to the step 1523 shown in FIG. 13 described above, and the process shown in FIG. 17 ends.

If the decision result in the step 1659 is YES, the process shown in FIG. 17 ends.

Figure 18:
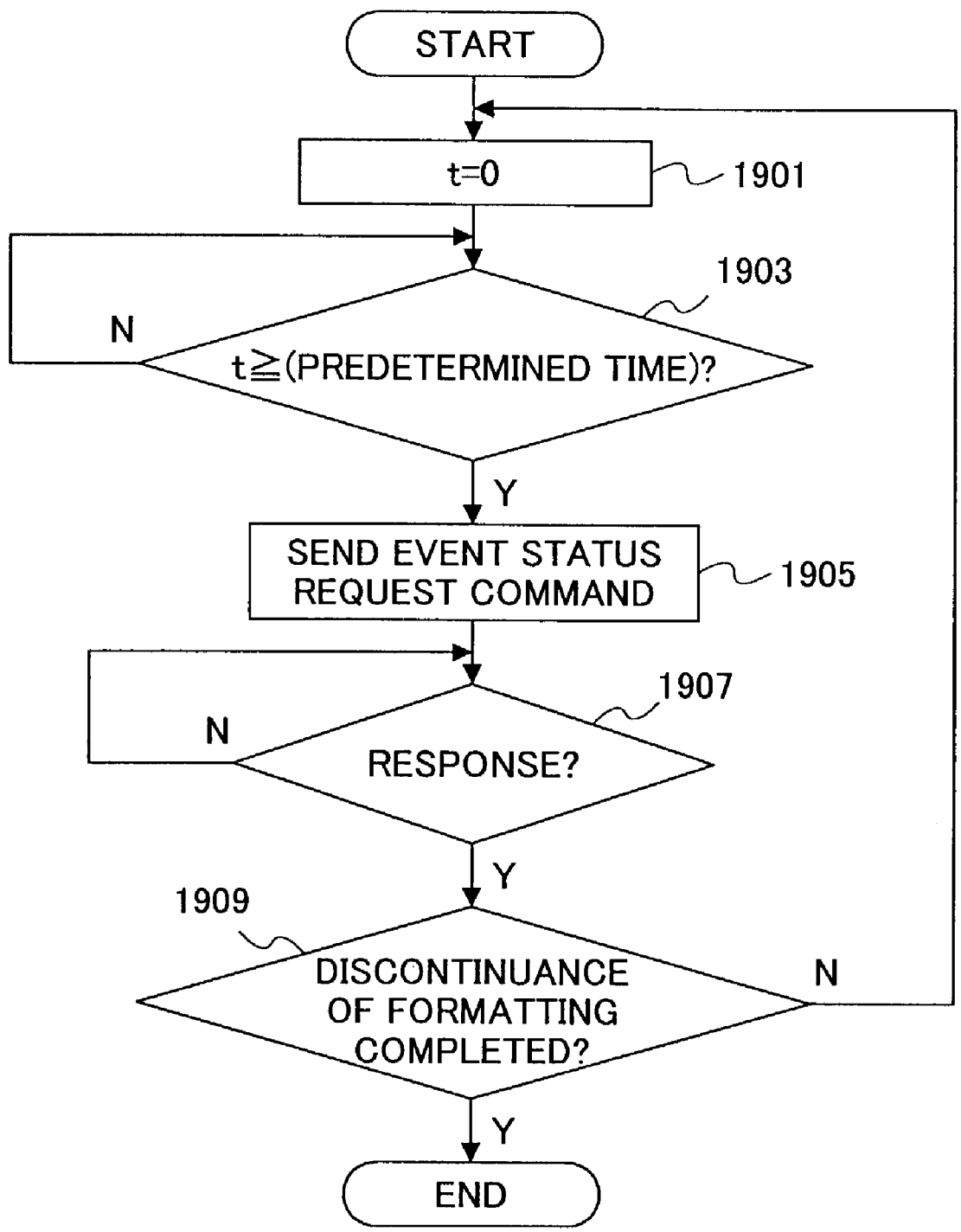
FIG. 18 is a flow chart for explaining a discontinue confirmation process of the host unit after sending a formatting discontinue request command.

Next, a description will be given of a process of the host unit after sending the formatting discontinue request command to the optical disc drive 20, by referring to FIG. 18. FIG. 18 is a flow chart for explaining a discontinue confirmation process of the host unit 50 after sending the formatting discontinue request command. When the host unit 50 sends the formatting discontinue request command, a start address of a program corresponding to the flow chart shown in FIG. 18 is set in the program counter of the microcomputer of the main control unit 52, and algorithms corresponding to the flow chart shown in FIG. 18 are started. The flow chart shown in FIG. 18 corresponds to a series of algorithms executed by the microcomputer of the main control unit 52.

First, a step 1901 shown in FIG. 18 carries out an initializing process to set "0" in a timer counter t. This timer counter t is incremented by +1 by a timer interrupt process which is started for every predetermined time of 5 msec, for example. A step 1923 decides whether or not the value of the timer counter t is greater than or equal to a predetermined value, to determine whether or not a predetermined time of 1 to 2 sec has elapsed, for example. If the decision result in the step 1903 is YES, the process advances to a step 1905.

The step 1905 sends the Get Event Status Notification Command, that is, the event status request command, to the optical disc drive 20. A step 1907 decides whether or not a response is received from the optical disc drive 20. If the decision result in the step 1907 is YES, the process advances to a step 1909. When the optical disc drive 20 receives the Get Event Status Notification Command, the optical disc drive 20 sets a code corresponding to the event status in the Media Event Code as shown in FIG. 11, and sends the Media Event Descriptor to the host unit 50.

The step 1909 decides whether or not the discontinuance of the background formatting is completed. In other words, the step 1909 extracts the Media Event Code from the received Media Event Descriptor, and decides whether or not the Media Event Code is "7h". If the Media Event Code is not "7h" and the decision result in the step 1909 is NO, the process returns to the step 1901. On the other hand, if the Media Event Code is "7h" and the decision result in the step 1909 is YES, the process shown in FIG. 18 ends.

Therefore, according to this third embodiment of the information recording system, a power supply information acquiring means (or section), a determination means (or section), an issuing means (or section) and a confirming means (or section) of the information processing apparatus are realized by the microcomputer of the main control unit 52 and the program executed by the microcomputer. In addition, a discontinuing means (or section) and a notifying means (or section) of the information recording apparatus are realized by the CPU 40 and the program executed by the CPU 40.

Of course, a part of or all of the processes carried out by the microcomputer of the main control unit 52 according to the program may be realized by hardware. Moreover, a part of or all of the processes carried out by the CPU 40 according to the program may be realized by hardware.

In this third embodiment, of the programs installed in one or more hard discs of the HDD 56, the programs corresponding to the flow charts shown in FIGS. 12, 15, 16 and 18 form the first determination program described above.

In the process carried out by the host unit 50 when the formatting request is input, the step 1401 shown in FIG. 12 forms a first step of the recording method according to the present invention, and the steps 1403 and 1407 shown in FIG. 12 form a second step of the recording method according to the present invention. In the process carried out by the host unit 50 when the Media Event Code "6h" shown in FIG. 11. is received, the step 1701 shown in FIG. 15 forms the first step of the information recording method, and the steps 1703 and 1707 shown in FIG. 15 form the second step of the information recording method. Further, in the process carried out by the host unit 50 during the background formatting shown in FIG. 16, the step 1809 shown in FIG. 16 forms the first step of the information recording method, and the step 1815 shown in FIG. 16 forms the second step of the information recording method.

In the third embodiment of the information recording system, when the optical disc 15 is loaded into the optical disc drive 20, the driving power supply of the host unit 50 is a battery and the remaining amount of power (capacity) of the battery is less than or equal to a predetermined amount, the host unit 50 prohibits the formatting and prohibits issuance of the formatting request command even when the formatting request is input from the user. In other words, when the driving power supply is the battery and the remaining amount of power (capacity) of the battery is less than or equal to the predetermined amount, it is possible to prevent excessive wear of the battery because the formatting is prohibited. Hence, it is possible to avoid a power shut down which cannot be anticipated, and to prevent the reproduction of the data from becoming incomplete or the additional writing of the data from becoming impossible. That is, it is possible to suppress wear of the driving power supply, and to promote effective utilization of the driving power supply.

In this third embodiment, when the background formatting is automatically resumed in the optical disc drive 20, the host unit 50 determines discontinuance of the background formatting if the driving power supply is a battery and the remaining amount of power of the battery is less than or equal to a predetermined amount. Accordingly, even in a case where the background formatting is automatically resumed, the background formatting is discontinued if the driving power supply is the battery and the remaining amount of power of the battery is less than or equal to the predetermined amount, thereby preventing excessive wear of the battery.

Furthermore, if the driving power supply is a battery and the background formatting is in progress, the host unit 50 periodically checks the remaining amount of power of the battery. The host unit 50 determines the discontinuance of the background formatting if the remaining amount of power of the battery is less than or equal to the predetermined amount, and sends a formatting discontinue request command. In other words, even if the background formatting is permitted, the background formatting is discontinued when the remaining amount of power of the battery becomes less than or equal to the predetermined amount during the background formatting, so as to prevent excessive wear of the battery.

Even when the optical disc drive 20 receives the formatting discontinue request command during the recording of the dummy data when carrying out the background formatting, the formatting is not discontinued until the dummy data amounting to a predetermined amount (for example, 16 sectors) is recorded. Hence, it is possible to positively record the predetermined amount of dummy data, and to prevent the reproduction of the data from becoming incomplete. After the predetermined amount of dummy data is recorded, the optical disc drive 20 sends a Media Event Descriptor set with a Media Event Code "7h". For this reason, the host unit 50 can detect a timing at which the discontinuance of the formatting is completed, approximately in real-time, and it is possible to smoothly advance to a next process after the formatting is discontinued, for example.

When the driving power supply of the host unit 50 is a battery and the remaining amount of power (capacity) of the battery is less than or equal to a predetermined amount, this third embodiment prohibits the formatting as shown in FIG. 12. However, in a case where the full capacity of the battery is small, for example, it is also possible to immediately prohibit the formatting, regardless of the remaining amount of power (capacity) of the battery, if the driving power supply of the host unit 50 is the battery. In other words, the steps 1405 and 1407 shown in FIG. 12 may be omitted.

When the background formatting is automatically resumed, if the driving power supply of the host unit 50 is a battery and the remaining amount of power (capacity) of the battery is less than or equal to a predetermined amount, the host unit 50 of this third embodiment determines the discontinuance of the background formatting as shown in FIG. 15. But in a case where the full capacity of the battery is small, for example, it is also possible to immediately determine the discontinuance of the background formatting, regardless of the remaining amount of power (capacity) of the battery, if the driving power supply of the host unit 50 is the battery. In other words, the steps 1705 and 1707 shown in FIG. 15 may be omitted.

This third embodiment uses the Start Stop Unit Command or the Close Session/Track Command as the formatting discontinue request command. However, the formatting discontinue request command is not limited to such commands. Moreover, the bit positions which instruct the formatting discontinue request are also not limited to those of this third embodiment.

As shown in FIG. 18, the host unit 50 of this third embodiment periodically sends the Get Event Status Notification Command to the optical disc drive 20 as the event status request command. However, it is of course possible to use other commands such as a Test Unit Ready Command, as the event status request command. Since the Test Unit Ready Command is a polling command, the optical disc drive 20 notifies the event status to the host unit 50 when the event status changes in response to the polling command.

In this third embodiment, the host unit 50 determines whether to continue or discontinue the formatting, during the background formatting which is automatically resumed. However, the host unit 50 may of course determine whether to continue or discontinue the formatting during the formatting (including the background formatting) which is carried out in response to a formatting request command which is issued from the host unit 50 responsive to a request input from the user.

When the discontinuance of the background formatting is completed, the optical disc drive 20 of this third embodiment sends a Media Event Descriptor which is set with a Media Event Code "7h" as the discontinuance complete information. However, the discontinuance complete information is of course not limited to such a code.

In this third embodiment, the first determination program is recorded in one or more hard discs of the HDD 56, however, the first determination program may be recorded in other recording media such as CD-ROMs, magneto-optical discs, flash memories and flexible discs. In this case, a medium drive corresponding to the information recording medium used is provided, and the first determination program is installed into the host unit 50 from this medium drive. Of course, the first determination program may be transferred to the one or more hard discs of the HDD 56 from other recording media. The first determination program may also be transferred to the one or more hard discs of the HDD 56 or to the main memory, via one or more networks. All that is required is for the first determination program to be loaded into the main memory of the microcomputer of the host unit 50, so that the host unit 50 can carry out the processes described above by executing the first determination program.

Next, a description will be given of a fourth embodiment of the information recording system according to the present invention, by referring to FIGS. 19 and 20. This fourth embodiment of the information recording system employs a fourth embodiment of the information recording method according to the present invention, a fourth embodiment of the information recording apparatus according to the present invention, a fourth embodiment of the information processing apparatus according to the present invention, and a fourth embodiment of the computer-readable storage medium according to the present invention.

This fourth embodiment is characterized in that, unlike the third embodiment described above, the process which determines whether the formatting is to be continued or discontinued (permitted or prohibited) is carried out in the optical disc drive 20. In other words, only a portion of the programs stored in the one or more hard discs of the HDD 56 and the ROM 39 differ from that of the third embodiment, and other structures of this fourth embodiment are the same as those corresponding structures of the third embodiment. Hence, only the features of this fourth embodiment which are different from those of the third embodiment will be described in this specification. In the following description, those parts which are the same as those corresponding parts of the third embodiment will be designated by the same reference numerals, and a description thereof will be simplified or omitted.

In this fourth embodiment, the ROM 39 stores programs written in codes decodable by the CPU 40, including a second determination program which determines whether to continue or discontinue (permit or prohibit) the formatting. When the power supply of the optical disc 20 is turned ON, the programs including the second determination program are read from the ROM 39 and loaded into the main memory.

A description will be given of a process of the optical disc drive 20 when the optical disc 15 ejected during the formatting is again loaded into the optical disc drive 20 and a Write Command (recording request command) is received from the host unit 50, by referring to FIG. 19. FIG. 19 is a flow chart for explaining the process of the optical disc drive 20 when determining by the optical disc drive 20 whether to permit or prohibit automatic resuming of the background formatting in this fourth embodiment of the information recording system according to the present invention. When the Write Command is received from the host unit 50 in a state other than during the formatting, a start address of a program corresponding to the flow chart shown in FIG. 19 is set in the program counter of the CPU 40, and algorithms corresponding to the flow chart shown in FIG. 19 are started. The flow chart shown in FIG. 19 corresponds to a series of algorithms executed by the CPU 40. It is assumed in this fourth embodiment that the preconditions related to the optical disc 15 are the same as those of the third embodiment described above.

Figure 19:
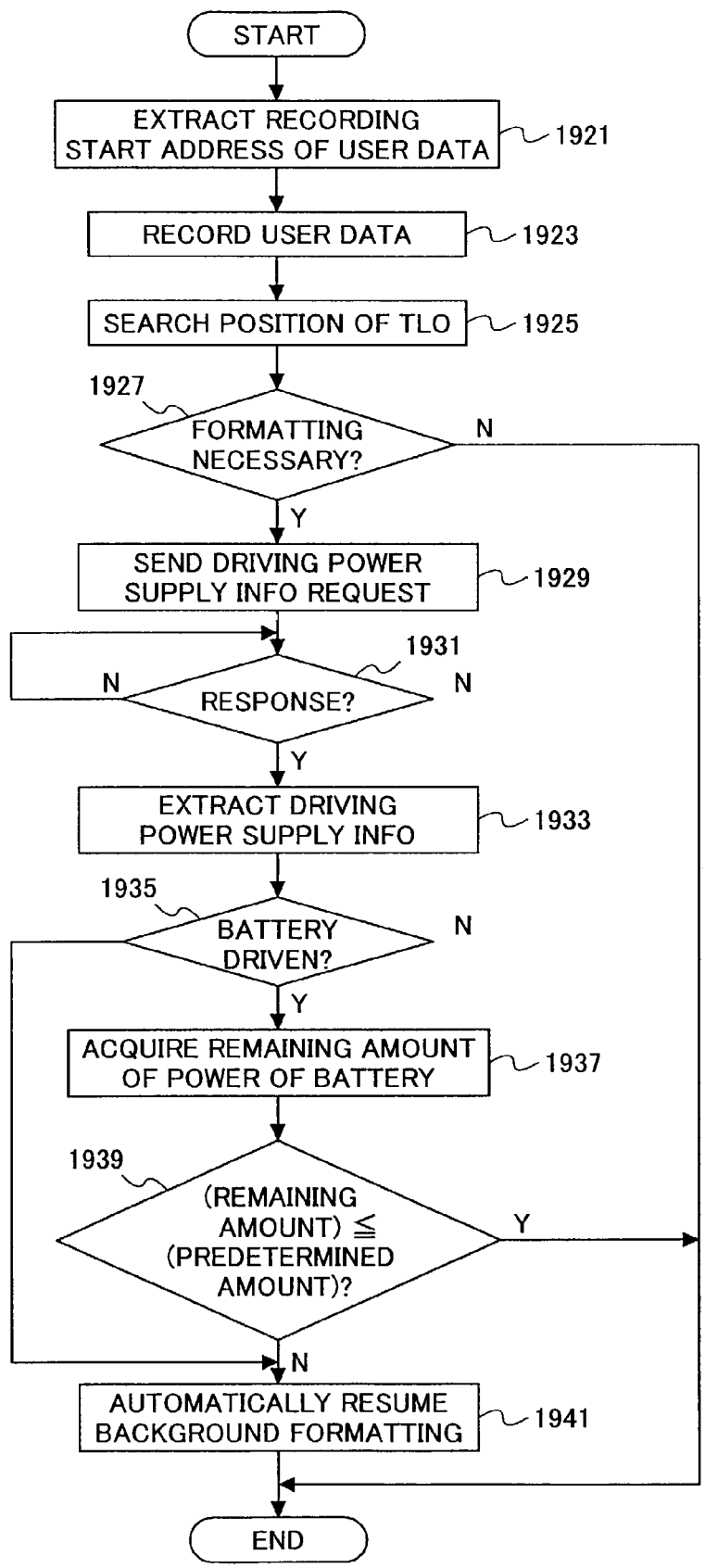
FIG. 19 is a flow chart for explaining a process of the optical disc drive when determining by the optical disc drive whether to permit or prohibit automatic resuming of the background formatting in a fourth embodiment of the information recording system according to the present invention.

Steps 1921 through 1925 shown in FIG. 19 carry out processes similar to those of the steps 1601 through 1605 of the third embodiment shown in FIG. 14.

A step 1927 shown in FIG. 19 decides whether or not the formatting is necessary, similarly to the step 1607 shown in FIG. 14. If the decision result in the step 1927 is YES, the process advances to a step 1929.

The step 1929 sends to the host unit 50 a driving power supply information request command which requests the driving power supply information, in order to acquire the driving power supply information. When the host unit 50 receives the driving power supply information request command, the host unit 50 acquires the driving power supply information from the OS and responds to the optical disc drive 20.

A step 1931 waits for a response from the host unit 50 and decides whether or not a response is received from the host unit 50. If the decision result in the step 1931 is YES, a step 1933 obtains the kind of driving power supply based on the driving power supply information received from the host unit 50.

A step 1935 decides whether or not the kind of driving power supply is a battery. If the decision result in the step 1935 is YES, a step 1937 obtains a remaining amount of power of the batter based on the driving power supply information received from the host unit 50.

A step 1939 decides whether or not the remaining amount of power of the battery is less than or equal to a predetermined amount. For example, the predetermined amount is 30% of the full capacity of the battery. If the decision result in the step 1939 is NO, a step 1941 permits the background formatting and automatically resumes the background formatting. The process shown in FIG. 19 ends when the resumed background formatting ends.

On the other hand, if the decision result in the step 1939 is YES, the process shown in FIG. 19 ends. That is, the automatic resuming of the background formatting is prohibited.

If the decision result in the step 1935 is NO, the process advances to the step 1941. In other words, the automatic resuming of the background formatting is permitted.

If the decision result in the step 1927 is NO, the process shown in FIG. 19 ends. In this case, the background formatting will not be automatically resumed.

Next, a description will be given of a process of the optical disc drive 20, which automatically resumes the background formatting and corresponds to the step 1941 shown in FIG. 19, by referring to FIG. 20. FIG. 20 is a flow chart for explaining the background formatting which is automatically resumed, that is, the process of the optical disc drive 20 when determining by the optical disc drive 20 whether to continue or discontinue the formatting during the background formatting based on the remaining amount of power of the battery. A start address of a program corresponding to the flow chart shown in FIG. 20 is set in the program counter of the CPU 40 when the automatic resuming of the background formatting is permitted, and algorithms corresponding to the flow chart shown in FIG. 20 are started. The flow chart shown in FIG. 20 corresponds to a series of algorithms executed by the CPU 40.

Figure 20:
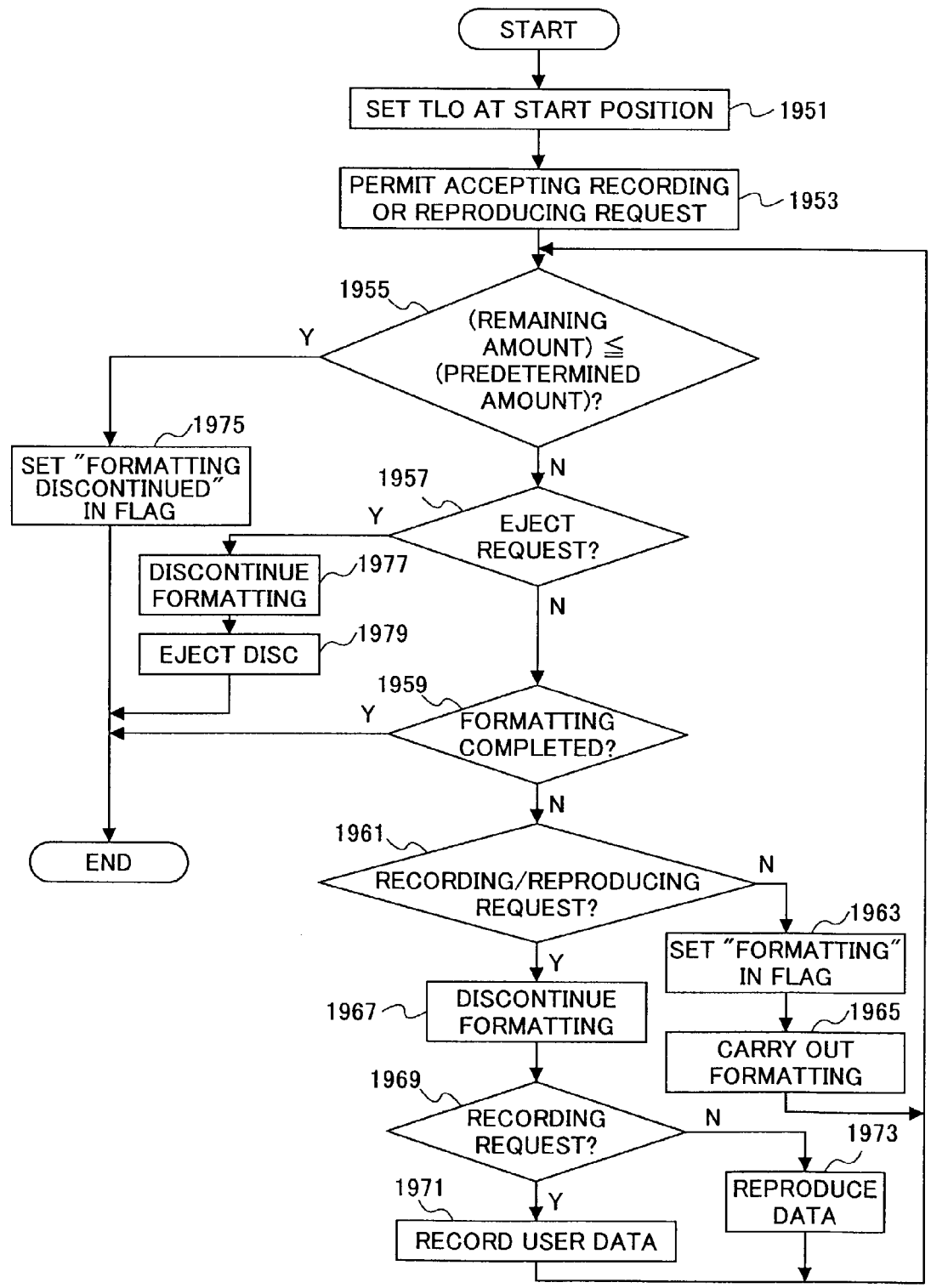
FIG. 20 is a flow chart for explaining a process of the optical disc drive when determining by the optical disc drive whether to continue or discontinue the formatting during the background formatting based on the remaining amount of power of the battery.

Steps 1951 and 1953 shown in FIG. 20 carry out processes similar to those of the steps 1651 and 1653 of the third embodiment shown in FIG. 17.

A step 1955 decides whether or not the remaining amount of power of the battery is less than or equal to a predetermined amount. For example, the predetermined amount is 30% of the full capacity of the battery. If the decision result in the step 1955 is NO, the process advances to a step 1957, and the continuance of the background formatting is determined. During the background formatting, the CPU 40 periodically sends the driving power supply information request command to the host unit 50 by a timer interrupt, for example, and obtains the remaining amount of power of the battery based on the driving power supply information which is received from the host unit 50 as a response.

The step 1957 decides whether or not the eject request exists, similarly to the step 1657 of the third embodiment shown in FIG. 17. If the decision result in the step 1957 is NO, the process advances to a step 1959.

Steps 1959 through 1973 carry out processes similar to those of the steps 1659 through 1673 of the third embodiment shown in FIG. 17.

On the other hand, if the decision result in the step 1955 is YES, the process advances to a step 1975 and the discontinuance of the background formatting is determined.

The step 1975 sets "2" in the formatting flag to indicate that the discontinuance of the formatting is completed, similarly to the step 1675 of the third embodiment shown in FIG. 17. When the Get Event Status Notification Command is received from the host unit 50, a reference is made to the formatting flag, and the code "7h" shown in FIG. 11 which indicates that the discontinuance of the background formatting is completed is set in the Media Event Code. Moreover, the Media Event Descriptor is sent to the host unit 50 by an interrupt process, as a response with respect to the Get Event Status Notification Command. Hence, the host unit 50 can recognize that the discontinuance of the background formatting is completed.

If the decision result in the step 1957 is YES, the process advances to a step 1977. Steps 1977 and 1979 carry out processes similar to those of the steps 1677 and 1679 of the third embodiment shown in FIG. 17, and the process shown in FIG. 20 ends.

Therefore, according to the fourth embodiment of the information recording system, a power supply information acquiring means (or section), a determination means (or section) and a recording control means (or section) of the information recording apparatus are realized by the CPU 40 and the program executed by the CPU 40. But of course, a part of or all of the processes carried out by the CPU 40 according to the program may be realized by hardware.

In this fourth embodiment, of the programs stored in the ROM 39, the programs corresponding to the flow charts shown in FIGS. 19 and 20 form the second determination program described above.

In the process shown in FIG. 19 carried out by the CPU 40 when the Write Command (recording request command) is received, the step 1929 shown in FIG. 19 forms a first-step of the recording method according to the present invention, and the steps 1935 and 1939 shown in FIG. 19 form a second step of the recording method according to the present invention. In the process shown in FIG. 20 carried out by the CPU 40 after the background formatting is automatically resumed, an interrupt process (not shown) forms the first step of the information recording method, and the step 1955 shown in FIG. 20 forms the second step of the information recording method.

In the fourth embodiment of the information recording system, the optical disc drive 20 acquires the driving power supply information from the host unit 50 in response to the request to automatically resume the background formatting. In addition, when the driving power supply of the host unit 50 is a battery and the remaining amount of power (capacity) of the battery is less than or equal to a predetermined amount, the CPU 40 prohibits the automatic resuming of the background formatting. Accordingly, when the host unit 50 and the optical disc drive 20 are driven by a battery and the remaining amount of power (capacity) of the battery is less than or equal to the predetermined amount, it is possible to prevent excessive wear of the battery because the automatic resuming of the background formatting is prohibited. Hence, it is possible to avoid a power shut down which cannot be anticipated, and to prevent the reproduction of the data from becoming incomplete or the additional writing of the data from becoming impossible. That is, it is possible to suppress wear of the driving power supply, and to promote effective utilization of the driving power supply.

In this fourth embodiment, when the driving power supply is a battery and the background formatting is in progress, the optical disc drive 20 periodically checks the remaining amount of power of the battery, and determines to discontinue the background formatting if the remaining amount of power of the battery is less than or equal to a predetermined amount. Thus, even in a case where the background formatting is permitted, the background formatting is discontinued if the remaining amount of power of the battery is less than or equal to the predetermined amount, thereby preventing excessive wear of the battery.

When the driving power supply of the information recording system is a battery and the remaining amount of power (capacity) of the battery is less than or equal to a predetermined amount, this fourth embodiment prohibits automatic resuming of the background formatting as shown in FIG. 19. However, in a case where the full capacity of the battery is small, for example, it is also possible to immediately prohibit the automatic resuming of the background formatting, regardless of the remaining amount of power (capacity) of the battery, if the driving power supply of the host unit 50 is the battery. In other words, the steps 1937 and 1939 shown in FIG. 19 may be omitted.

In this fourth embodiment, the optical disc drive 20 determines whether to continue or discontinue the background formatting, during the background formatting which is automatically resumed. However, the optical disc drive 20 may of course determine whether to continue or discontinue the formatting during the formatting (including the background formatting) which is carried out in response to a formatting request command which is issued from the host unit 50 responsive to a request input from the user.

In this fourth embodiment, the second determination program is recorded in the ROM 39, however, the second determination program may be recorded in other recording media such as CD-ROMs, magneto-optical discs, flash memories and flexible discs. In this case, a medium drive corresponding to the information recording medium used is provided, and the second determination program is installed into the optical disc drive 20 from this medium drive. All that is required is for the second determination program to be loaded into the main memory of the CPU 40, so that the CPU 40 can carry out the processes described above by executing the second determination program.

In the third and fourth embodiments described above, the determination to continue or discontinue (permit or prohibit) the formatting, including the background formatting, is made based on the kind of driving power supply and the remaining amount of power of the battery. However, the conditions for determining whether to continue or discontinue (permit or prohibit) the formatting are not limited to the above, and for example, the conditions may include the kind of battery and a manufacturer of the battery, because the characteristics of the battery differ depending on the kind and/or manufacturer of the battery.

Further, in a case where the driving power supply is switched from a battery to an AC power supply in each of the third and fourth embodiments, the formatting discontinue request command is not sent.

In the third and fourth embodiments, the background formatting is carried out as a process accompanying the recording of the dummy data, but the present invention is of course similarly applicable to processes other than the formatting as long as the process accompanies the recording of the dummy data.

The optical disc 15 is DVD+RW in each of the third and fourth embodiments. However, the present invention is similarly applicable to any suitable information recording medium which is subjected to a process which accompanies the recording of the dummy data. In this case, a medium drive corresponding to the information recording medium used is provided.

The host unit 50 and the optical disc drive 20 may be provided within a single housing or, provided within separate housings, in each of the third and fourth embodiments described above.

In each of the third and fourth embodiments described above, it is assumed for the sake of convenience that the medium drive (optical disc drive) capable of recording and reproducing user data is used with respect to the information recording medium. However, the medium drive may be capable of only recording the user data with respect to the information recording medium.

Next, a description will be given of a fifth embodiment of the information recording system according to the present invention, by referring to FIGS. 21 through 27. This fifth embodiment of the information recording system employs a fifth embodiment of the information recording method according to the present invention, a fifth embodiment of the information recording apparatus according to the present invention, a fifth embodiment of the information processing apparatus according to the present invention, and a fifth embodiment of the computer-readable storage medium according to the present invention.

Figure 21:
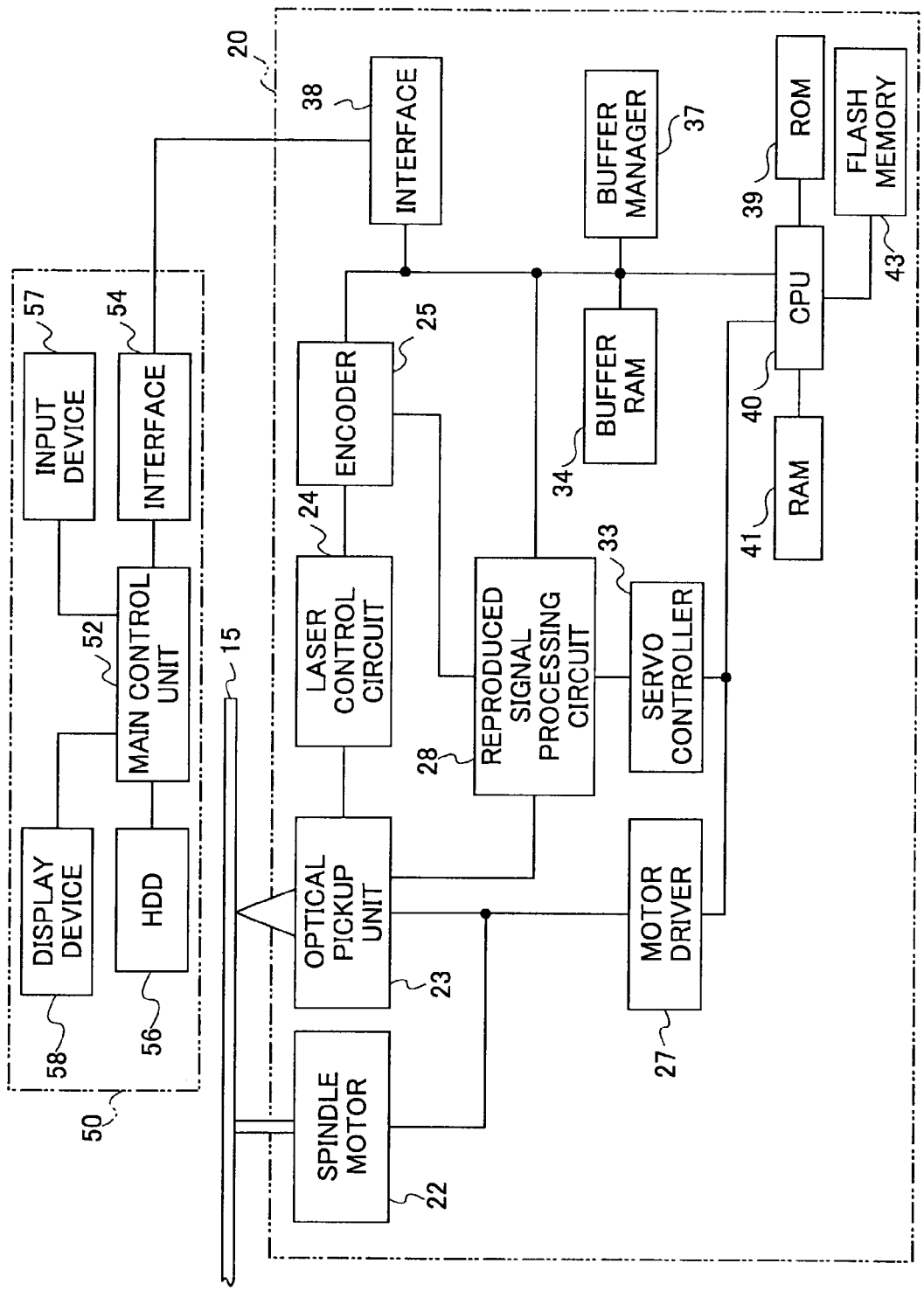
FIG. 21 is a system block diagram showing a fifth embodiment of the information recording system according to the present invention.

FIG. 21 is a system block diagram showing the fifth embodiment of the information recording system according to the present invention. In FIG. 21, those parts which are the same as those corresponding parts of the first embodiment of the information recording system shown in FIG. 1 are designated by the same reference numerals, and a description thereof will be omitted.

In FIG. 21, the ROM 39 stores programs written in codes decodable by the CPU 40, including a recording control program which will be described later. When the driving power supply of the optical disc drive 20 is turned ON, the programs including the recording control program are read from the ROM 39 and loaded into the main memory of the CPU 40. The CPU 40 controls operations of various parts within the optical disc drive 20 and temporarily stores in the RAM 41 data and the like which are necessary for this control, according to the recording control program.

A flash memory 43 is connected to the CPU 40, and stores mode information related to a plurality of modes at least including a mode which permits the recording of the dummy data on the optical disc 15 and a mode which prohibits the recording of the dummy data on the optical disc 15. A mode flag which indicates one of the plurality of modes which is presently selected, is also stored in the flash memory 43. The information stored in the flash memory 43 will not be erased even when the power supply thereto is stopped. In other words, the flash memory 43 is non-volatile.

One or more hard discs of the HDD 56 store programs written in codes decodable by the microcomputer of the main control unit 52, including a mode select program which will be described later. When the driving power supply of the host unit 50 is turned ON, the programs including the mode select program are loaded into the main memory of the main control unit 52.

Figure 22:
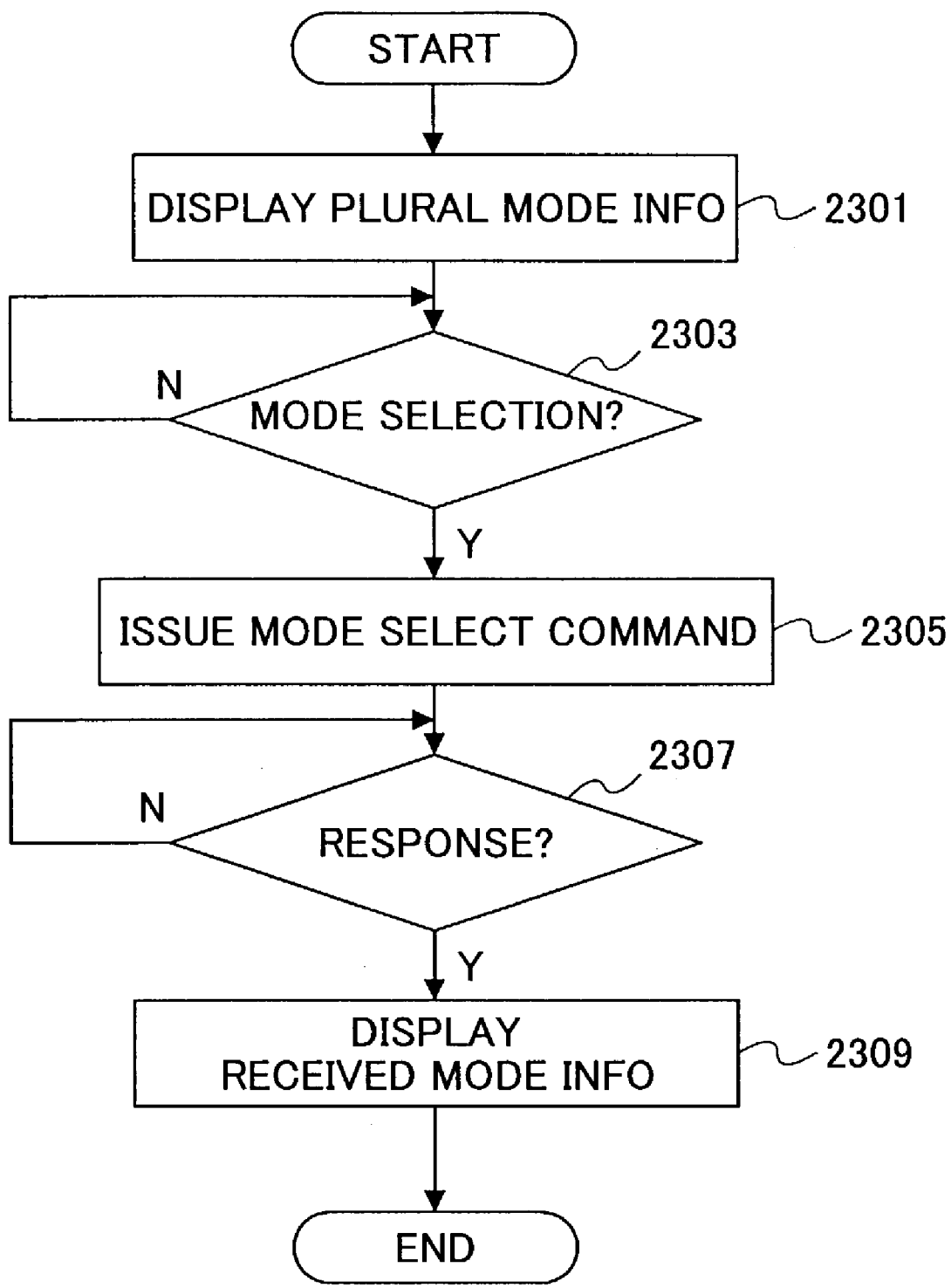
FIG. 22 is a flow chart for explaining a process of the host unit when a mode select request is input by the user.

Next, a description will be given of a process of the host unit 50 when the user inputs a mode select request requesting selection of a mode in the optical disc drive 20 via the input device 57, by referring to FIG. 22. FIG. 22 is a flow chart for explaining the process of the host unit 50 when the mode select request is input by the user. When the mode select request is input, a start address of a program corresponding to the flow chart shown in FIG. 22 is set in the program counter of the microcomputer of the main control unit 52, and algorithms corresponding to the flow chart shown in FIG. 22 are started. The flow chart shown in FIG. 22 corresponds to a series of algorithms executed by the microcomputer of the main control unit 52.

First, a step 2301 shown in FIG. 22 displays on the display device 58 information related to a plurality of modes at least including a mode which permits recording of the dummy data on the optical disc 15 and a mode which prohibits recording of the dummy data on the optical disc 15. Then, a step 2303 waits for the user to select one of the plurality of modes, and decides whether a mode is selected. When a mode selection is input via the input device and the decision result in the step 2303 is YES, the process advances to a step 2305.

The step 2305 issues a mode select command which is set with mode select information related to the selected mode. In this fifth embodiment, a Mode Select Command is used as the mode select command. In addition, the mode select information is set in 5 bits from a bit 3 to a bit 7 of a byte 4 of a Time-Out and Protect Page which is one of Mode Pages added to the Mode Select Command as shown in FIG. 23. FIG. 23 is a diagram for explaining a format of the Time-Out and Protect Page in the fifth embodiment of the information recording system.

In other words, the mode select information is converted into a numerical value from 0 to 31, and is notified to the optical disc drive 20. For example, the mode select information indicates a mode which permits recording of the dummy data when "0", indicates a mode which prohibits recording of the dummy data when "1", indicates a mode which prohibits recording of the dummy data but permits initializing when "2", and indicates a mode which prohibits resuming of the formatting when "3". The bit positions corresponding to the bits 3 to 7 of the byte 4 of the Time-Out and Protect Page are conventionally reserved regions, but this embodiment newly defines these bit positions as bits INIT1 to INIT5 indicating the mode select information.

When the optical disc drive 20 receives the mode select command, the CPU 40 extracts the mode select information set in the 5 bits from the bit 3 to the bit 7 of the byte 4 of the Time-Out and Protect Page. Further, the CPU 40 sets the mode select information in the mode flag, and stores the mode flag in the flash memory 43. The CPU 40 also issues a response command including the extracted mode select information.

A step 2307 waits for the response command from the optical disc drive 20, and decides whether or not the response command is received. If the decision result in the step 2307 is YES, the process advances to a step 2309 which extracts the mode select information included in the response command and displays the corresponding mode information on the display device 58. Hence, the user can recognize the mode selected in the optical disc drive 20, so as to prevent a selection error. The process shown in FIG. 22 ends after the step 2309.

Then, when a formatting request with respect to the optical disc 15 is input from the user via the input device 57, the main control unit 52 issues a Format Unit Command which is a formatting request command requesting the formatting of the optical disc 15.

Figure 24:
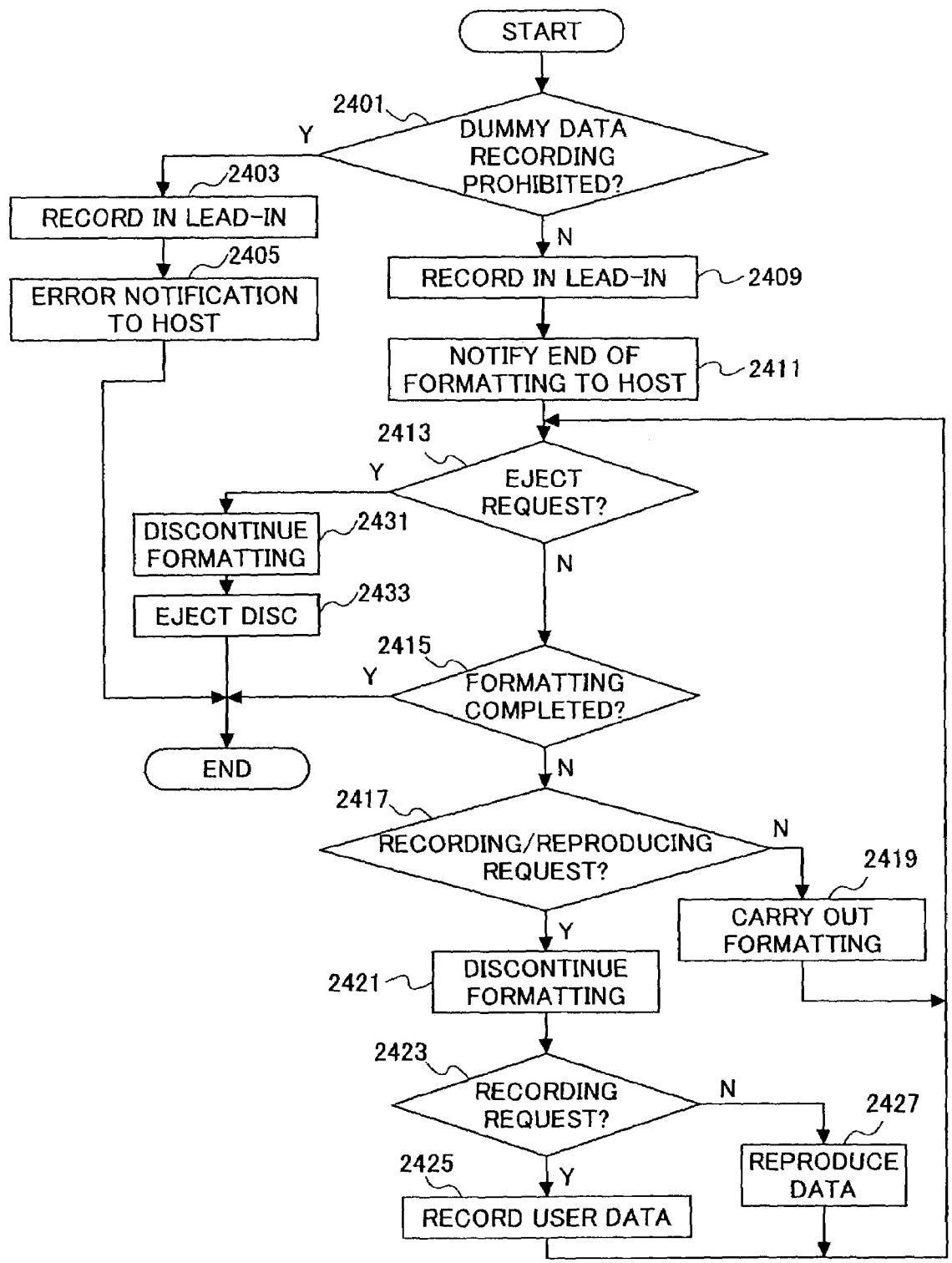
FIG. 24 is a flow chart for explaining a process of the optical disc drive when a formatting request command is received.

Next, a description will be given of a process of the optical disc drive 20 when the formatting request command is received from the host unit 50, by referring to FIG. 24. FIG. 24 is a flow chart for explaining the process of the optical disc drive 20 when the formatting request command is received. A start address of a program corresponding to the flow chart shown in FIG. 24 is set in the program counter of the CPU 40 when the formatting request command is received, and algorithms corresponding to the flow chart shown in FIG. 24 are started. The flow chart shown in FIG. 24 corresponds to a series of algorithms executed by the CPU 40. It is assumed for the sake of convenience that the optical disc 15 is a blank optical disc.

First, a step 2401 shown in FIG. 24 reads the mode flag stored in the flash memory 43, and decides whether or not the mode flag indicates a mode which prohibits the recording of the dummy data. For example, if the mode flag is "2" and the mode which prohibits the recording of the dummy data but permits the initializing of the information recording medium is selected, the decision result in the step 2401 is YES, and the process advances to a step 2403.

The step 2403 records predetermined initial information in a portion of the Lead-In region LIA of the information recording medium shown in FIG. 10A. This predetermined initial information includes the Formatting Disc Control Block (FDCB) which is written with the formatting status and the data recording status in the bit-map format. A step 2405 notifies the host unit 50 of error information which indicates that the recording of the dummy data is prohibited, and the process shown in FIG. 24 ends. In other words, the recording of the predetermined initial information in the Lead-In region LIA is carried out, but the recording of the dummy data in the data region DAZ is not carried out.

On the other hand, if the mode flag is "0", for example, and the mode which permits the recording of the dummy data is selected, the decision result in the step 2401 is NO and a step 2409 records predetermined information in a portion of the Lead-In region LIA, similarly to the step 2403 described above.

A step 2411 initializes the eject request flag which indicates the existence of the eject request and the reception flag which indicates the existence of the recording request or the reproducing request, by setting "0" to the eject request flag and the reception flag, and notifies the host unit 50 that the formatting is normally ended. As a result, the optical disc drive 20 can accept the recording request and the reproducing request.

In this fifth embodiment, the communications between the optical disc drive 20 and the host unit 50, that is, the transmission and reception of the optical disc drive 20 are carried out by an interrupt process. When the optical disc drive 20 receives the recording request command (Write Command) or the reproducing request command (Read Command) from the host unit 50, the reception flag is set to "1" by an interrupt process. Moreover, when the eject request command (Start/Stop Unit Command) is received from the host unit 50, the optical disc drive 20 sets the eject request flag to "1" by an interrupt process.

A step 2413 decides whether or not an optical disc eject request requesting ejection of the optical disc 15 is received. When the eject request is received from the host unit 50, "1" is set in the eject request flag by an interrupt process. If no eject request is received and the eject request flag is "0", the decision result in the step 2413 is NO, and the process advances to a step 2415.

The step 2415 decides whether or not the formatting is completed. Whether or not the formatting is completed may be judged based on the existence of an unrecorded region within the data region DZA shown in FIG. 10A, and it is judged that the formatting is incomplete if the unrecorded region exists. In this case, the blank optical disc 15 is loaded into the optical disc drive 20, and the decision result in the step 2415 is NO. Hence, a step 2417 decides whether or not a recording/reproducing (recording or reproducing) request is received from the host unit 50. If a Write Command (recording request command) requesting the recording or a Read Command (reproducing request command) requesting the reproduction is received from the host unit 50, "1" is set in the reception flag by an interrupt process. If no recording/reproducing request is received and the reception flag is "0", the decision result in the step 2417 is NO, and the process advances to a step 2419.

The step 2419 carries out the formatting of the optical disc 15. In other words, the step 2419 records dummy data amounting to 16 sectors, for example, in the unrecorded portion of the data region DZA. The process returns to the step 2413 after the step 2419, that is, after the recording of the dummy data ends.

Hence, the steps 2413, 2415, 2417 and 2419 are repeated until the decision result becomes YES in one of the steps 2413, 2415 and 2417, and the formatting of the optical disc 15 progresses in this manner.

On the other hand, if the reception flag is set to "1" and the decision result in the step 2417 is YES, the process advances to a step 2421. The step 2421 resets the reception flag to "0", and discontinues the formatting. The step 2423 analyzes the received command, and decides whether or the command from the host unit 50 is the recording request command. If the decision result in the step 2423 is YES, a step 2425 records the user data received from the host unit 50 in a specified region of the data region DZA. The details of the recording process of the optical disc drive 20 will be described later in the specification. The process returns to the step 2413 after the step 2425, that is, after the recording of the user data ends.

On the other hand, if the reproducing request is received from the host unit 50 and the decision result in the step 2423 is NO, a step 2427 reproduces the user data recorded in a region specified from the host unit 50, and transfers the reproduced user data to the host unit 50. The details of the reproducing process of the optical disc drive 20 will be described later in the specification. The process returns to the step 2413 after the step 2427 ends, that is, after the reproduction of the user data specified from the host unit 50 ends.

If the eject request is received, that is, the eject request flag is set to "1", the decision result in the step 2413 is YES, and the process advances to a step 2431. The step 2431 resets the eject request flag to "0", and discontinues the formatting. In addition, if an unrecorded region exists between a Last Written Address LWA of the data in the outermost periphery and a start address of the data region DZA, of the dummy data and the user data recorded within the data region DZA, the dummy data are recorded in this unrecorded region. Furthermore, the FDCB within the lead-in region LWA is updated, and the TLO is recorded following the LWA as shown in FIG. 10B, for example. Hence, it is possible to maintain compatibility with the DVD-ROM.

Then, a step 2433 instructs a disc load/eject system (not shown) to eject the optical disc 15, and the process shown in FIG. 24 ends.

If the decision result in the step 2415 is YES, the FDCB within the Lead-in Region LIA is updated, and the process shown in FIG. 24 ends.

Next, a description will be given of the recording process of the optical disc drive 20.

When the recording request command is received from the host unit 50, the CPU 40 supplies to the motor driver 27 a control signal for controlling the rotation of the spindle motor 22 based on a specified recording speed. In addition, the CPU 40 notifies the reproduced signal processing circuit 28 that the recording request command was received from the host unit 50. The CPU 40 also stores the user data received from the host unit 50 into the buffer RAM 34 via the buffer manager 37.

When the rotation of the optical disc 15 reaches a predetermined linear velocity, the reproduced signal processing circuit 28 detects the focus error signal and the tracking error signal based on the output signal of the monitor (or light receiving unit) within the optical pickup unit 23, and supplies the focus error signal and the tracking error signal to the servo controller 33. Based on the focus error signal and the tracking error signal from the reproduced signal processing circuit 28, the servo controller 33 drives the focusing actuator and the tracking actuator of the optical pickup unit 23 via the motor driver 27, and corrects the focus error and the tracking error.

The reproduced signal processing circuit 28 acquires the ADIP information based on the output signal of the monitor within the optical pickup unit 23, and notifies the ADIP information to the CPU 40. Based on the ADIP information, the CPU 40 supplies to the motor driver 27 a signal which instructs a seek operation to the optical pickup unit 23, that is, controls a seek motor (not shown) of the optical pickup unit 23, so that the optical pickup unit 23 is positioned to a specified write start position.

When the CPU 40 is notified from the buffer manager 37 that the amount of data stored in the buffer RAM 34 exceeded a predetermined amount, the CPU 40 instructs the encoder 25 to create write data. In addition, when the CPU 40 judges based on the ADIP information that the optical pickup unit 23 is located at the write start position, the CPU 40 notifies the encoder 25 that the optical pickup unit 23 is at the write start position. The encoder 25 records the write data on the optical disc 15 via the laser control circuit 24 and the optical pickup unit 23.

Next, a description will be given of the reproducing process of the optical disc drive 20.

When the reproducing request command is received from the host unit 50, the CPU 40 supplies to the motor driver 27 a control signal for controlling the rotation of the spindle motor 22 based on a reproducing speed. In addition, the CPU 40 notifies the reproduced signal processing circuit 28 that the reproducing request command was received from the host unit 50.

Similarly as in the case of the process during the recording described above, the reproduced signal processing circuit 28 notifies the ADIP information to the CPU 40, and corrects the focus error and the tracking error.

Based on the ADIP information, the CPU 40 supplies to the motor driver 27 a signal which instructs a seek operation to the optical pickup unit 23, that is, controls the seek motor of the optical pickup unit 23, so that the optical pickup unit 23 is positioned to a specified read start position. In addition, when the CPU 40 judges based on the ADIP information that the optical pickup unit 23 is located at the read start position, the CPU 40 notifies the reproduced signal processing circuit 28 that the optical pickup unit 23 is at the read start position.

The reproduced signal processing circuit 28 detects an RF signal based on the output signal of the optical pickup unit 23, and after carrying out the error correction process and the like with respect to the RF signal, stores the processed RF signal in the buffer RAM 34 as reproduced data.

The buffer manager 37 transfers the reproduced data to the host unit 50 via the interface 38 when the reproduced data stored in the buffer RAM 34 amount to sector data.

The reproduced signal processing circuit 28 detects the focus error signal and the tracking error signal based on the output of the optical pickup unit 23 as described above until the recording process or the reproducing process ends. Hence, the reproduced signal processing circuit 28 constantly corrects the focus error and the tracking error via the servo controller 33 and the motor driver 27.

Figure 25:
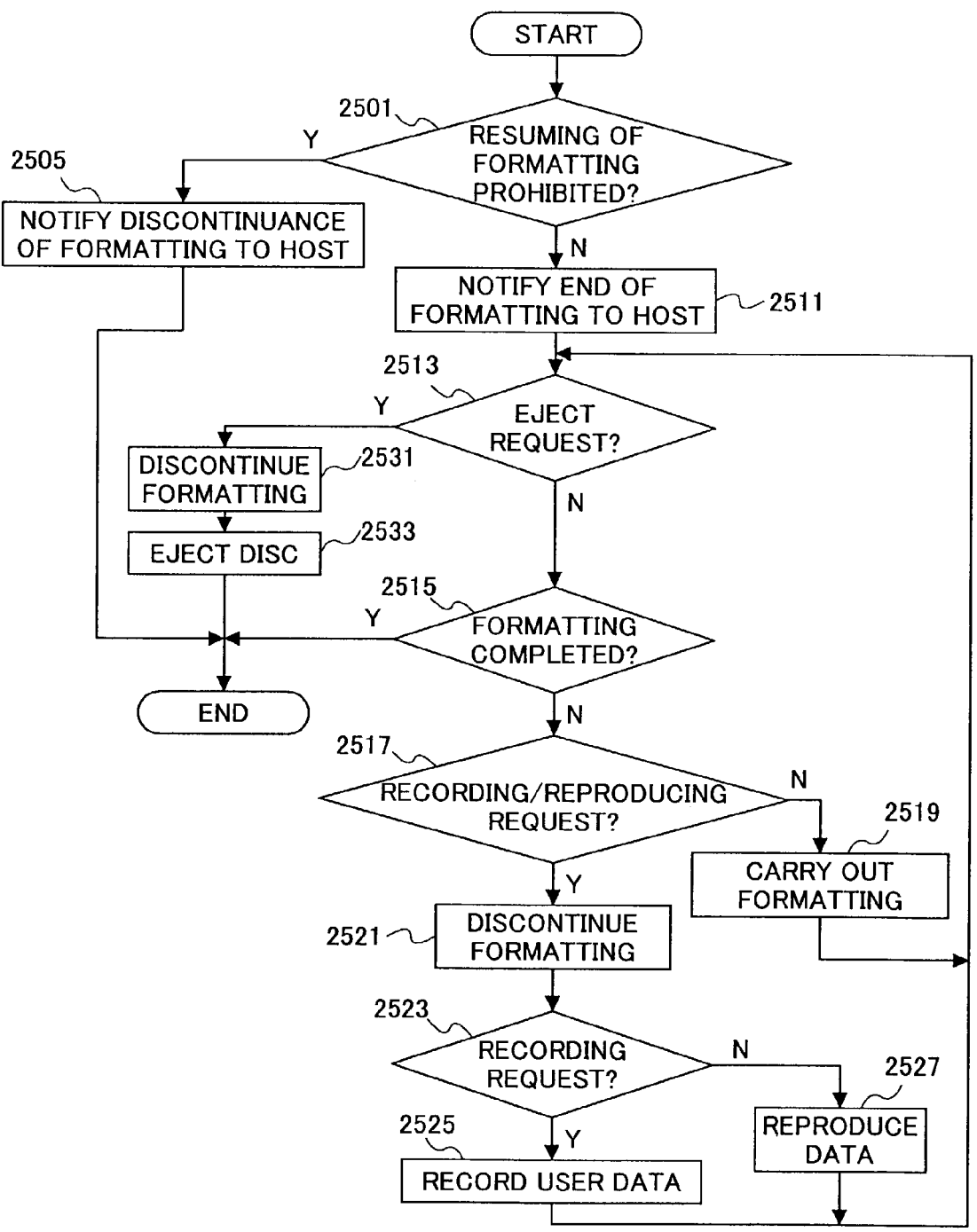
FIG. 25 is a flow chart for explaining a process of the optical disc drive when a command requesting resuming of the formatting is received.

Next, a description will be given of a process of the optical disc drive 20 when the optical disc 15 which was ejected during the formatting is loaded again into the optical disc drive 20 and a command requesting resuming of the formatting (hereinafter referred to as a formatting resume request command) is received from the host unit 50, by referring to FIG. 25. FIG. 25 is a flow chart for explaining the process of the optical disc drive 20 when the formatting resume request command requesting resuming of the formatting is received. When the formatting resume request command is received from the host unit 50, a start address of a program corresponding to the flow chart shown in FIG. 25 is set in the program counter of the CPU 40, and algorithms corresponding to the flow chart shown in FIG. 25 are started. The flow chart shown in FIG. 25 corresponds to a series of processing algorithms executed by the CPU 40.

First, a step 2501 shown in FIG. 25 refers to the mode flag stored in the flash memory 43, and decides whether or not the resuming of the formatting is prohibited. If the mode flag is "3" and the mode which prohibits the resuming of the formatting is selected, the decision result in the step 2501 is YES, and the process advances to a step 2505.

The step 2505 notifies the host unit 50 of the information indicating that the formatting is in a discontinued state, as reception indicating that the formatting resume request command is received, and the process shown in FIG. 25 ends. Instead of notifying the information indicating that the formatting is in the discontinued state, it is of course possible to notify to the host unit 50 information indicating that the formatting is in progress or information indicating that the formatting is ended.

On the other hand, if the mode flag is "0" and the mode which permits the recording of the dummy data is selected, the decision result in the step 2501 is NO, and the process advances to a step 2511.

Steps 2511 through 2533 carry out processes similar to those carried out by the steps 2411 through 2433 shown in FIG. 24 described above. In other words, the formatting is resumed. When the formatting ends or, the optical disc 15 is ejected from the optical disc drive 20 in response to the eject request, the process shown in FIG. 25 ends.

Figure 26:
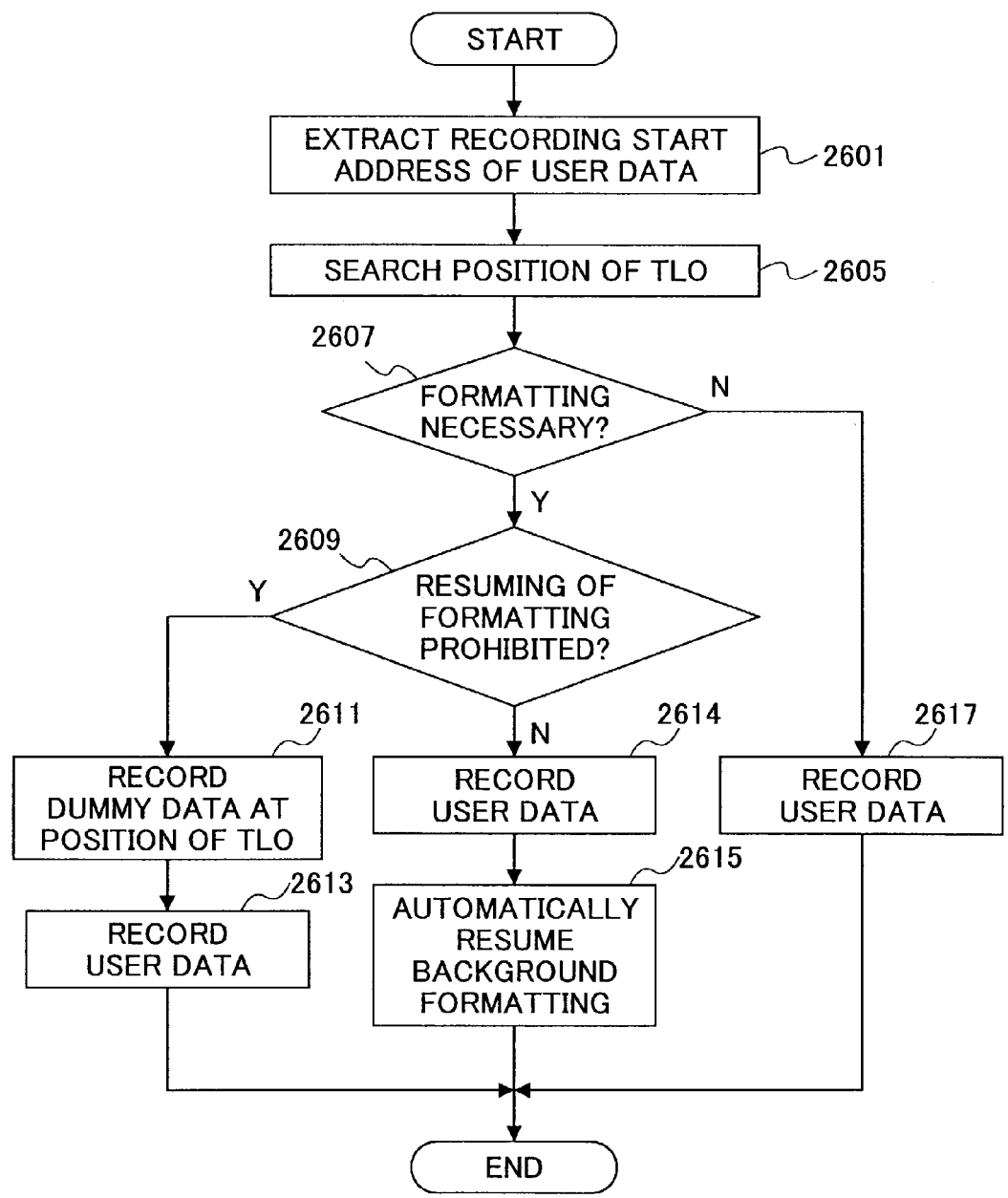
FIG. 26 is a flow chart for explaining a process of the optical disc drive when a recording request command is received.

Next, a description will be given of a process of the optical disc drive 20 when the optical disc 15 ejected during the formatting is again loaded into the optical disc drive 20 and a recording request command is received from the host unit 50, by referring to FIG. 26. FIG. 26 is a flow chart for explaining the process of the optical disc drive 20 when the recording request command is received. When the recording request command is received from the host unit 50 in a state other than during the formatting, a start address of a program corresponding to the flow chart shown in FIG. 26 is set in the program counter of the CPU 40, and algorithms corresponding to the flow chart shown in FIG. 26 are started. The flow chart shown in FIG. 26 corresponds to a series of processing algorithms executed by the CPU 40.

First, a step 2601 shown in FIG. 26 extracts a recording start address of the user data from the recording request command. A step 2605 refers to the FDCB recorded within the Lead-In region LIA of the optical disc 15, so as to search for the position of the TLO. A step 2607 decides whether or not the formatting is necessary. If the address at the position where the TLO is recorded and the recording start address of the user address are compared and the recording start address is requested after the TLO, it is necessary to automatically resume the formatting and the decision result in the step 2607 is YES. The process advances to a step 2609 if the decision result in the step 2607 is YES.

The step 2609 refers to the mode flag stored in the flash memory 43, and decides whether or not the resuming of the formatting is prohibited. If the mode flag is "3" and the mode which prohibits the resuming of the formatting is selected, the decision result in the step 2609 is YES, and the process advances to a step 2611.

The step 2611 records the dummy data at the position where the TLO is recorded. That is, the TLO is erased. Further, a step 2613 records the user data from the host unit 50 at a specified position within the data region DZA as described above. When the recording of the user data is completed, the process shown in FIG. 26 ends. In this case, the background formatting will not be automatically resumed.

On the other hand, if the mode flag is "0" and the mode which permits the recording of the dummy data is selected, the decision result in the step 2609 is NO, and the process advances to a step 2614. The step 2614 records the user data from the host unit 50 at a specified position within the data region DZA. When the recording of the user data is completed, the process advances to a step 2615. The step 2615 resumes the background formatting. In other words, the background formatting is automatically resumed, as will be described later in more detail. When the background formatting ends, the process shown in FIG. 26 ends.

If the recording start address is requested before the TLO, the automatic resuming of the formatting is unnecessary, and the decision result in the step 2607 is NO. If the decision result in the step 2607 is NO, a step 2617 records the user data from the host unit 50 at a specified position within the data region DZA as described above. When the recording of the user data is completed, the process shown in FIG. 26 ends. In this case, the background formatting will not be automatically resumed.

Figure 27:
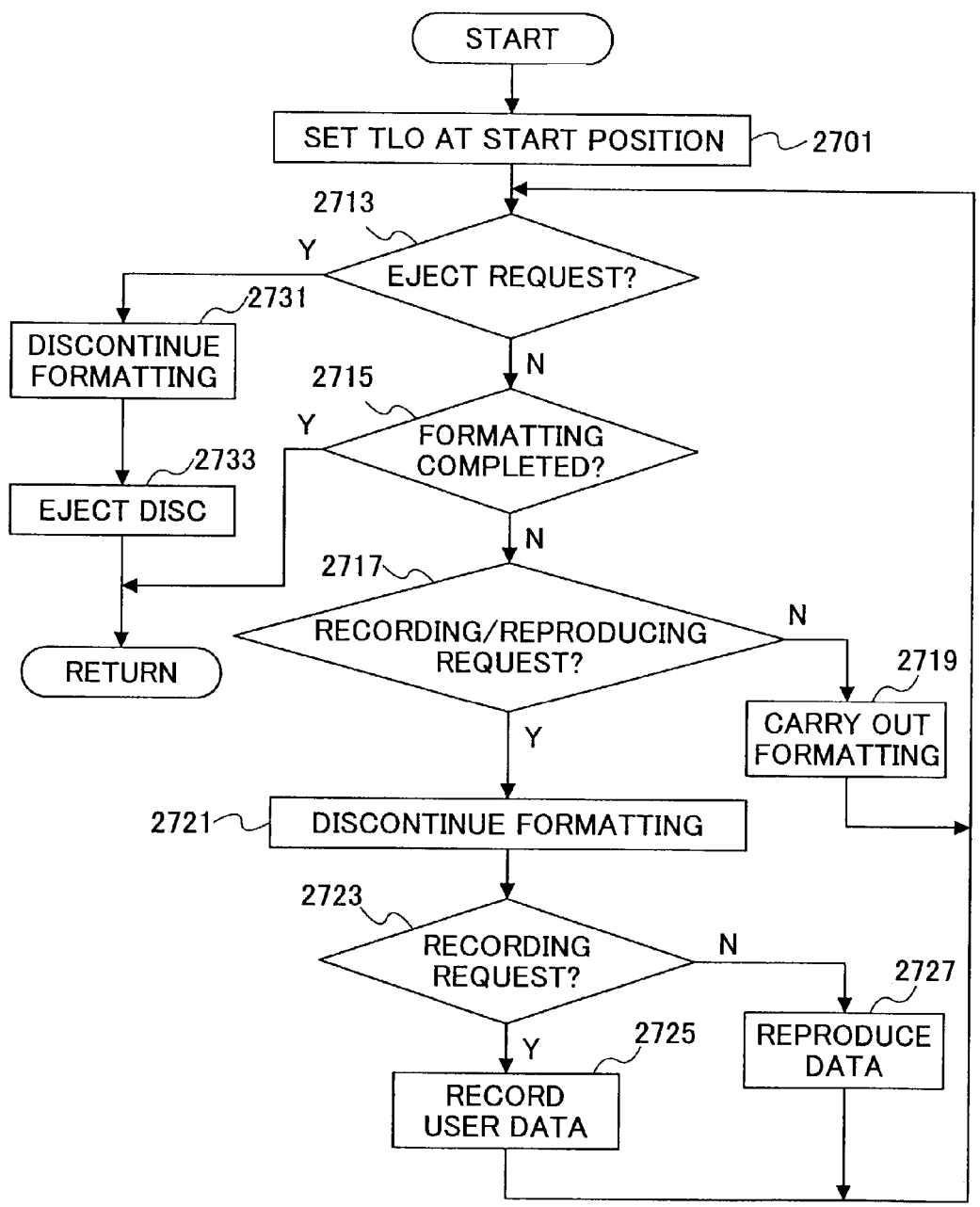
FIG. 27 is a flow chart for explaining an automatically resumed background formatting.

Next, a description will be given of a process of the optical disc drive 20 after the background formatting is automatically resumed, by referring to FIG. 27. FIG. 27 is a flow chart for explaining an automatically resumed background formatting, and corresponds to the step 2615 shown in FIG. 26. A start address of a program corresponding to the flow chart shown in FIG. 27 is set in the program counter of the CPU 40 in response to a request to automatically resume the background formatting, and algorithms corresponding to the flow chart shown in FIG. 27 are started. The flow chart shown in FIG. 27 corresponds to a series of algorithms executed by the CPU 40.

First, a step 2701 shown in FIG. 27 refers to the FDCB recorded within the Lead-In region LIA, so as to search for the position of the TLU. The address at the position where the TLO is recorded is regarded as the start address of the formatting. In other words, the TLO is overwritten by the dummy data.

Steps S2713 through 2733 carry out processes similar to those carried out by the steps 2413 through 2433 shown in FIG. 24, and the dummy data are recorded in the unrecorded region within the data region DZA.

Therefore, according to this fifth embodiment of the information recording system, a mode selecting means (or section) and a processing means (or section) of the information recording apparatus are realized by the CPU 40 and the program executed by the CPU 40. But of course, a part of or all of the processes carried out by the CPU 40 according to the program may be realized by hardware.

In this fifth embodiment, of the programs stored in the ROM 39, the programs corresponding to the flow charts shown in FIGS. 24, 25 and 26 form the recording control program described above. Moreover, of the programs installed in one or more hard discs of the HDD 56, a program corresponding to the flow chart shown in FIG. 22 forms the mode select program described above.

In the process carried out by the CPU 40 when the formatting request is received, the process shown in FIG. 24 forms the second step of the information recording method. In the process carried out by the CPU 40 when the formatting resume request is received, the process shown in FIG. 25 forms the second step of the information recording method. Furthermore, in the process carried out by the CPU 40 when the recording request is received, the processes shown in FIGS. 26 and 27 form the second step of the information recording method.

According to this fifth embodiment, when the user selects one of the plurality of modes at least including the mode which permits the recording of the dummy data on the optical disc 15 and the mode which prohibits the recording of the dummy data on the optical disc 15, the host unit 50 notifies the selected mode to the optical disc drive 20. The optical disc drive 20 carries out a process based on the mode selected by the user. Normally, the power required for the recording process of the optical disc drive 20 is large compared to that required for the reproducing process. Further, in general, the process which accompanies the recording of the dummy data requires an extremely long processing time compared to other processes. In other words, in the process which accompanies the recording of the dummy data, the amount of power consumption may become larger than anticipated. But in a case where the capacity of the driving power supply of the optical disc drive 20 is finite or limited, the user in this fifth embodiment selects the mode which prohibits the recording of the dummy data. Hence, it is possible to avoid a power shut down which cannot be anticipated, and to prevent the reproduction of the data from becoming incomplete or the additional writing of the data from becoming impossible. That is, it is possible to suppress wear of the driving power supply, and to promote effective utilization of the driving power supply.

In addition, when the formatting request command is received in this fifth embodiment, a reference is made to the mode flag stored in the flash memory 43, and the formatting is carried out only when the selected mode permits the recording of the dummy data. Hence, in a case where the capacity of the driving power supply is limited as in the case of a battery, the mode which prohibits the recording of the dummy data may be selected in advance, so that the formatting will not be carried out even when the formatting request command is received, to thereby prevent excessive wear of the driving power supply. As a result, it is possible to avoid a power shut down which cannot be anticipated, and to prevent the reproduction of the data from becoming incomplete or the additional writing of the data from becoming impossible. In other words, it is possible to suppress wear of the driving power supply, and to promote effective utilization of the driving power supply.

Furthermore, when the format request command is received in this fifth embodiment, a reference is made to the mode flag stored in the flash memory 43. If the selected mode prohibits the recording of the dummy data but permits the initializing, the predetermined initial information is recorded in the Lead-In region, so that the user data can be recorded when the recording request command is received thereafter.

When the formatting resume request command is received in this fifth embodiment, a reference is made to the mode flag stored in the flash memory 43. If the selected mode prohibits the resuming of the formatting, the formatting is not resumed. For example, in a case where the capacity of the driving power supply is limited as in the case of a battery, for example, the mode which prohibits the resuming of the formatting may be selected in advance, so that the formatting will not be resumed and the excessive wear of the driving power supply can be prevented. Accordingly, it is possible to avoid a power shut down which cannot be anticipated, and to prevent the reproduction of the data from becoming incomplete or the additional writing of the data from becoming impossible.

Moreover, when the recording request command is received in this fifth embodiment, a check is made to determine whether or not the formatting is necessary. If the formatting is necessary, a reference is made to the mode flag stored in the flash memory 43. If the selected mode prohibits the resuming of the formatting, the TLO is overwritten by the dummy data before recording the user data, and the background formatting is not automatically resumed. For example, in a case where the capacity of the driving power supply is limited as in the case of a battery, for example, the mode which prohibits the resuming of the formatting may be selected in advance, so that the formatting will not be automatically resumed and the excessive wear of the driving power supply can be prevented. Accordingly, it is possible to avoid a power shut down which cannot be anticipated, and to prevent the reproduction of the data from becoming incomplete or the additional writing of the data from becoming impossible.

In this fifth embodiment, the mode is selected in response to the mode select command from the host unit 50. For example, if two power supplies, that is, the A.C. power supply and the battery, may be used as the driving power supply of the host unit 50, the recording of the dummy data may easily be permitted when using the A.C. power supply as the driving power supply in a case where the host unit 50 is used at the user's home, for example. On the other hand, the recording of the dummy data may easily be prohibited when using the battery as the driving power supply in a case where the host unit 50 is used outside the user's home, for example. In other words, the mode, and thus, the process, can be suitably selected depending on the environment in which the host unit 50 is used.

When the resuming of the formatting is prohibited, this fifth embodiment notifies the host unit 50 of the information indicating the discontinuance of the formatting, the formatting in progress or the end of the formatting. Hence, the host unit 50 can judge from the notified information that the formatting resume request is received normally by the optical disc drive 20, and immediately go on to the next process.

Since this fifth embodiment stores the mode flag in the flash memory 43, it is unnecessary to select the mode every time the host unit 50 is turned ON.

In this fifth embodiment, the response command with respect to the mode select command is notified to the host unit 50. Hence, the user can recognize the mode selected by the optical disc drive 20, and a selection error can be prevented. Of course, it is possible to set a command requesting the mode selected by the optical disc drive 20. As a result, the user can always recognize the mode selected by the optical disc drive 20.

Furthermore, this fifth embodiment sets the mode select information in the bits 3 to 7 of the byte 4 of the Time-Out and Protect Page, but the mode select information may be set using other Reserved bits. Moreover, the mode select information may be set using mode pages other than the Time-Out and Protect Page. It is also possible to use a command other than the Mode Select Command or, a newly defined command.

As shown in FIG. 28, setting information which permits or prohibits the recording of the dummy data may be set in the bit 1 of the byte 2 of a Type Independent Parameter which is added to the formatting request command. FIG. 28 is a diagram for explaining the Type Dependent Parameter added to the formatting request command. The bit position of the bit 1 of the byte 2 of the Type Independent Parameter is conventionally a reserved region, and this bit position may be newly defined as a bit INIT indicating the setting information. For example, the recording of the dummy data is prohibited when the bit INIT is "1", and the recording of the dummy data is permitted when the bit INIT is "0".

Figure 29:
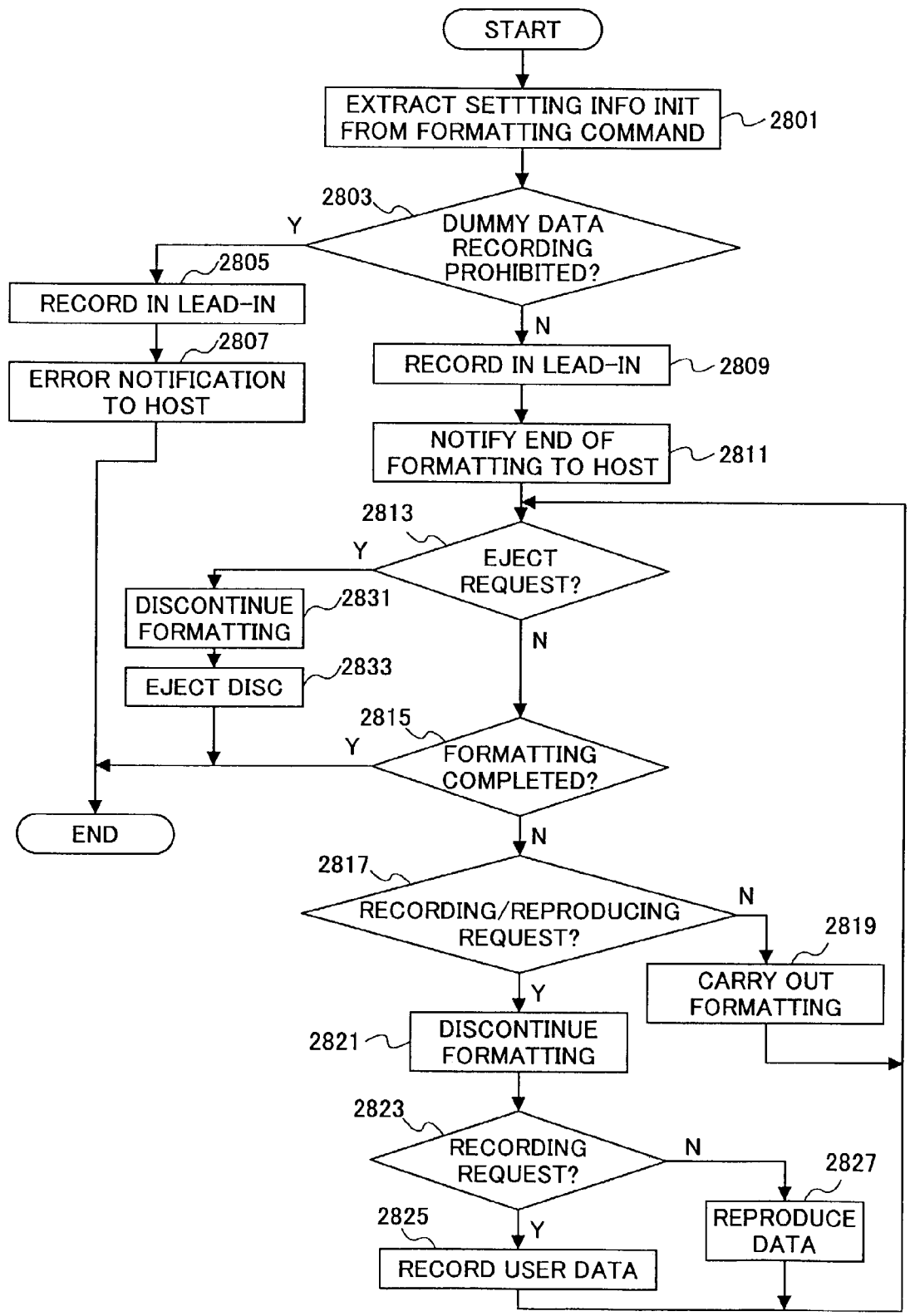
FIG. 29 is a flow chart for explaining a process of the optical disc drive when the received formatting request command includes setting information.

Next, a description will be given of a process of the optical disc drive 20 when the formatting request command including the setting information described above is received from the host unit 50, by referring to FIG. 29. FIG. 29 is a flow chart for explaining the process of the optical disc drive 20 when the received formatting request command includes the setting information. When the formatting request command including the setting information is received, a start address of the program corresponding to the flow chart shown in FIG. 29 is set in the program counter of the CPU 40, and algorithms corresponding to the flow chart shown in FIG. 29 are started. The flow chart shown in FIG. 29 corresponds to a series of algorithms executed by the CPU 40. It is assumed for the sake of convenience that the optical disc 15 is a blank optical disc.

First, a step 2801 shown in FIG. 29 extracts the bit INIT of the Type Independent Parameter which is added to the formatting request command. A step 2803 refers to the extracted bit INIT, and decides whether or not the setting information prohibits the recording of the dummy data. If the bit INIT is "1" and the recording of the dummy data is prohibited, the decision result in the step 2803 is YES, and the process advances to a step 2805.

The step 2805 records predetermined information in a portion of the Lead-In region LIA, similarly to the step 2403 shown in FIG. 24. A step 2807 notifies to the host unit 50 error information indicating that the recording of the dummy data is prohibited, and the process shown in FIG. 29 ends. In other words, the predetermined information is recorded in the Lead-In region LIA, but the dummy data are not recorded in the data region DZA.

On the other hand, if the bit INIT is "0" and the recording of the dummy data is permitted, the decision result in the step 2803 is NO, and the process advances to a step 2809. Steps S2809 through 2833 carry out processes similar to those carried out by the steps 2409 through 2433 shown in FIG. 24.

Therefore, when carrying out the formatting, it is possible to easily permit the recording of the dummy data when the A.C. power supply is used as the driving power supply, and to easily prohibit the recording of the dummy data when the battery is used as the driving power supply. In other words, it is possible to carry out a process depending on the environment in which the host unit 50 is used.

The mode select program of the host unit 50 may be added to an application software (writer software)which is used by the host unit 50 to record information on the optical disc 15. In this case, it is unnecessary to constantly provide a power supply monitoring software in the main memory of the host unit 50 for monitoring the power supply information such as the remaining amount of power of the battery, and the memory utilization efficiency is improved. In addition, it is possible to prevent the writer software from carrying out an erroneous operation due to the effects of the power supply monitoring software, to thereby prevent the data recording from failing and the data from becoming lost.

Four modes are used in this fifth embodiment, but the number of modes if of course not limited to four.

In this fifth embodiment, the recording control program is recorded in the ROM 39, however, the recording control program may be recorded in other recording media such as CD-ROMs, magneto-optical discs, flash memories and flexible discs. In this case, a medium drive corresponding to the information recording medium used is provided, and the recording control program is installed into the optical disc drive 20 from this medium drive. All that is required is for the recording control program to be loaded into the main memory of the CPU 40, so that the CPU 40 can carry out the processes described above by executing the recording control program.

Similarly, in this fifth embodiment, the mode select program is recorded in one or more hard discs of the HDD 56, but the mode select program may be recorded in other recording media such as CD-ROMs, magneto-optical discs, flash memories and flexible discs. In this case, a medium drive corresponding to the information recording medium used is provided, and the mode select program is installed into the host unit 50 from this medium drive. Of course, the mode select program may be transferred to the one or more hard discs of the HDD 56 from other recording media. The mode select program may also be transferred to the one or more hard discs of the HDD 56 or to the main memory of the microcomputer of the main control unit 52, via one or more networks. All that is required is for the mode select program to be loaded into the main memory of the microcomputer of the host unit 50, so that the host unit 50 can carry out the processes described above by executing the mode select program.

The optical disc 15 is DVD+RW in the fifth embodiment. However, the present invention is similarly applicable to any suitable information recording medium which is subjected to a process which accompanies the recording of the dummy data. In this case, a medium drive corresponding to the information recording medium used is provided.

The host unit 50 and the optical disc drive 20 may be provided within a single housing or, provided within separate housings, in the fifth embodiment described above.

In the fifth embodiment described above, it is assumed for the sake of convenience that the medium drive (optical disc drive) capable of recording and reproducing user data is used with respect to the information recording medium. However, the medium drive may be capable of only recording the user data with respect to the information recording medium.

In the fifth embodiment, the formatting is carried out as a process accompanying the recording of the dummy data, but the present invention is of course similarly applicable to processes other than the formatting as long as the process accompanies the recording of the dummy data.

Of course, the computer-readable storage medium according to the present invention which stores a program for causing a computer to carry out any of the processes of the information recording system, including the processes shown in the flow charts, may be realized by any suitable recording media capable of storing one or more programs in a computer-readable manner. The suitable recording media include magnetic, optical and magneto-optical recording media, and semiconductor memory devices. Moreover, the program may be obtained via communication media such as cable networks, wireless networks, and/or the Internet.

Further, the present invention is not limited to these embodiments, but various variations may be made without departing from the scope of the present invention.

What is claimed is:

1. An information recording method for recording information in an information recording medium, comprising:
   a first step selecting a mode from a plurality of modes at least including a mode which permits recording of dummy data in the information recording medium and a mode which prohibits recording of the dummy data in the information recording medium; and
   a second step carrying out a process based on the selected mode, in response to a request for a process which accompanies recording of the dummy data in the information recording medium,
   wherein the information recording medium is recorded with a Temporary Lead-Out, the process which accompanies the recording of the dummy data is a user data recording process, and said second step records the user data and overwrites only the Temporary Lead-Out by the dummy data when the selected mode is a mode which prohibits resuming of a formatting.

2. The information recording method as claimed in claim 1, wherein said second step carries out the process requested by the request when the selected mode is a mode which permits the recording of the dummy data.

3. The information recording method as claimed in claim 1, wherein said second step outputs error information when the selected mode is a mode which prohibits the recording of the dummy data.

4. The information recording method as claimed in claim 1, wherein said second step outputs reception information indicating receipt of the request when the selected mode is a mode which prohibits the recording of the dummy data.

5. The information recording method as claimed in claim 4, wherein the reception information is selected from a group consisting of information indicating discontinuance of the requested process, information indicating execution of the requested process in progress, and information indicating an end of the requested process.

6. The information recording method as claimed in claim 1, wherein the process which accompanies the recording of the dummy data is a formatting, and said second step records predetermined initial information in a Lead-In region of the information recording medium when the selected mode is a mode which prohibits recording of the dummy data in the information recording medium but permits initializing of the information recording medium.

7. The information recording method as claimed in claim 1, wherein the information recording medium is in conformance with DVD+RW standards.

8. An information recording apparatus for recording information in an information recording medium, comprising:
   a mode selecting section selecting a mode from a plurality of modes at least including a mode which permits recording of dummy data in the information recording medium and a mode which prohibits recording of the dummy data in the information recording medium; and
   a processing section carrying out a process based on the selected mode, in response to a request for a process which accompanies recording of the dummy data in the information recording medium,
   wherein the information recording medium is recorded with a Temporary Lead-Out, the process which accompanies the recording of the dummy data is a user data recording process, and said processing section includes an overwrite section which records the user data and overwriting only the Temporary Lead-Out by the dummy data when the mode selected by said mode selecting section is a mode which prohibits resuming of a formatting.

9. The information recording apparatus as claimed in claim 8, wherein said mode selecting section selects one of the plurality of modes in response to an external instruction.

10. The information recording apparatus as claimed in claim 8, wherein said processing section includes a requested process executing section which carries out the process requested by the request when the mode selected by said mode selecting section is a mode which permits the recording of the dummy data.

11. The information recording apparatus as claimed in claim 8, wherein said processing section includes an error output section which outputs error information when the mode selected by said mode selecting section is a mode which prohibits the recording of the dummy data.

12. The information recording apparatus as claimed in claimed 8, wherein said processing section includes a reception information output section which outputs reception information indicating receipt of the request when the mode selected by said mode selecting section is a mode which prohibits the recording of the dummy data.

13. The information recording apparatus as claimed in claim 8, wherein the process which accompanies the recording of the dummy data is a formatting, and said processing section includes an initial information recording section which records predetermined initial information in a Lead-In region of the information recording medium when the mode selected by said mode selecting section is a mode which prohibits recording of the dummy data in the information recording medium but permits initializing of the information recording medium.

14. An information recording system for recording information in an information recording medium, comprising:
   an information recording apparatus comprising: a mode selecting section selecting a mode from a plurality of modes at least including a mode which permits recording of dummy data in the information recording medium and a mode which prohibits recording of the dummy data in the information recording medium; and
   a processing section carrying out a process based on the selected mode, in response to a request for a process which accompanies recording of the dummy data in the information recording medium; and an information processing apparatus controlling the information recording apparatus, wherein the information recording medium is recorded with a Temporary Lead-Out, the process which accompanies the recording of the dummy data is a user data recording process, and said processing section includes an overwrite section which records the user data and overwriting only the Temporary Lead-Out by the dummy data when the mode selected by said mode selecting section is a mode which prohibits resuming of a formatting.

15. A computer-readable storage medium storing a program for causing a computer of an information recording apparatus to record information in an information recording medium, said program comprising:

a first procedure causing the computer to select a mode from a plurality of modes at least including a mode which permits recording of dummy data in the information recording medium and a mode which prohibits recording of the dummy data in the information recording medium; and a second procedure causing the computer to carry out a process based on the selected mode, in response to a request for a process which accompanies recording of the dummy data in the information recording medium, wherein the information recording medium is recorded with a Temporary Lead-Out, the process which accompanies the recording of the dummy data is a user data recording process, and said second procedure causes the computer to record the user data and overwrites only the Temporary Lead-Out by the dummy data when the selected mode is a mode which prohibits resuming of a formatting.

16. The computer-readable storage medium as claimed in claim 15, wherein said second procedure causes the computer to carry out the process requested by the request when the selected mode is a mode which permits the recording of the dummy data.

17. The computer-readable storage medium as claimed in claim 15, wherein said second procedure causes the computer to output error information when the selected mode is a mode which prohibits the recording of the dummy data.

18. The computer-readable storage medium as claimed in claim 15, wherein said second second procedure causes the computer to output reception information indicating receipt of the request when the selected mode is a mode which prohibits the recording of the dummy data.

19. The computer-readable storage medium as claimed in claim 18, wherein the reception information is selected from a group consisting of information indicating discontinuance of the requested process, information indicating execution of the requested process in progress, and information indicating an end of the requested process.

20. The computer-readable storage medium as claimed in claim 15, wherein the process which accompanies the recording of the dummy data is a formatting, and said second procedure causes the computer to record predetermined initial information in a Lead-In region of the information recording medium when the selected mode is a mode which prohibits recording of the dummy data in the information recording medium but permits initializing of the information recording medium.

21. The computer-readable storage medium as claimed in claim 15, wherein the information recording medium is in conformance with DVD+RW standards.

22. A computer-readable storage medium storing a program for causing an information processing apparatus which forms an information recording system together with an information recording apparatus which records information in an information recording medium, said program comprising:

a first procedure causing a computer to display information related to a plurality of modes at least including a mode which permits recording of dummy data in the information recording medium and a mode which prohibits recording of the dummy data in the information recording medium; and a second procedure causing the computer to notify a mode selected from the plurality of modes to the information recording apparatus, wherein the information recording medium is recorded with a Temporary Lead-Out, the process which accompanies the recording of the dummy data is a user data recording process, and said second procedure causes the computer to record the user data and overwrites only the Temporary Lead-Out by the dummy data when the selected mode is a mode which prohibits resuming of a formatting.

23. The computer-readable storage medium as claimed in claim 22, wherein said second procedure causes the computer to issue a mode select command set with information related to the selected mode.

24. The computer-readable storage medium as claimed in claim 22, wherein said program comprises: a third procedure causing the computer to display the mode selected in the information recording apparatus in response to a request.

25. The computer-readable storage medium as claimed in claim 22, wherein the information recording medium is in conformance with DVD+RW standards.

* * * * *